US008412914B2

(12) United States Patent
Gonion

(10) Patent No.: US 8,412,914 B2
(45) Date of Patent: Apr. 2, 2013

(54) MACROSCALAR PROCESSOR ARCHITECTURE

(75) Inventor: Jeffry E. Gonion, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/298,739

(22) Filed: Nov. 17, 2011

(65) Prior Publication Data

US 2012/0066482 A1 Mar. 15, 2012

Related U.S. Application Data

(60) Continuation of application No. 12/614,336, filed on Nov. 6, 2009, now Pat. No. 8,065,502, which is a division of application No. 11/219,622, filed on Sep. 1, 2005, now Pat. No. 7,617,496, which is a continuation-in-part of application No. 10/831,615, filed on Apr. 23, 2004, now Pat. No. 7,395,419.

(51) Int. Cl.
  *G06F 9/45* (2006.01)
(52) U.S. Cl. ............................................ 712/7; 717/160
(58) Field of Classification Search ........................ None
  See application file for complete search history.

(56) References Cited

U.S. PATENT DOCUMENTS

| 5,247,696 A * | 9/1993 | Booth ........................... 717/150 |
| 5,535,393 A | 7/1996 | Reeve et al. |
| 5,551,039 A | 8/1996 | Weinberg et al. |
| 5,727,194 A | 3/1998 | Shridhar et al. |
| 5,734,857 A | 3/1998 | Gaubatz |
| 5,734,880 A | 3/1998 | Guttag et al. |
| 5,734,908 A | 3/1998 | Chan et al. |
| 5,790,866 A | 8/1998 | Robison |
| 5,802,375 A * | 9/1998 | Ngo et al. ...................... 717/160 |
| 5,845,307 A | 12/1998 | Prabhu et al. |
| 5,901,318 A | 5/1999 | Hsu |
| 5,930,510 A | 7/1999 | Beylin et al. |
| 5,996,083 A | 11/1999 | Gupta et al. |
| 6,055,371 A * | 4/2000 | Okano ........................... 717/160 |
| 6,058,266 A | 5/2000 | Megiddo et al. |
| 6,321,330 B1 | 11/2001 | Doshi et al. |
| 6,351,170 B1 | 2/2002 | Takahashi et al. |
| 6,367,070 B1 | 4/2002 | Haghighat et al. |
| 6,367,071 B1 | 4/2002 | Cao et al. |
| 6,374,403 B1 | 4/2002 | Darte et al. |
| 6,438,740 B1 | 8/2002 | Broder et al. |
| 6,463,580 B1 | 10/2002 | Wilkerson |
| 6,587,952 B2 | 7/2003 | Lin |
| 6,597,605 B2 | 7/2003 | Kreifels et al. |
| 6,636,976 B1 | 10/2003 | Grochowski et al. |
| 6,708,331 B1 * | 3/2004 | Schwartz ...................... 717/160 |
| 6,745,336 B1 | 6/2004 | Martonosi et al. |
| 6,839,648 B1 | 1/2005 | Burlison |
| 6,865,649 B2 | 3/2005 | Musumeci |
| 6,883,107 B2 | 4/2005 | Rodgers et al. |

(Continued)

OTHER PUBLICATIONS

Lang, Tomas, et al., "Individual Flip-Flops with Gated Clocks for Low Power Datapaths," Jun. 1997, IEEE Transactions on Circuits and Systems-II Analog and Digital Signal Processing, vol. 44, No. 6, pp. 507-516.

(Continued)

*Primary Examiner* — Eric Coleman
(74) *Attorney, Agent, or Firm* — Meyertons, Hood, Kivlin, Kowert & Goetzel, P.C.

(57) ABSTRACT

A method for aggregating a program loop in a Macroscalar architecture includes identifying one or more instructions of the program loop having a branch instruction that causes the program loop to branch dependent upon a predicate condition after a memory write operation. The method also includes modifying at least one of the one or more instructions to cause a processor executing the one or more instructions to branch after the memory write operation executed as a vector block for iterations prior to and including an iteration during which the predicate condition is satisfied.

11 Claims, 69 Drawing Sheets

U.S. PATENT DOCUMENTS

| | | | |
|---|---|---|---|
| 6,983,389 B1 | 1/2006 | Filippo | |
| 6,993,756 B2 | 1/2006 | Ogawa et al. | |
| 7,051,193 B2 | 5/2006 | Wang et al. | |
| 7,076,777 B2 | 7/2006 | Srinivasan | |
| 7,254,679 B2 | 8/2007 | Richter et al. | |
| 7,302,557 B1 | 11/2007 | Hwu et al. | |
| 7,313,788 B2 * | 12/2007 | Ben-David et al. | 717/150 |
| 7,316,012 B2 | 1/2008 | Muthukumar | |
| 7,367,026 B2 | 4/2008 | Eichenberger et al. | |
| 7,631,305 B2 * | 12/2009 | Rong et al. | 717/161 |
| 7,685,439 B2 | 3/2010 | Drescher | |
| 8,056,069 B2 * | 11/2011 | Eichenberger et al. | 717/160 |
| 2001/0004755 A1 | 6/2001 | Levy et al. | |
| 2002/0174319 A1 | 11/2002 | Rivers et al. | |
| 2004/0003381 A1 * | 1/2004 | Suzuki et al. | 717/150 |
| 2004/0006667 A1 * | 1/2004 | Bik et al. | 711/100 |
| 2004/0268334 A1 * | 12/2004 | Muthukumar et al. | 717/160 |
| 2005/0144605 A1 | 6/2005 | Motokawa et al. | |

OTHER PUBLICATIONS

Ziles, Craig et al., "Execution-based Prediction Using Speculative Slices," 2001 IEEE, 12 pages.

Moshovos, Andreas et al., "Slice-Processors: An Implementation of Operation-Based Prediction," ACM, 2001, pp. 321-334.

Artigas, P.V. et al., "Automatic Loop Transformations and Parallelization for Java," 2000, ACM, pp. 1-10.

* cited by examiner

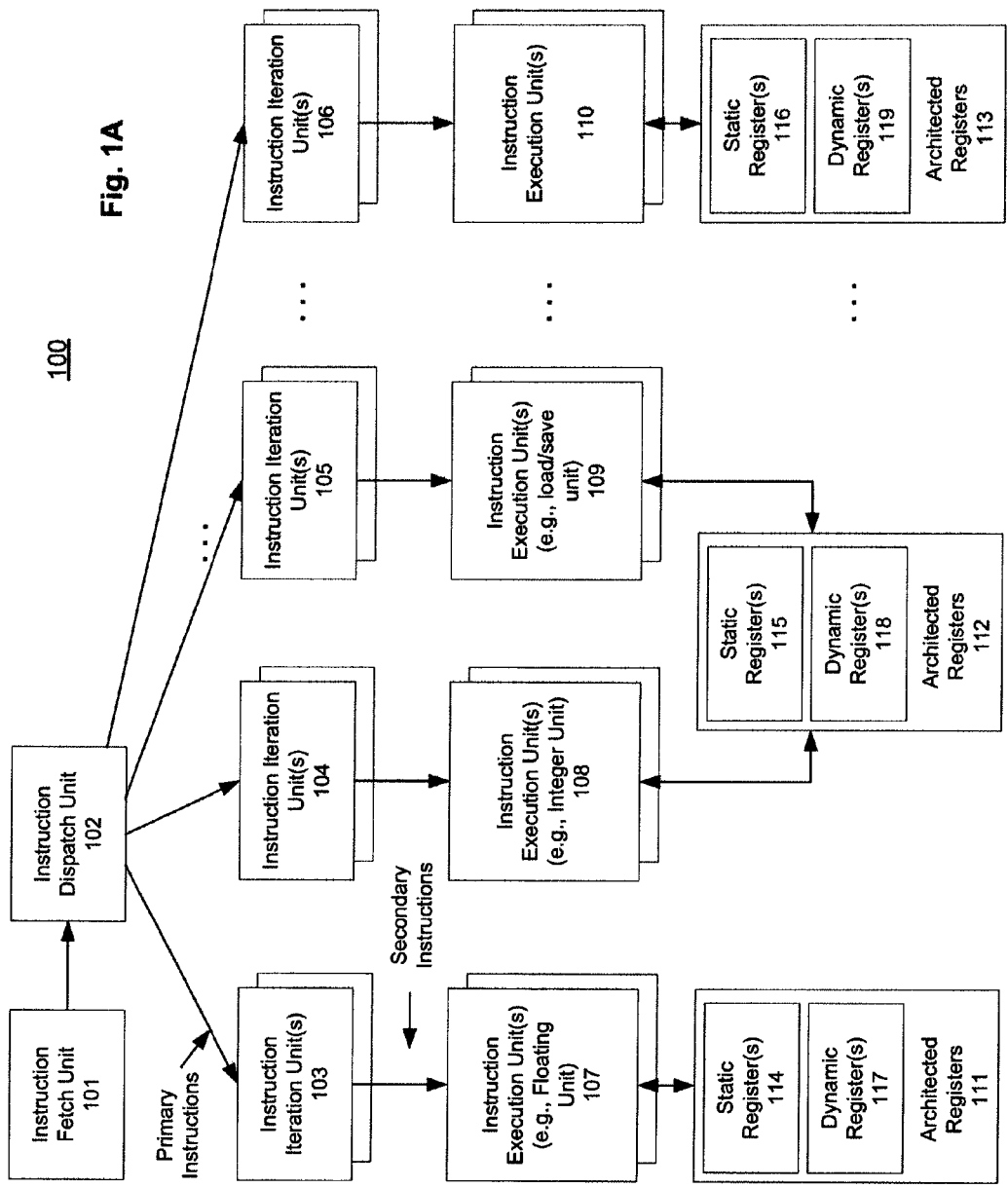

```
For (x=0; x<2000; ++x)
    A[x] = x * 47;
```
201

Fig. 2A

```
Loop:   x = 0;

t = x * 47;
        A[x] = t;
        ++x;
        (Loop Again)
```
202

Fig. 2B

```
Loop:   x0=0; x1=1; x2=2; x3=3;

t0=x0*47; t1=x1*47; t2=x2*47; t3=x3*47;
        A[x0]=t0; A[x1]=t1; A[x2]=t2; A[x3]=t3;
        x0+=4;   x1+=4;   x2+=4;   x3+=4;
        (Loop Again)
```
203

Fig. 2C

```
For (x=0; x<2000; ++x)
    A[x] = B[x] * K;
```
                                                                501

Fig. 7A

```
r0 = K;                      r0 = K;
r1 = &A;                     r1 = &A;
r2 = &B;                     r2 = &B;
r4 = 0;                      r4 = 0
Loop:
  r5 = r2[r4];               temp = b[x];
  r5 = r5 * r0;              temp = temp * K;
  r1[r4] = r5;               a[x] = temp;
  r4 += 1;                   ++x;
                                                                502
       _____/        (test and loop)  _____/
         504                               505
```

Fig. 7B

```
r0 = K;                      r0 = K;
r1 = &A;                     r1 = &A;
r2 = &B;                     r2 = &B
r3 = (Calibrate)             r3 = 8;
r4 = (Index Init)            xr0=0; xr2=1; xr4=2; xr6=3; etc...
Loop:
  r5 = r2[r4];               xr1=r2[xr0]; xr3=r2[xr2]; xr5=r2[xr4]; etc...
  r5 = r5 * r0;              xr1=xr1*r0;  xr3=xr3*r0;  xr5=xr5*r0; etc...
  r1[r4] = r5;               r1[xr0]=xr1; r1[xr2]=xr3; r1[xr4]=xr5; etc...
  r4 += r2;                  xr0+=r2;     xr2+=r2;     xr4+=r2;    etc...

_____/        (test and loop)  _____/
         506                                    507              503
```

A dispatch unit of a processor recognizes a predicate block of instructions within a program loop, the predicate block including multiple instructions that depend on one or more predicate conditions.
1001

↓

The dispatch unit examines the one or more predicate conditions stored in one or more predicate registers to determine which one, if any, of the multiple instructions may be executed.
1002

↓

Dispatch one of the multiple instructions that needs to be executed based on the one or more predicate conditions to an execution unit or an issue unit coupled to the execution unit, while the rest of the multiple instructions remain undispatched.
1003

↓

Execute the dispatched instruction, if there is any, by the execution unit
1004

Fig. 13

```
big = 0;
for (_x=0; x<max; ++_x)
{
        if (a[_x] > big)
        {
                pos = _x;
                big = a[_x];
        }
}
```
1101

Fig. 14A

```
        big = 0;
        (allocate state frame and clear all flags)
        factor = (calc aggregation factor)
%       _x = Index(factor)              // Index Variable Initialization
        goto Tail Body:
%       _temp = a[_x]
%       {                               // Begin Sequence Block
                _pred = _temp > big;
                if (_pred) big = _temp;                                 1103
%               if (_pred) pos = _x;
%       }                               // End Sequence Block Bottom:
        (consolidate non-index variables)       // if desired, none in this
example (clears write-flags)
        if (any break) goto Cleanup
        (clear break & continue flags)
%       _x += factor                    // Index Variable Update Tail:
%       _pred = _x < max                // Check termination Condition
%       if (_pred == 0) break    // Set break for corresponding iteration
        if (_pred[0]) goto Body  // Check lowest iteration of _pred Cleanup:
        (consolidate index variables)   // if desired, (clears write-flags)
        (deallocate state frame)
End:
                                                                1102
```

Fig. 14B

```
            big = 0;
            (allocate state frame and clear all flags)
            factor = (calc aggregation factor)
%           _x = Index(factor)              // Index Variable Initialization
%           _bigTemp = 0;
            goto Tail Body:
%           _temp = a[_x]
%           _pred = _temp > _bigTemp;
%           if (_pred) _bigTemp = _temp;
%           if (_pred) _posTemp = _x;

Bottom:
            if (any break) goto Cleanup
            (clear break & continue flags)
%           _x += factor                    // Index Variable Update Tail:
%           _pred = _x < max                // Check termination Condition
%           if (_pred == 0) break    // Set break for corresponding iteration
            if (_pred[0]) goto Body  // Check _pred for iteration zero Cleanup:
%           {                               // Begin Deferred Sequence Block
                _pred = _bigTemp > big
                if (_pred) big = _bigTemp
                if (_pred) pos = _posTemp
%           }                               // End Deferred Sequence Block
            (deallocate state frame)
End:
```

1106 (brace grouping Body and Bottom and Tail sections)
1105 (brace grouping Cleanup block)
1104

Fig. 14C

```
// Loop 0 -
for (i = 0; i < W; i++)
{
    ...
    // Preserve aggregation state for Loop 0
    // Allocate registers for Loop 1
    // Loop 1 -
    for (j = 0; j < X; j++)
    {
        ...
        // Preserve aggregation state for Loop 1
        // Allocate registers for Loop 2
        // Loop 2 -
        for (k = 0; k < Y; k++)
        {
            ...
            // Preserve aggregation state for Loop 2
            // Allocate registers for Loop 3
            // Loop 3 -
            for (l = 0; l < Z; l++)
            {
                ...
            } // for l
            // De-allocate registers for Loop 3
            // Restore aggregation state for Loop 2
        } // for k
        // De-allocate registers for Loop 2
        // Restore aggregation state for Loop 1
    } // for j
    // De-allocate registers for Loop 1
    // Restore aggregation state for Loop 0
} // for i
```

```
for (x=0; x<max; ++x)
{
        a = x;                  // a = 3 at termination
        if (x > 5) q=x;         // q remains unchanged
        if (x < 2) a=x+7;       // a = 3; Really.
        if (x < 2) b=x;         // b = 1 at termination
        if (x > 4) b=x;
        if (x == 3) break;
        c = x;                  // c = 2 at termination
}
```

Fig. 25A

| | | | | | | | |
|---|---|---|---|---|---|---|---|
| x0=0; | x1=1; | x2=2; | x3=3; | x4=4; | x5=5; | x6=6; | // Index Init |
| a0=0; | a1=1; | a2=2; | a3=3; | a4=4; | a5=5; | a6=6; | // iterate a=x |
| - | - | - | - | - | - | q6=6; | // iterate q=x |
| a0=7; | a1=8; | - | - | - | - | - | // iterate a=x+7 |
| b0=0; | b1=1; | - | - | - | b5=5; | b6=6; | // iterate b=x |
| ------------ break instruction is encountered here ------------ | | | | | | | |
| c0=0; | c1=1; | c2=2; | - | - | - | - | // iterate c=x |

Fig. 25B

| Write-flag Register for x 1901 | 1 | 1 | 1 | 1 | 1 | 1 | 1 | // Index Init |
| --- | --- | --- | --- | --- | --- | --- | --- | --- |
| Write-flag Register for a 1902 | 1 | 1 | 1 | 1 | 1 | 1 | 1 | // Iterate a=x |
| Write-flag Register for q 1903 | 0 | 0 | 0 | 0 | 0 | 0 | 1 | // Iterate q=x |
| Write-flag Register for b 1904 | 1 | 1 | 0 | 0 | 0 | 1 | 1 | // Iterate b=x |
| Write-flag Register for c 1905 | 1 | 1 | 1 | 0 | 0 | 0 | 0 | // Iterate c=x |
| Break Register 1906 | 1 | 1 | 1 | 1 | 0 | 0 | 0 | |

Fig. 28A

| Write-flag Register for x 1901 | 1 | 1 | 1 | 1 | 0 | 0 | 0 | // Index Init |
| --- | --- | --- | --- | --- | --- | --- | --- | --- |
| Write-flag Register for a 1902 | 1 | 1 | 1 | 1 | 0 | 0 | 0 | // Iterate a=x |
| Write-flag Register for q 1903 | 0 | 0 | 0 | 0 | 0 | 0 | 0 | // Iterate q=x |
| Write-flag Register for b 1904 | 1 | 1 | 0 | 0 | 0 | 0 | 0 | // Iterate b=x |
| Write-flag Register for c 1905 | 1 | 1 | 1 | 0 | 0 | 0 | 0 | // Iterate c=x |
| Break Register 1906 | 1 | 1 | 1 | 1 | 0 | 0 | 0 | |

Fig. 28B

| Cycles | Slice 0 | Slice 1 | Slice 2 | Slice 3 | |
|---|---|---|---|---|---|
| 1 | $V0_0$ | $V0_1$ | $V0_2$ | $V0_3$ | |
| 2 | $V0_4$ | $V0_5$ | $V0_6$ | $V0_7$ | |
| 3 | $V1_0$ | $V1_1$ | $V1_2$ | $V1_3$ | |
| 4 | $V1_4$ | $V1_5$ | $V1_6$ | $V1_7$ | 3351 |
| 5 | $V2_0$ | $V2_1$ | $V2_2$ | $V2_3$ | |
| 6 | $V2_4$ | $V2_5$ | $V2_6$ | $V2_7$ | |
| 7 | $S3_0$ | -- | -- | -- | |
| 8 | $S4_0$ | -- | -- | -- | |
| 9 | -- | $S3_1$ | -- | -- | |
| 10 | -- | $S4_1$ | -- | -- | 3352 |
| 11 | -- | -- | $S3_2$ | -- | |
| 12 | -- | -- | $S4_2$ | -- | |
| 13 | -- | -- | -- | $S3_3$ | |
| 14 | -- | -- | -- | $S4_3$ | |

| Cycles | Slice 0 | Slice 1 | Slice 2 | Slice 3 | |
|---|---|---|---|---|---|
| 1 | $S3_0$ | $V0_1$ | $V0_2$ | $V0_3$ | } 3401 |
| 2 | $S4_0$ | $V0_5$ | $V0_6$ | $V0_7$ | |
| 3 | $V0_0$ | $S3_1$ | $V1_2$ | $V1_3$ | } 3402 |
| 4 | $V0_4$ | $S4_1$ | $V1_6$ | $V1_7$ | |
| 5 | $V1_0$ | $V1_1$ | $S3_2$ | $V2_3$ | } 3403 |
| 6 | $V1_4$ | $V1_5$ | $S4_2$ | $V2_7$ | |
| 7 | $V2_0$ | $V2_1$ | $V2_2$ | $S3_3$ | } 3404 |
| 8 | $V2_4$ | $V2_5$ | $V2_6$ | $S4_3$ | |

```
Flag = 0;
for (x = 0; x < 100; x++)
{
        if (A[x] == 4)        ~   4201
        Flag = 1;       ~   4202
        ...
}
```

Fig. 42A

```
Flag = 0;
for (x = 0; x < 100; x++)
{
        p = (A[x] == 4)   ~   4203
        if (p)            ~   4204
           Flag = 1;      ~   4205
        ...
}
```

Fig. 42B

```
Flag = 0;

for (x = 0; x < 100; x++)
{
        p = (A[x] == 4)
        Flag = (IF TRUE) P    ~   4207
}
                4206
```

Fig. 42C

```
Foo (char *A, char *B)
{
    ...
    while (A[x] != 0)       ~   4401
    {
        B[x] = A[x];        ~   4402
        x++;
    } // while
    ...
} // Foo
```

```
for (x = min; x < max; x++)         ~ 4801
{
        if (A[x] < K)       ~ 4802
        {
                R = A[x] + S;   ⎱
                B[x] = R;       ⎰  4803
        }
        else
        {
                S = A[x] - R;   ⎱
                B[x] = S;       ⎰  4804
        }
        ...
} // for
```

Fig. 48A

Loop

Px = some values

LIMIT (Px change) ~4805

Vector Block

IF Px some operations ~4803

ELSE some operations ~4804

END LIMIT

Fig. 48B

$$4811 \sim Px = \underbrace{0\,0\,0}_{4806}\,\overbrace{1\,1\,1}^{4807}\,\underbrace{0\,0\,0}_{4808}\,\overbrace{1\,1\,1}^{4809}\,\underbrace{0\,0\,0}_{4810}$$

```
last = 0;
for (x = start; x < stop; x++)   ~5001
{
        this = some operations;  ~5002
        if (this < last)
        {
                count = x;
                break;
        } // if some operations with "this"
                                  ~5003
        last = this;
        ...
} // for
```

```
last = 0;
for (x = start; x < stop; x++)
{
        this = some operations;

last $_{dyn}$ = SHIFT (this) THROUGH (last $_{static}$)        ~ 5011 if (this < last)
        {
                count = x;
                break;
        } // if some operations with "this"                            5012 last = this;
        ...
} // for
```

Fig. 50C

```
strncpy (char *dst, char *src, int num)
{
        for (x = 0; x < num; x++)     ~5201
        {
                dst[x] = src[x];      ~5202
                if (src[x] == 0)
                        break;        ~5203
        } // for
} // strncpy
```

Fig. 52A

```
strncpy (char *dst, char *src, int num)
{
        for (x = 0; x < num; x++)  ~5201
        {
                P = (src[x] == 0)

if (P) pre-break;     ~5204 dst[x] = src[x];      ~5202
                if (P)
                        break
        } // for
} // strncpy
```

Fig. 52B

```
                                    5401
for (x = 0; x < N; x++)
{
        some operations (A);    5402 for (y = 0; y < M; y++)
        {
                T = A + A/2;
                A = T-1;                  } 5403
                if (FINISH)
                break
                ...
        } // for y
        ...
        Q[x] = A
} // for x
```

```
for (x' = 0; x' < N; x'++)
{
        A' = R[x']                          ⎯5501 for (y' = 0; y' < M; y'++)
        {
                T' = A' + A'/2;      ⎤
                A' = T'-1;           ⎬ 5502
                P' = FINISH (A');    ⎦
                IF ANY P' SET        ⎫
                    continue         ⎬ 5503
                                     ⎭
                #
                    some operations  ⎯5504
                        ...
        } // for y
        ...
        Q[x] = A
} // for x
```

5600

Identify instructions of a program loop having a first loop enclosing a second loop, where the second loop includes a sequence block of instructions.
5601

For each iteration of the second loop, execute the instructions of the first loop as a vector block in parallel predicated upon one or more predicate condition corresponding to each iteration of the second loop.
5602

Clearing a predicate corresponding to an iteration of the second loop when the corresponding iteration of the second loop terminates.
5603

Repeat the above operations if any of the predicates corresponding to an iteration of the second loop is not cleared.
5604

Fig. 56

```
y = 0;
for (x = min; x < max; x++)    ~5701
{
        if (A[x] < 256)
                B[y++] = A[x];   } 5702

```
y = 0
for x = ...
{
P = A[x] < 256;

y dyn = SparseIndex (P, y static, 1);   ~5703 if (P)
   B[y dyn] = A[x dyn];   ~5705 y static += CountIter(P);   ~5704
} // for x
```

Fig. 57B

| Iteration | Count | $X_{dyn}$ | $y_{dyn}$ | Operation |
|---|---|---|---|---|
| 1 | 0 | $X_0 = 0$ | $y_0 = $ -- or 0 | -- |
| 2 | 1 | $X_1 = 1$ | $y_1 = 0$ | B[0] = A[1] |
| 3 | 1 | $X_2 = 2$ | $y_2 = 1$ | B[1] = A[2] |
| 4 | 0 | $X_3 = 3$ | $y_3 = $ -- or 1 | -- |
| 5 | 1 | $X_4 = 4$ | $y_4 = 2$ | B[2] = A[4] |
| 6 | 1 | $X_5 = 5$ | $y_5 = 3$ | B[3] = A[5] |

Fig. 57C

MACROSCALAR PROCESSOR ARCHITECTURE

RELATED APPLICATIONS

This application is a continuation of U.S. application Ser. No. 12/614,336 filed on Nov. 6, 2009, now U.S. Pat. No. 8,065,502 which is a divisional of U.S. patent application Ser. No. 11/219,622, filed on Sep. 1, 2005, now issued as U.S. Pat. No. 7,617,496 on Nov. 10, 2009, which is a continuation-in-part of U.S. patent application Ser. No. 10/831,615, filed on Apr. 23, 2004, now issued as U.S. Pat. No. 7,395,419 on Jul. 1, 2008, which is hereby incorporated by reference in its entirety.

FIELD OF THE INVENTION

The present invention relates generally to a processor. More particularly, this invention relates to macroscalar processor architecture.

BACKGROUND OF THE INVENTION

As clock frequencies continue to rise in response to increased demands for performance, power has also increased, while deeper pipelines have exhibited a diminishing effect on the number of instructions per cycle (IPC) achieved in real-world situations, which further contributes to the power dissipation problem through inefficiency. A variety of mechanisms have emerged over the years that attempt to salvage instruction-level parallelism (ILP), such as SMT (simultaneous multi-threading) and VLIW (very long instruction word) and out-of-order execution, some with more success than others.

The classic compile-time optimization that permits more effective utilization of longer pipelines is loop unrolling. Unfortunately, most processors lack the requisite number of program registers to permit enough unrolling to fully saturate deeper pipelines. Increasing the number of registers without compromising software compatibility is problematic as well. Furthermore, many types of loops simply cannot be unrolled, such as those that implement data-dependent control-flow, which is the same class of loop hit hardest by deeper pipelines.

Autovectorization is another compiler optimization that is beginning to break into the mainstream. For loops that can be autovectorized, the promise of performance is even greater than for loop unrolling. However, loops that can be autovectorized are only a small subset of loops that can be unrolled, which is a small subset of all loops in general. While regularly structured numerical algorithms sometimes may benefit from auto-vectorization, none of this really helps data-driven algorithms.

While consumers purchase newer and faster processors with deeper pipelines, the vast majority of software available is still targeted for processors with shorter pipelines. As a result, of this, the consumer may not realize the full processing potential of a new processor for one to two years after its release, and only after making additional investments to obtain updated software. Since the limited number of program registers restricts loop unrolling, it is questionable how efficiently deeper pipelines will actually be utilized.

SUMMARY OF THE INVENTION

A macroscalar processor architecture is described herein. In one embodiment, a processor receives instructions of a program loop having a vector block and a sequence block intended to be executed after the vector block, where the processor includes multiple slices and each of the slices is capable of executing an instruction of an iteration of the program loop substantially in parallel. For each iteration of the program loop, the processor executes an instruction of the sequence block using one of the slices while executing instructions of the vector block using a remainder of the slices substantially in parallel. Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements.

FIGS. 1A and 1B are block diagrams illustrating an exemplary processor according to certain embodiments of the invention.

FIGS. 2A-2C are block diagrams illustrating exemplary pseudo code during a dynamic loop aggregation according to one embodiment of the invention.

FIGS. 7A-7C are block diagrams exemplary pseudo code during a dynamic loop aggregation according to another embodiment of the invention.

FIG. 13 is flow diagram illustrating an exemplary process for processing a predicate block of instructions, according to one embodiment of the invention.

FIGS. 14A-14C are block diagrams illustrating exemplary pseudo code for the use of a sequence block.

FIG. 22 is a block diagram illustrating an exemplary pseudo code which may be processed using a process having multiple slices according to one embodiment of the invention.

FIGS. 25A and 25B are block diagram illustrating an exemplary process for handling iteration control instructions, according to one embodiment of the invention.

FIGS. 28A and 28B are block diagrams illustrating an exemplary process for handling iteration control instructions, according to one embodiment of the invention.

FIGS. 42A-42C are exemplary codes illustrating an enhancement of sequence block execution according to one embodiment.

FIGS. 48A and 48B are diagrams illustrating an exemplary mechanism for limiting aggregation of a program loop at runtime according to another embodiment.

FIGS. 50A-50C are diagrams illustrating an exemplary mechanism for reduce sequence block executions according to one embodiment.

FIGS. 52A-52B are diagrams illustrating an exemplary mechanism for enhancing sequence block executions according to another embodiment.

FIG. 56 is a flow diagram illustrating an exemplary process for enhancing sequence block execution according to another embodiment.

FIGS. 57A, 57B and 57C are diagrams illustrating an exemplary enhancement for sequence block execution according to one embodiment.

DETAILED DESCRIPTION

Figure 1B:
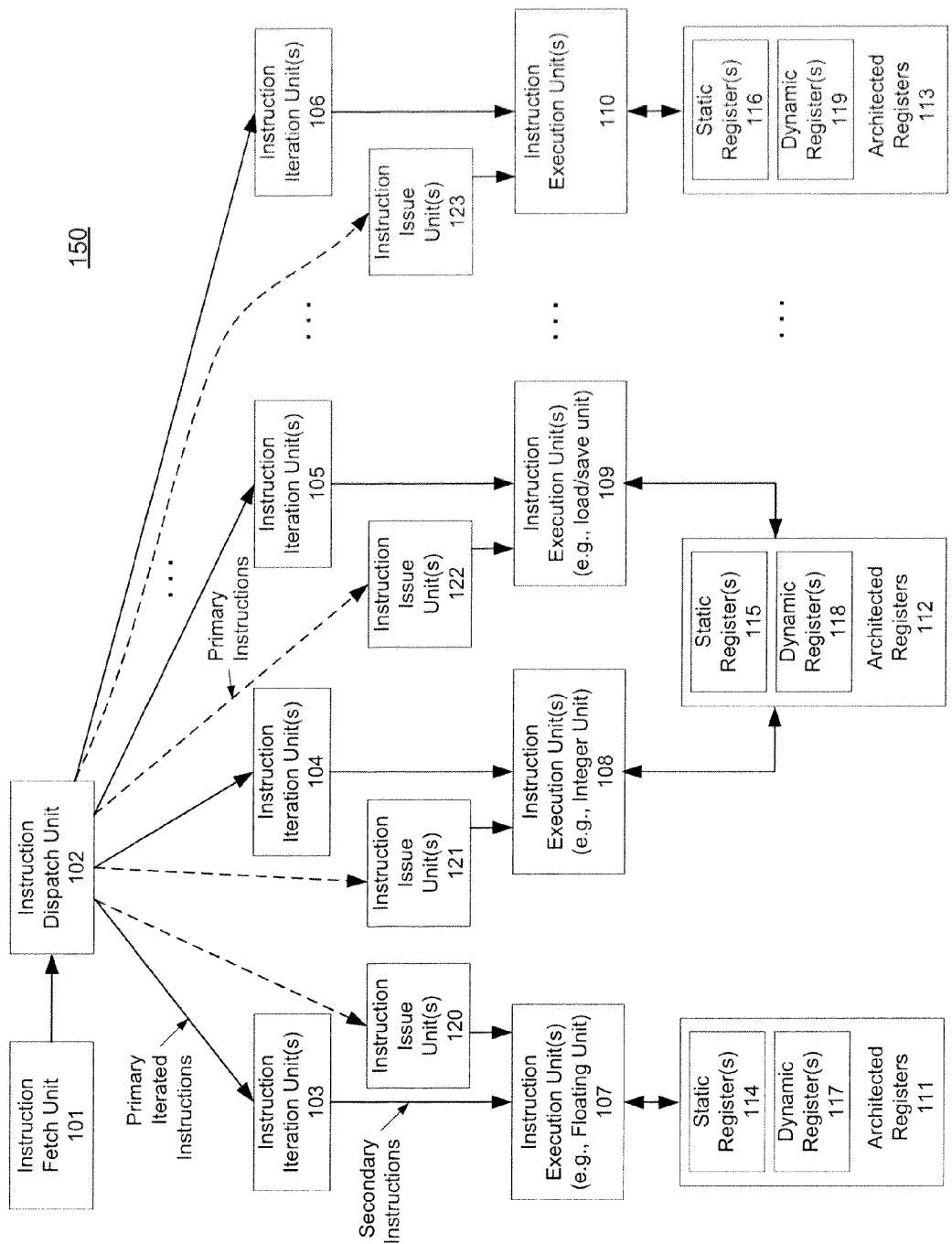

A macroscalar processor architecture is described herein. In one embodiment, instruction-level parallelism is generated at run-time, rather than scavenged, improving efficiency and performance while reducing power dissipation per task. The number of program registers is increased considerably, and over-specification of binary code for a specific processor is avoided, replaced by mechanisms which may ensure that software for prior versions of the processors automatically utilize additional execution resources in future versions. These enhancements also permit virtually substantially all inner loops to be aggregated to varying degrees, including those that cannot be unrolled by compilers, increasing IPC by maximizing utilization of multiple execution units.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Exemplary Macroscalar Processor Architecture

In one embodiment, a macroscalar processor architecture is designed to optimally execute program loops, by utilizing resources (e.g., execution units, registers, and/or pipeline stages) optimally for the specific processor where the code is running on. To accomplish this, according to one embodiment, loops are handled at a macro-scale, where blocks of instructions are executed in a manner generally outlined by the compiler, but specifically determined by the processor at run-time. To achieve optimal processor utilization, according to one embodiment, the compiler inserts directives pertaining to the code structure into the instruction stream, leaving the final code transformations to occur within the processor as the code is executed, thus allowing the processor to keep pipelines full and execution units busy.

In the absence of flow-control, loops are comprised of two classes of instructions: groups of instructions for which multiple iterations of the loop can execute in parallel, and groups of instructions for which operations are required to occur sequentially between iterations of the loop. The former are referred to as vector blocks, while the latter are referred to as sequence blocks. Since flow control within an iteration of the loop exists to determine which instructions should include a given iteration of the loop body, branches are eliminated and replaced with predication for greater efficiency.

According to one embodiment, a macroscalar processor executes multiple iterations of a loop in a single pass, using a process referred to herein as dynamic loop aggregation. Instructions in sequence blocks are executed in sequential order, for each iteration of the loop, to maintain the integrity of the algorithm. Instructions in vector blocks are executed over multiple iterations of the loop substantially simultaneously, since they are non-interdependent. Vector blocks are processed such that execution units of a given type are maximally utilized, and that the pipeline of each execution unit is fully utilized on every cycle they are active, while multiple iteration engines allow vector-block instructions destined for different execution units to iterate in parallel.

In order to achieve maximum utilization of pipelines and execution units, according to one embodiment, the processor employs dynamic loop aggregation at program execution time via intelligent dispatch and iteration mechanisms. In order to support high factors of loop aggregation, according to one embodiment, there is a register model that permits arbitrarily large numbers of registers, (also referred to herein as extended registers), which can be increased or decreased between versions of the processor without affecting binary software compatibility.

FIG. 1A is a block diagram illustrating an exemplary processor according to one embodiment of the invention. Exemplary processor 100 may be used as a microprocessor of a data processing system, such as, exemplary data processing system 2500 of FIG. 32. For example, exemplary processor 100 may be a PowerPC™ processor from Motorola, Inc. Alternatively, exemplary processor 100 may be a Pentium processor of the Pentium™ family processors from Intel Corporation. Furthermore, exemplary processor 100 may be used as other processors, such as an embedded microprocessor or a digital signal processor (DSP).

Referring to FIG. 1A, in one embodiment, exemplary processor 100 includes, but is not limited to, an instruction fetch unit 101 to fetch instructions from an instruction buffer (not shown), an instruction dispatch unit 102 coupled to the instruction fetch unit 101 to dispatch the instructions to be executed, one or more instruction iteration units 103-106 coupled to the instruction unit 102 to perform iterations for each of instructions dispatched, and one or more execution units 107-110 to execute the instructions received from the iteration units 103-106 respectively.

In addition, according to one embodiment, the execution units 107-110 may access one or more architected registers 111-113. The architected registers 111-113 may also be accessed by other components of the exemplary processor 100, such as, for example, dispatch unit 102 and iteration units 103-106. Some of the architected registers 111-113 may be shared with multiple execution units, while some other execution units have an exclusive right to some of the architected registers 111-113. For example, a floating-point unit may have exclusive floating-point architected registers, while an integer unit and a load/save unit may share some architected registers. Some or all of the information stored in the registers may be duplicated across the architected registers 111-113. In one embodiment, the architected registers 111-113 may be implemented as one or more register files. Alternatively, the architected registers 111-113 may be implemented as RAM (random access memory). In a particular embodiment, the architected registers 111-113 may be implemented as one or more banks of RAMs.

According to one embodiment, the instruction fetch unit 101 fetches one or more instructions from an instruction buffer (not shown) and transmits the fetched instructions to the instruction dispatch unit 102. The instruction dispatch unit 102 may include a buffer to store such instructions. In one embodiment, an aggregation factor is calculated or calibrated based upon the instructions received and the characteristics of the exemplary processor 100, such as, for example, the pipeline latency of the processor. In a particular embodiment, the aggregation factor may be determined based on number of the registers used by the instructions of a program loop, which may be determined by a compiler of the source code. It will be appreciated that the aggregation factor may be determined by other components, such as, for example, the number of available extended registers.

For each of the instructions received from the instruction fetch unit 101, hereinafter designated as primary instructions, in one embodiment, the instruction dispatch unit 102 dispatches the respective instruction to one or more iteration units 103-106. For each of the primary instructions received from the dispatch unit 102, one or more of the iteration units 103-106 generates one or more secondary instructions that perform one or more program loop iterations of the task of the primary instruction received. Secondary instructions may extended registers that are not available to the source code level, which will be described in details further below. Thereafter, each of the secondary instructions may be executed by one of the execution units 107-110. When a single iteration unit is paired with multiple execution units, multiple instructions can be sent to the execution units in parallel. Results of the executions in parallel may arrive at relatively the same time. As a result, more execution units can be utilized in parallel than conventional architectures.

According to one embodiment, the architected registers 111-113 may be accessible at runtime by an operating system. In one embodiment, the operating system may be required to operate in a supervisory mode when accessing the registers. In one embodiment, when the operating system performs a context switch among multiple threads, the operating system may access the registers to save the content of the registers, including the static and dynamic registers, before switching from one thread to another. Note that the static registers and dynamic registers may be a part of an architected register set of the processor. The static and dynamic registers are also referred to herein as architected static registers and architected dynamic registers. The content of the static and dynamic registers may be retrieved from the processor and saved in a memory location of the operating system before the context switch. The saved content of the static and dynamic registers may be retrieved from the memory of the operating system and restored in the respective registers in the processor after the original thread is switched back.

According to one embodiment, only those primary instructions that require iteration may be dispatched to the iteration units, while other normal primary instructions may be dispatched directly to the execution units without invoking the iteration units, as shown in FIG. 1B according to an alternative embodiment of the invention. Referring to FIG. 1B, iterated instructions recognized by the dispatch unit 102 may be dispatched to the iteration units 103-106, as illustrated in solid lines, while other normal instructions that are not automatically iterated may be dispatched to the execution units 107-110, optionally via respective issue units (e.g., issue queues) 120-123, as illustrated in dash lines.

According to a further embodiment, the exemplary processor may further include formal state registers and informal state registers (not shown). In one embodiment, the formal state registers may be used to retain the formal state of the iteration process, while informal state registers may be used to retain the immediately available state of the iteration process, per instructions that have been generated, but not yet executed. The values stored in the informal state registers are presumed to be valid unless an exception or branch mispredict occurs during the loop aggregation. It will be appreciated that some well-known components are not shown in order not to obscure embodiments of the present invention in unnecessary detail.

Exemplary Dynamic Loop Aggregation

Compile-time loop unrolling is normally an intricate process requiring analysis of the loop structure and dependencies between variables and operations; a task ideally suited for a compiler. According to one embodiment, a macroscalar compiler stops short of actually using the results of this analysis to unroll the loop. Instead, the compiler uses this information to insert directives into the code image to identify vector and sequence blocks, allowing a macroscalar processor to dynamically aggregate iterations of the loop at execution time, thereby improving the optimal utilization of processing resources for that specific processor.

Instead of attempting to extract instruction-level parallelism from scalar code, dynamic aggregation explicitly generates instruction-level parallelism, except where this is explicitly forbidden. This permits multiple execution units to be leveraged more readily, and reduces data dependencies that otherwise limit the number of instructions the processor can execute per cycle. In addition, since the processor has access to run-time conditions unknown to compilers, it is possible to dynamically aggregate loops that cannot be unrolled at compile-time. This permits a much larger body of candidate loops to be aggregated, including loops containing nested if-then-else structures, C-style break or continue statements, inter-iteration dependencies, and aliasing.

In one embodiment, the dynamic loop aggregation is achieved by issuing each instruction iteratively (for vector blocks), or each block of instructions (for sequence blocks)

multiple times, adjusting the extended registers associated with dynamic registers referenced by the program code between iterations, which will be described in detail further below. This effectively allows execution of N iterations of the loop in a single pass over the loop body, where N is the aggregation factor calibrated by the processor at execution time. There are N instances of the loop index variable, each copy reflecting the value at a different iteration of the loop. At the loop tail, all N instances of the index variable are adjusted by a factor of N.

FIGS. 2A-2C illustrate static loop aggregation that may be performed by a compiler. Referring to FIGS. 2A-2C, source code 201 contains a structure of a simplified example, corresponding to pseudo code 202, where each pseudo-code statement represents one processor instruction. After aggregating by a factor of 4, the resulting machine executable code generated by the compiler is shown as code 203.

For the purposes of illustration, if multiplication (t0=x0*47) has a latency of 4 cycles, then the result t0 will be available by the time it is used (A[x0]=t0), thus ensuring the processor performs useful work on every cycle. This example demonstrates how replicating operations and iterating through multiple index variables accomplishes loop aggregation, by virtue of the fact that multiple loop iterations are launched in a single pass, keeping the pipeline utilized while the results of earlier instructions are being calculated in time for new instructions to utilize without stalling. The example shown in FIGS. 2A-2C is presented for the purposes of illustration only, it is important to note that the notion of loop aggregation may be accomplished via iterating through multiple instances of a single operation.

Figure 3:
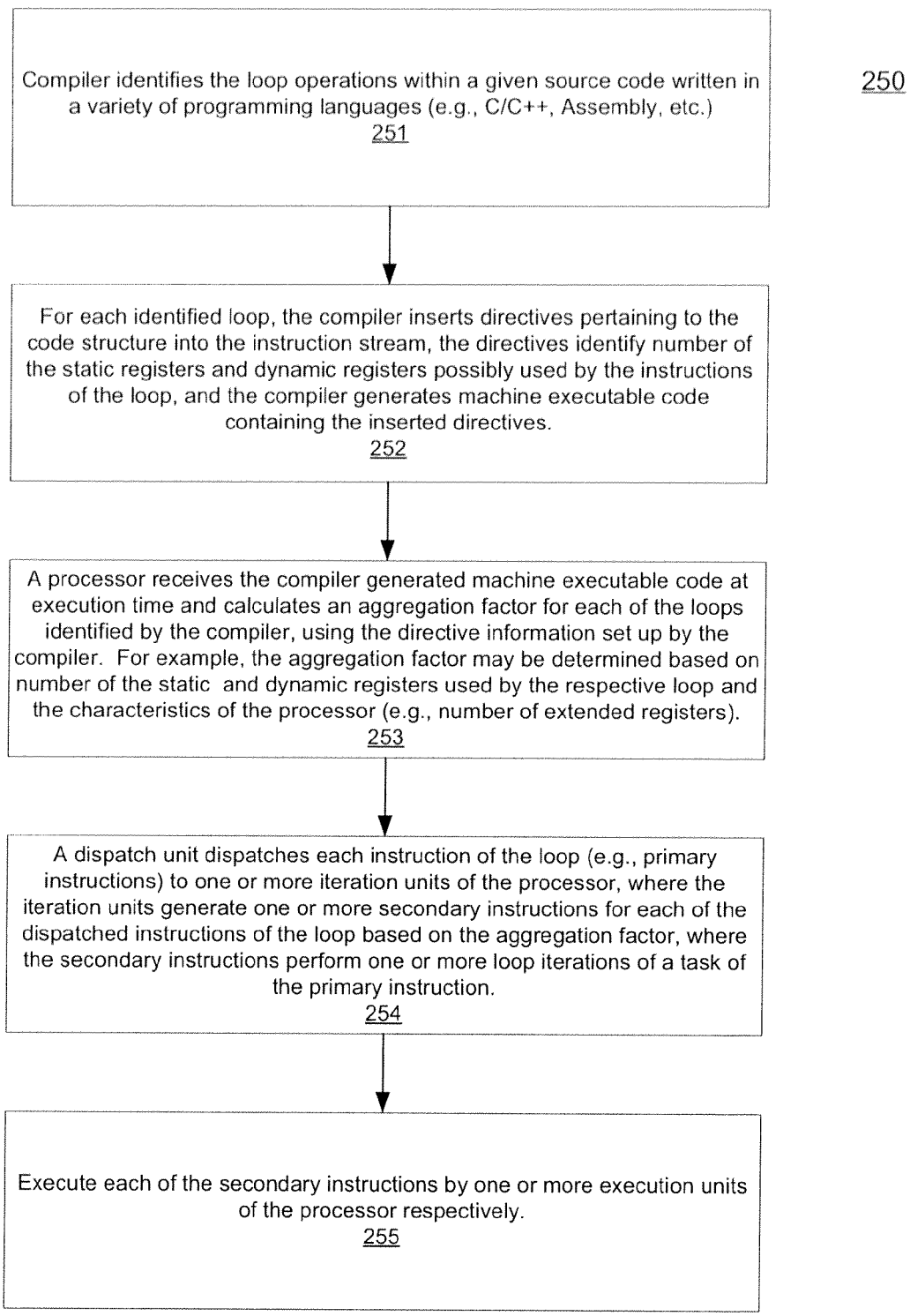
FIG. 3 is a flow diagram illustrating an exemplary loop aggregation process according to one embodiment of the invention.

FIG. 3 is a flow diagram illustrating the interaction between the complier and processor according to one embodiment of the invention. Exemplary process 250 may be performed by different computers. In one embodiment, exemplary process 250 includes, but is not limited to, determining an aggregation factor for iterating primary instructions of a program loop, the aggregation factor being determined at an execution time of the primary instructions, and for each of the primary instructions, generating one or more secondary instructions based on the aggregation factor, the one or more secondary instructions performing one or more iterations of the task of the respective one of the primary instructions.

Referring to FIG. 2B, at block 251, a compiler, such as a C/C++ compiler, identifies one or more loops in a given source code written in a variety of programming languages, such as, for example, C/C++ and assembly. In one embodiment, the source code uses one or more architected registers, such as, for example, AX, BX, etc., of a processor intended to execute the source code (e.g., exemplary processor 100 of FIG. 1A).

For each of the identified loops, at block 252, the compiler inserts one or more directives pertaining to the code structure of the loop and its register utilization into the instruction stream, the directives identifying the usage of the static registers and the dynamic registers. In one embodiment, the dynamic registers may map to extended registers at execution time that are not visible to the source code (e.g., not a part of the architected registers, such as AX, BX, etc.) of the processor. The compiler further generates a machine executable code containing the inserted directives.

At block 253, a dispatch unit of a processor (e.g., dispatch unit 102 of FIG. 1) receives the machine executable code generated by the compiler when the compiler-generated code is about to be executed. At the execution time of each loop identified by the compiler, according to one embodiment, an aggregation factor is calculated or calibrated by the processor for the loop. In one embodiment, the aggregation factor may be determined based on the directive information inserted by the compiler. For example, according to one embodiment, the aggregation factor may be determined based on the number of static and dynamic registers that are used in the loop and the characteristics (e.g., number of extended registers) of the processor executing the instructions. In a particular embodiment, the aggregation factor is calculated by dividing total number of extended registers by number of the dynamic registers that are used at each loop.

According to one embodiment, the aggregation factor may also be determined during other time periods other than the runtime. For example, the aggregation factor may be determined at a compiling time when the corresponding source code is compiled by a compiler. In which case, the compiler is optimized for a particular processor having known information regarding the characteristics of the respective processor. Alternatively, according to a further embodiment, the aggregation factor may be embedded (e.g., stored in a ROM or hard-wired) within the processor. Other configurations may exist.

At block 254, the dispatch unit dispatches each of the instructions of the loop to one or more iteration units (e.g., iteration units 103-106 of FIG. 1A). Each of the iteration units generates one or more secondary instructions from the primary instructions based on the aggregation factor, where the secondary instructions perform one or more loop iterations of a task of the respective primary instructions. In one embodiment, the number of iterations is determined based on the aggregation factor. In a particular embodiment, the number of iterations equals to the aggregation factor.

Thereafter, at block 255, each of the secondary instructions is executed by one or more execution units (e.g., execution units 107-110 of FIG. 1A). In one embodiment, multiple execution units execute multiple secondary instructions in parallel. The results of the multiple execution units may arrive at relatively the same time. Other operations apparent to those with ordinary skill in the art may be included.

Figure 4:
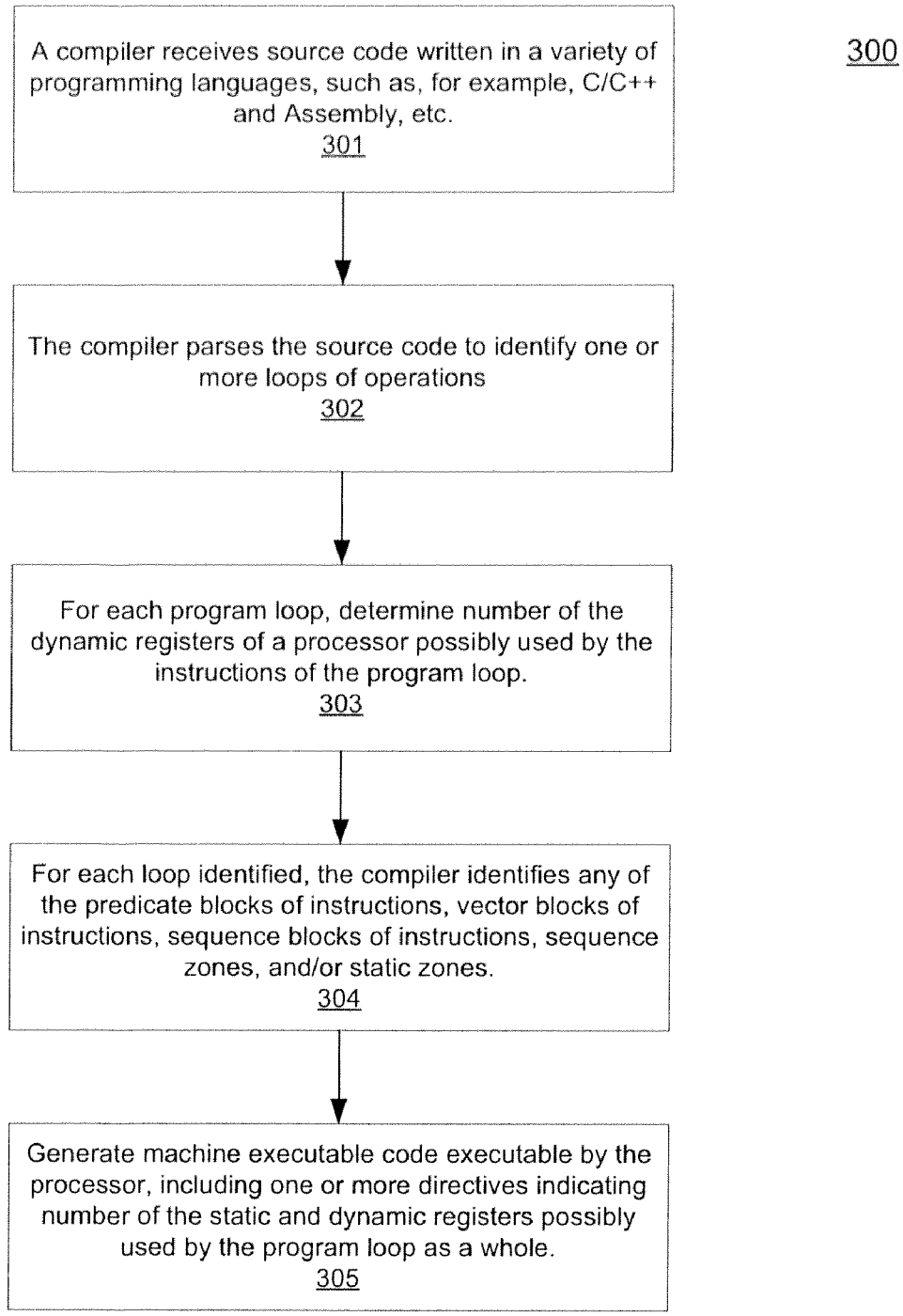
FIG. 4 is a flow diagram illustrating an exemplary process for compiling a source code according to one embodiment of the invention.

FIG. 4 is a flow diagram illustrating an exemplary process for compiling a source code according to one embodiment of the invention. Exemplary process 300 may be performed by a processing logic that may comprise hardware (circuitry, dedicated logic, etc.), software (such as is run on a dedicated machine), or a combination of both. Exemplary process 300 may be a part of operations involved in blocks 251 and 252 of FIG. 3. In one embodiment, exemplary process 300 includes, but is not limited to, parsing a source code to identify one or more program loops, for each of the identified program loops, inserting one or more directives indicating the number of static registers and dynamic registers of a processor that are possibly used by the respective loop and generating a machine executable code executable by the processor, the machine executable code includes the inserted directives.

Referring to FIG. 4, at block 301, a compiler receives a source code written in a variety of programming languages, such as C/C++ or assembly, etc. At block 302, the compiler parses the source code to identify one or more loops of operations. At block 303, the compiler identifies the number of dynamic registers. Dynamic registers are those whose values are local and unique to an individual iteration of the loop, and not used by other iterations.

At block 304, for each identified loop, the compiler identifies any of the predicate blocks, vector blocks, sequence blocks of instructions, or sequence zones of instructions, where the sequence zones may further include zero or more static zones, which will be described in detail further below.

Thereafter, at block 305, the compiler generates a machine executable code executable by the processor, that implements the operations of the vector blocks, predicate blocks, sequence blocks and zones, and static zones, including code that describes the number of static and dynamic registers used by the loop as a whole. Other operations apparent to those with ordinary skill in the art may be included.

Note that for the purposes of illustration, a compiler is used as an example to perform the above processes. It will be appreciated that the above processes may also be performed by other components when the program loop is created, such as, for example, a linker, an assembler, or a software developer.

Exemplary Register Model

In one embodiment, a processor incorporates a much larger number of registers than a conventional processor, to support the dynamic loop aggregation. In a particular embodiment, the number of architected registers available to non-aggregated code remains 32. In addition to the general-purpose and floating-point registers, an embodiment of the processor also includes a set of predicate registers, used to store Boolean results and permit the elimination of branches from inner program loops.

Referring back to FIG. 1A, according to one embodiment, the architected registers 111-113 may include one or more static registers 114-116 and one or more dynamic registers 117-119 respectively. Static registers 114-116 are those visible to the source code of a program, such as, AX, BX, etc. That is, the static registers are those recognizable by an ordinary software developer when he/she writes the source code using a variety of programming languages, such as, for example, C/C++ and Assembly, provided from a variety of vendors. The extended registers (not shown) are those used internally by the exemplary processor 100, which typically are not visible to the source code or the developer. In one embodiment, some or all of the extended registers may be used for aggregating a program loop of the source code at the execution time when the source code is executed.

In one embodiment, the predicate registers may be used to store one or more predicate conditions for a predicate block of instructions, where zero or one of the predicate block of instructions may be executed based on the state of one or more of the predicate registers.

Figure 5:
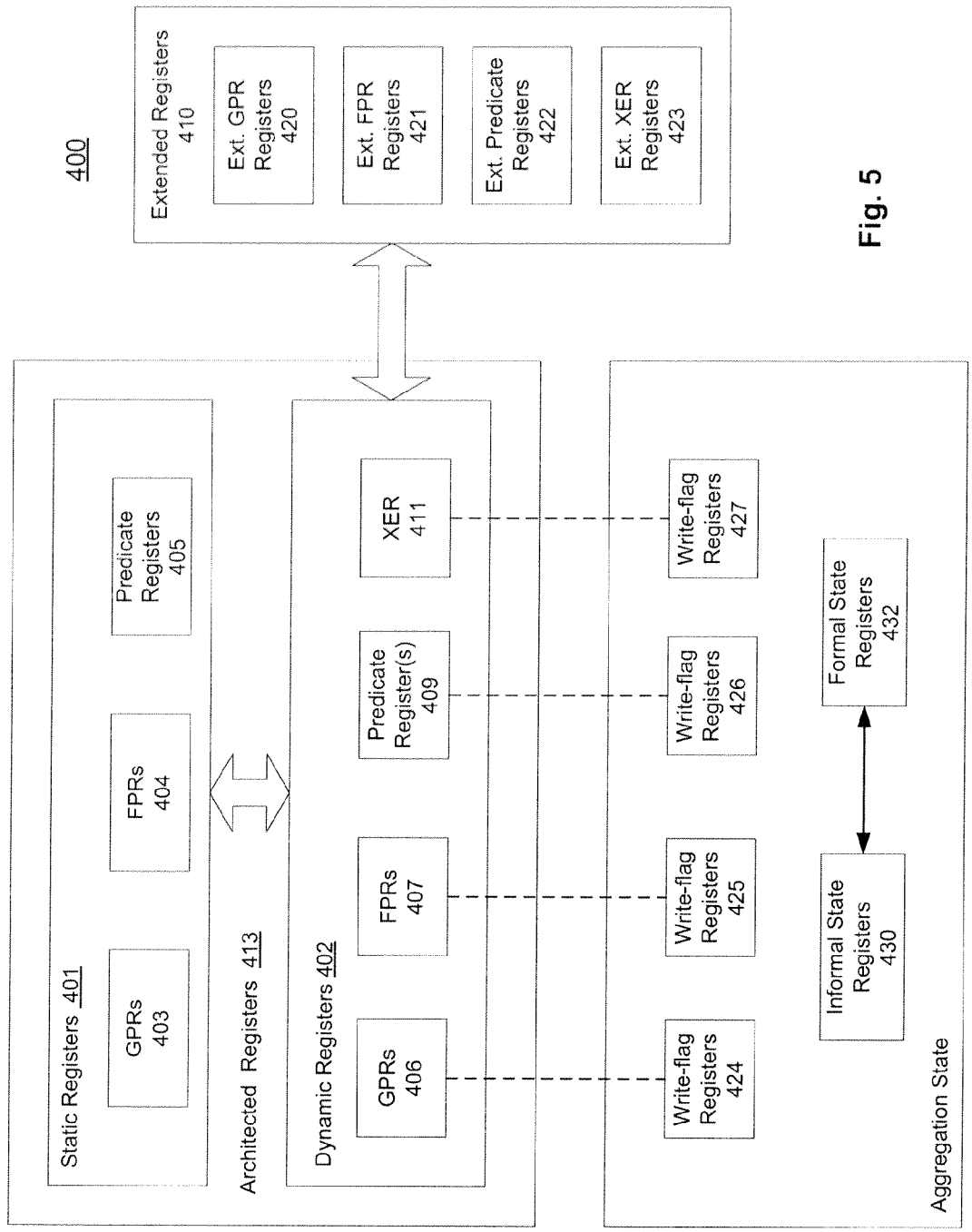
FIGS. 5 and 6 are block diagrams illustrating an exemplary register file according to certain embodiments of the invention.

FIG. 5 is a block diagram illustrating an exemplary register configuration according to one embodiment of the invention. In one embodiment, exemplary register configuration 400 includes, but is not limited to, static register set 401 and dynamic register set 402, which may be a part of an architected register set 413, similar to the architected registers 111-113 of FIGS. 1A and 1B. Architected register set 413 includes those registers visible to the source code of a program, such as, AX, BX, etc. That is, the architected registers are those recognizable by an ordinary software developer when he/she writes the source code using a variety of programming languages, such as, for example, C/C++ and Assembly, provided from a variety of vendors. The extended register set 410 includes those registers used internally by the processor, which typically are not visible to the source code or the developer.

Architected static register set typically includes general-purpose registers (GPRs) 403, floating point registers (FPRs) 404, and predicate registers 405. Similarly, according to one embodiment, architected dynamic register set 402 includes GPRs 406, FPRs 407, and predicate registers 409.

Furthermore, dynamic register set 402 may optionally include XER register(s) 411 for carry, overflow, and/or summary overflow bits information. Static register set 401 and dynamic register set 402 may also referred to as an architected register set 413.

In one embodiment, predicate registers 405 and 409 are single-bit registers that hold Boolean values. There are new instructions that generate predicates (compares), operate on them (logical operations) and use them (predicated operations). In one embodiment, dynamic loop aggregation requires one predicate register per iteration, so the absolute minimum number of predicate registers is determined by the maximum aggregation factor for a given processor.

Further, according to one embodiment, for each of the dynamic registers 406, 407, 409, and 411, there is a write-flags register (e.g., write-flag registers 424-426 respectively) associated with the respective dynamic register. For example, if GPRs 406 include 32 GPR registers, the write-flags registers 424 may include 32 registers, where each of the write-flags registers 424 corresponds to each of the GPRs 406 respectively. The write-flags registers 424-427 may be used to handle iteration control operations during a loop aggregation, which will be described in detail further below. Each write-flag register includes an array of bits (write-flags) that designate whether the corresponding dynamic register has been written to in the iteration corresponding to each bit.

For each class of the registers, according to one embodiment, a processor may have any reasonable number of extended registers (e.g., from 32 to 1024) 410, in addition to those available to a conventional processor (e.g., static register set). The extended registers 410 may further include GPR extended registers 420, FPR extended registers 421, predicate extended registers 422, and XER extended registers 423. The extended registers 410 may be a part of a large pool of registers used by loop aggregation to store the contents of multiple aliases of the dynamic registers during the loop aggregation. Each of dynamic registers 402 may have several aliases to extended registers, one for each iteration of the aggregated loop. According to one embodiment, some or all of the extended registers 410 may be dynamically allocated to one or more dynamic registers 402 during the loop aggregation. Although the extended registers 410 include GPR extended registers 420, FPR extended registers 421, predicate extended registers 422, and XER extended registers 423 specifically as shown in FIG. 5, it will be appreciated that these extended registers 420-423 may be allocated from a type-less pool of extended registers, particularly, at runtime as needed (e.g., on-demand). That is, the extended registers 410 may be shared by multiple types of dynamic registers, such as GPRs 406, FPRs 407, predicate registers 409, and/or XERs 411, etc. For example, during a program loop aggregation, dependent upon the aggregation factor, which is determined at runtime of the program loop, some or all of the GPR extended registers 420 may be allocated to one or more GPR dynamic registers 406 and some or all of the FPR extended registers 421 may be allocated to one or more FPR dynamic registers 407 for iterations. In one embodiment, extended FPR's and GPR's may be shared from a common extended register pool. The number of the extended registers associated with a dynamic register may be dynamically determined based on the aggregation factor. At the end of the loop aggregation, according one embodiment, the multiple extended registers that may be associated with a given dynamic register may be consolidated to the dynamic register, which will be described further below. It will be appreciated that the extended registers 410 may also include extended registers for other types of dynamic registers.

Furthermore, exemplary register configuration 400 may further include one or more informal state registers 430 and formal state registers 432. The formal state registers may be used to retain the formal state of the iteration process, while informal state registers may be used to retain immediately available state information, as per instructions that have been generated, but not yet executed. The values stored in the informal state registers are presumed to be valid unless an exception or branch mispredict occurs during the loop aggregation.

Figure 6:
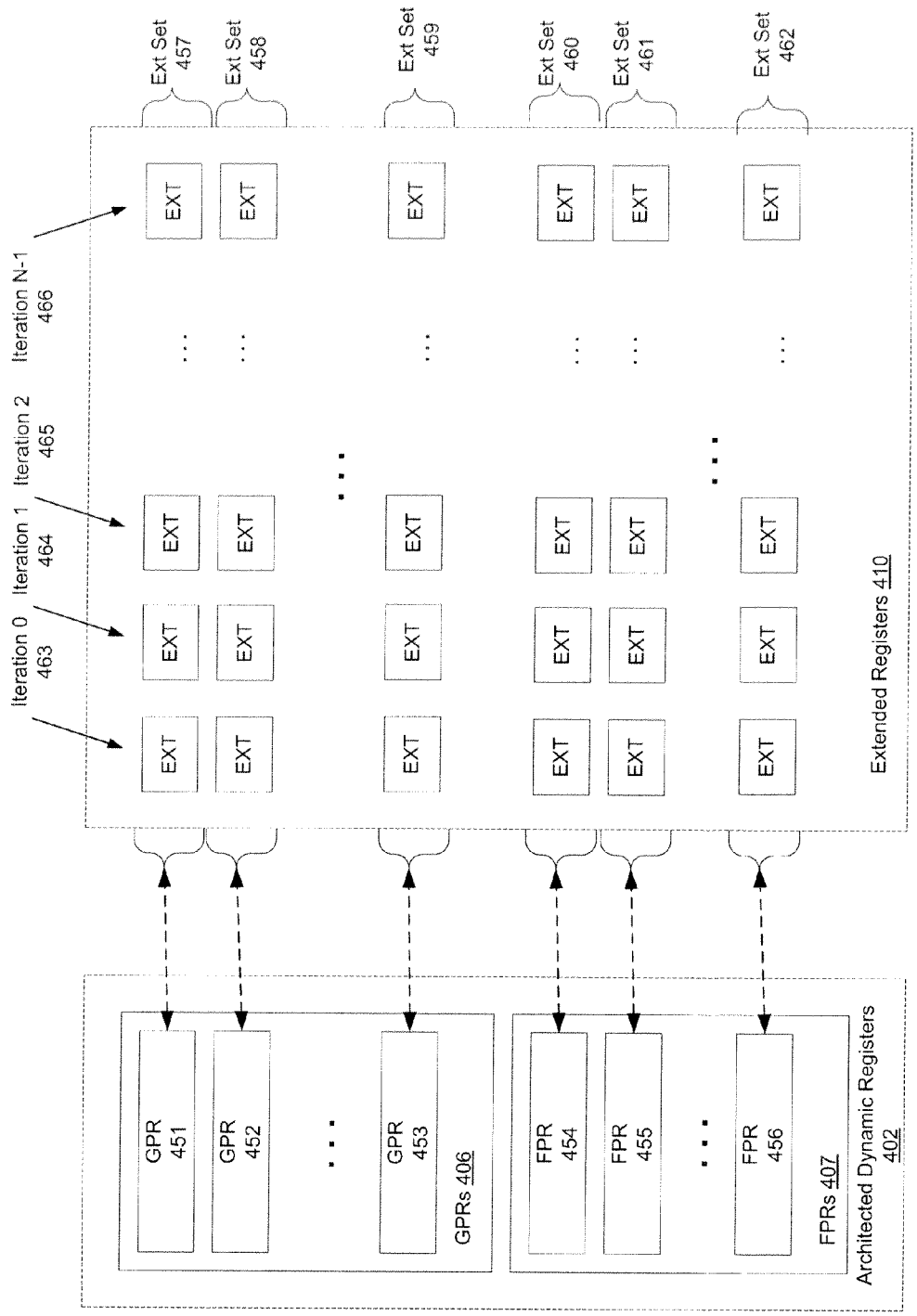

FIG. 6 is a block diagram illustrating an exemplary register set for dynamic loop aggregation according to an alternative embodiment of the invention. Referring to FIG. 4B, for each of the GPR registers 451-453 used in a program loop, extended register sets 457-459 are allocated dynamically for the GPR registers 451-453 respectively, based in part on the aggregation factor. Similarly, for each of the FPR registers 454-456 used in a program loop, extended register sets 460-462 are allocated dynamically for the GPR registers 454-456 respectively, based in part on the aggregation factor. It will be appreciated that predicate registers and XER registers may also alias to corresponding extended registers in a similar manner.

For example, extended register set 457 is allocated from the extended GPR register pool 410 for the GPR register 451 based on the aggregation factor, which may determine the number of iterations that may be performed for each pass over the body of the loop. The number of the extended registers in the extended register set 457 may vary dependent upon the number of iterations 463-366 for a given program loop. At the end of the aggregation (e.g., the end of the loop), according to one embodiment, one of the registers in the register set 457 may be consolidated back to GPR register 451 (e.g., the architected dynamic register). In addition, according to one embodiment, at the end of the loop aggregation, the extended registers in register sets 457-462 may be released (e.g., de-allocated) back to the extended register pools 410 for the future loop aggregations. It will be appreciated that the extended GPR pool and the extended FPR pool also be a single pool of registers that do not correspond to a fixed type of data.

The number of floating-point, integer, and predicate registers may differ. In one embodiment, these extended registers may be used by dynamic loop aggregation to establish a unique copy of dynamic registers per iteration of the loop that is aggregated. Since the loop aggregation factor is indeed dynamic and determined at execution time, the number of the dynamic or extended registers may be increased or decreased for any particular version of the processor, without affecting the compatibility of legacy binary code.

As demonstrated in the above loop-aggregation example, multiple copies of certain loop variables may be replicated for each iteration to be executed concurrently. Other variables, such as the loop termination value, may be shared between multiple iterations of the loop. Shared registers are designated static registers, since they are not unique between loop iterations. Registers whose scope is unique to a given iteration are designated dynamic registers. Single loop iteration may use more or less registers in total. When loop aggregation is invoked, additional sets of dynamic registers are allocated in the extended register set, one register set (also referred to as a register-frame) per iteration.

Exemplary Loop Aggregation

For the purposes of illustration, according to one embodiment, for a function that uses 25 static registers (within the architected registers 413 of FIG. 5) allocated for constants and other static information, would be allocated from r0 to r24. If the loop requires 5 dynamic registers, these would be allocated from r25 to r29. When dynamic loop aggregation is invoked, any reference to registers above r24 would instead be mapped into the extended register set (e.g., extended register set 410 of FIG. 5), to a location determined by the specific iteration of the loop.

For the example below, a hypothetical processor that contains 32 extended registers would use a loop-aggregation factor of 6. Dynamic loop aggregation would generate 6 iterations of the loop per pass, with dynamic registers occupying a unique dynamic register frame per iteration. This is shown in the following table:

| Type of registers & Iteration Number | Referenced Registers | Actual Registers | Dynamic Offset |
|---|---|---|---|
| Static Registers, All | r00-r24 | r00-r24 | N/A |
| Dynamic, Iteration 0 | r25-r29 | xr00-xr04 | 0 (xr = extended registers) |
| Dynamic, Iteration 1 | r25-r29 | xr05-xr09 | 5 (# dynamic regs = 5) |
| Dynamic, Iteration 2 | r25-r29 | xr10-xr14 | 10 |
| Dynamic, Iteration 3 | r25-r29 | xr15-xr19 | 15 |
| Dynamic, Iteration 4 | r25-r29 | xr20-xr24 | 20 |
| Dynamic, Iteration 5 | r25-r29 | xr25-xr29 | 25 |

In order to communicate the results in extended registers to non-aggregated code, the contents of the appropriate extended registers are copied back to the architected dynamic registers, in this case r25-r29, at the termination of the loop. This process is referred to as a consolidation, which will be described in details further below.

In this example, each instruction would be iterated 6 times (e.g., the aggregation factor). Any GPR number above 24 would be remapped to the appropriate extended register when the instruction was generated. For each new instruction or sequence block, the dynamic offset starts at zero, and increments by 5 (e.g., number of dynamic registers) each time the instruction or block is iterated. When iteration of a particular instruction (or sequence block/zone) is complete, the dynamic offset is reset to zero, and the next instruction or sequence block/zone begins iterating.

FIGS. 7A-7C are block diagrams illustrating an exemplary dynamic loop aggregation according to another embodiment of the invention. For illustrative purposes, assume that the hypothetical processor has a fully pipelined multiplier with an 8-cycle latency for given source code 501 shown in FIG. 7A. A conventional implementation of the loop shown in FIG. 7A is shown as code 502 in FIG. 7B, where pseudo-instructions from the compiled loop are shown on the left as code 504 and the C-code is shown on the right as code 505. K in r0, A[ ] address in r1, B[ ] address in r2, x in r4, r5 is a temporary variable.

An embodiment of a macroscalar implementation of this loop is shown in FIG. 7C, where pseudo-instructions from the compiled loop are shown on the left as code 506 and pseudo-instructions generated by dynamic aggregation are shown on the right as code 507. K in r0, A[ ] address in r1, B[ ] address in r2, x in r4, r5 is a temporary variable. Registers r0, r1, r2, r3 are static registers and registers r4, r5 are dynamic registers. As described above, the macroscalar code is similar to the conventional code. For an aggregation factor of one, the instructions in the macroscalar loop will be executed in the same manner as the conventional loop. Using an aggregation factor of 8, results of the multiplications become available just in time to prevent stalling, ensuring that useful work is performed on every cycle.

Exemplary Flow Control Model

Within the body of a loop that is dynamically aggregated, according to one embodiment, there may be a serialization penalty for branching. In place of branching, compound predication selects which primary instructions, if any, will be dispatched based on the state of multiple Boolean predicate registers. Compound predication is a flexible mechanism that selects one of the multiple subsequent instructions based on the state of the predicates. If none of the instructions are selected, a default secondary instruction may be dispatched instead, or alternatively no secondary instruction may be dispatched. This allows a variety of forms of nested if-else blocks to be implemented without branching. In one embodiment, the compound predication mechanism may be implemented as a part of the instruction dispatch unit, such as, for example, dispatch unit 102 of FIG. 1A.

If the predicate registers required to resolve compound predication are not available at dispatch time due to a data dependencies, dispatch may stall until the dependencies are resolved. This is usually not a factor within vector blocks, since results should be available long before they are needed. It is useful to note that only the instruction to be executed is issued, thereby conserving bandwidth to the execution units. For sequence blocks, there are some single-predicate mechanisms that can invoke limited predication at execution time, rather than dispatch time, increasing efficiency in sequence blocks.

Exemplary Dispatch Model

Figure 8:
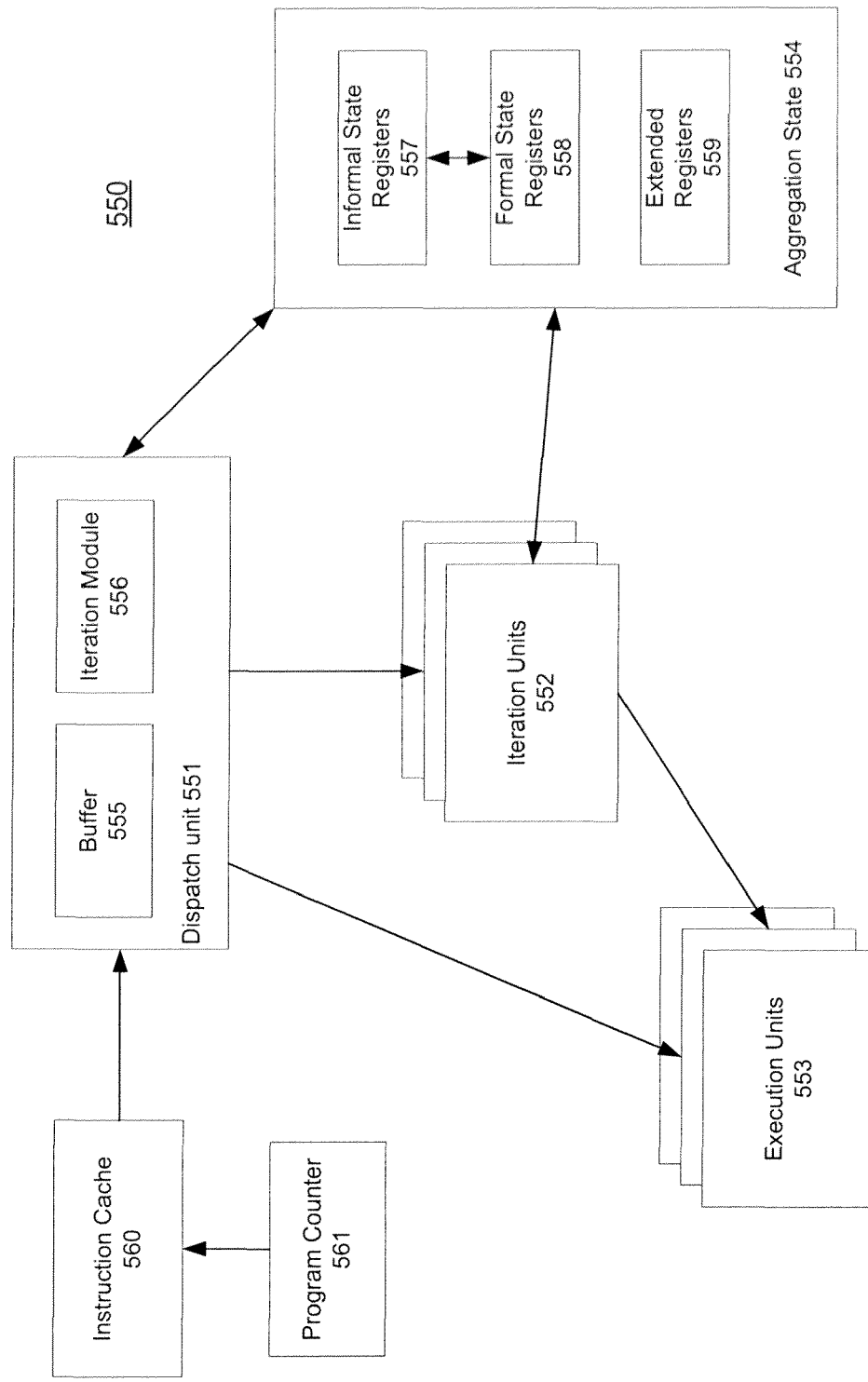
FIG. 8 is a block diagram illustrating an exemplary instruction dispatch mechanism according to one embodiment of the invention.

In one embodiment, an instruction dispatch-iteration unit is where compound predication occurs. FIG. 8 is a block diagram illustrating an exemplary dispatch configuration according to one embodiment of the invention. In one embodiment, exemplary configuration 550 includes, but is not limited to, dispatch unit 551 having a receiving buffer to receive instructions from the instruction cache 560, which is controlled by the program counter 561. The dispatch unit 551 further includes an iteration module 556 associated with the dispatch unit 551. The dispatch unit 551 dispatches instructions to one or more iteration units 552 and/or execution units 553.

In addition, the exemplary dispatch configuration 550 further includes state registers 554 to store the state information during a loop aggregation. The aggregation state 554 may include informal state registers 557, formal state registers 558, and/or extended registers 559.

In one embodiment, the dispatch unit includes an iteration mechanism that may determine an aggregation factor based on the directive information passed from a compiler. In a particular embodiment, the dispatch-iteration mechanism uses a lookup table to determine the aggregation factor. It will be appreciated that other units, such as, for example, iterations units of the processor, may perform the determination of the aggregation factor.

In one embodiment, the dispatch-iteration unit functions both a dispatch unit and also an execution unit, for example, with its own issue queue and instruction completion/commitment unit. Unlike other execution units, certain instructions may have an immediate affect on how subsequent instructions are dispatched/iterated. Since it is undesirable to stall dispatch-iteration of further instructions until the instruction can be formally committed, the dispatch-iteration unit may have an informal state, stored in informal state registers 557, in addition to the formal state registers 558. Dispatch-altering secondary instructions alter the informal state as they are dispatched, allowing the dispatch-iteration unit 551 to use the results of these instructions immediately. Based upon the commitment model of the processor implementation, the formal state of the dispatch-iteration unit 551 is updated when these instructions commit (by the commitment unit). The informal state is utilized to control the behavior of the dispatch-iteration unit whenever it is valid; otherwise the formal state is used. The informal state is invalidated only if an exception or branch mispredict occurs, and thus is the primary state used under normal conditions.

As instructions are decoded, they are posted to individual iteration units (e.g., iteration units 103-106 of FIG. 1A), which iterate instructions and dispatch them to specific execution units, adjusting register references per iteration in the process. It will be appreciated that the iteration units may also have the same qualities of the dispatch-iteration unit, with respect to iteration, formal/informal state, interrupts, etc.

In one embodiment, the receiving buffer 555 of the dispatch-iteration unit 551 may be a 64-entry circular buffer. However, more or less entries may be implemented. Decoded instructions from the fetch stream (e.g., instruction cache 560) are placed into the receiving buffer 555. The number of entries in this buffer determines the largest number of instructions permitted in a sequence block. During dynamic loop aggregation, each instruction, or group of instructions, is iterated the number of times specified by the aggregation factor. At the end of a pass, when all instructions have been iterated the proper number of times, there is a conditional branch back to the top of the loop, where another pass of iterations begins.

Figure 11:
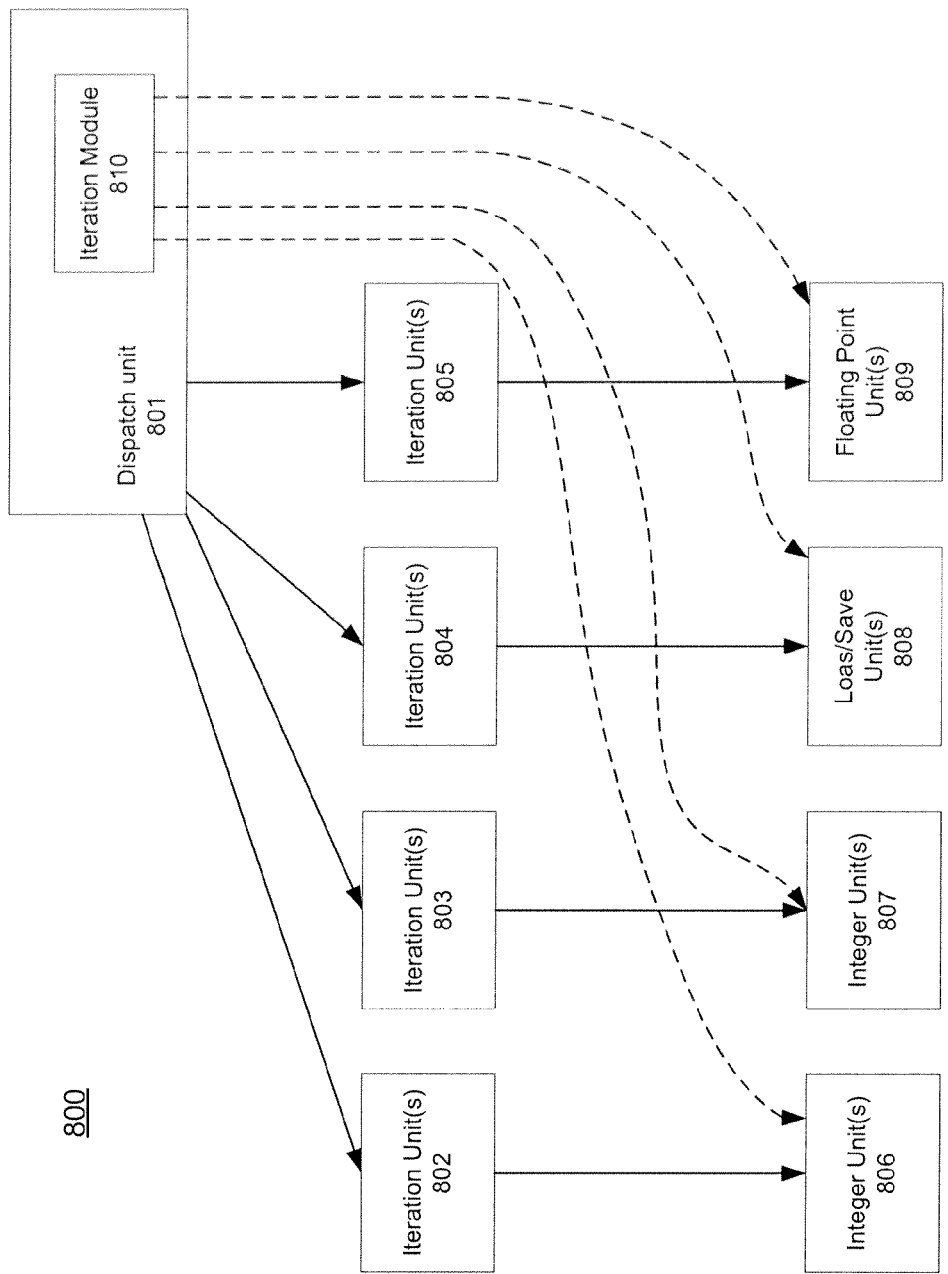
FIG. 11 is a block diagram illustrating an exemplary dispatching configuration according to one embodiment of the invention.

According to one embodiment, if it is determined that a block of instructions of a program loop are invalid for a sequence block, such as, for example, containing a nested loop or subroutine call, a sequence zone is defined by the compiler. Within the defined sequence zone, the instructions are fetched from the instruction cache 560 using the program counter 561 and dispatched to the iteration units 552 and/or execution units 553. Since these sequence zones are still considered part of the aggregation process, a sequence zone is iterated multiple times, based on the aggregation factor, and references to dynamic registers are aliased to the correct extended register per the iteration number. FIG. 11 is a block diagram of an exemplary dispatching mechanism according to an alternatively embodiment of the invention.

When an expansion prefix is encountered during instruction decode, the prefix and subsequent instruction are combined into a single new internal operation. For the purpose of exceptions and interrupts, the address of this operation is the address of the prefix instruction, allowing execution to be resumed at the proper location after an exception.

Since software (e.g., source code) is unaware of the number of extended registers in a given processor, according to one embodiment, the processor calibrates the loop to be aggregated, based on the number and types or registers used. The loop aggregation factor calibrated by the processor is saved in the formal state of the dispatch-iteration and iteration units, along with the register usage information specified for a given loop, which is subsequently used by the dispatch-iteration unit to realize which registers are static or dynamic. Software may also be aware of the loop-aggregation factor if it is to execute properly, so that it may adjust the loop indices properly.

Exemplary Aggregation Factor Calibration

In one embodiment, the calibration instruction includes a pair of instructions as follows:

static R,P,F dynamic rD,R,P,F

In one embodiment, the "static" instruction specifies the numbers of static general-purpose, predicate, and floating-point registers as constants for the loop to be aggregated. The "dynamic" instruction specifies the numbers of dynamic general-purpose, predicate, and floating-point registers. If a loop doesn't use any dynamic floating-point registers, that field may be set to zero. The processor returns the calibrated loop-aggregation factor in general-purpose register rD. Note that the names of the instructions are used for the purposes of illustration only. Other names may be used.

Since the instruction immediately following calibration is an iterated instruction, according to one embodiment, the dispatch-iteration unit may update its informal state when these instructions are dispatch-iterated, rather than stall further dispatch until these instructions execute. As a result, according to one embodiment, the aggregation factor may be calculated twice, once for immediate use, and once to update the formal state.

In one embodiment, the aggregation factor is calibrated by dividing the total number of extended registers of a given type by the number of dynamic registers of that type required by the loop. It is recommended that the division be performed via a look-up table in the dispatch-iteration unit, or other high-speed circuitry dedicated for this purpose. The integer result is the maximum aggregation factor that registers of a given type are capable of supporting.

In addition, according to one embodiment, there are special-purpose registers (SPR's) that can be used to limit the maximum dynamic aggregation factor used by the processor, which limits the result calibrated by the instructions above. A user-mode SPR may be used for debugging purposes where an aggregation factor of one is desired, such as single-stepping using a debugger, or to verify that a particular bug is not sensitive to the aggregation factor. A value of zero in this register denotes no limit, and is the general-case.

In one embodiment, a supervisor mode SPR may be used to set the maximum aggregation factor for system-level purposes, either globally or per thread. This allows the operating system to set limits on aggregation factors to fine-tune system performance. A value of zero in this register denotes no limit.

In one embodiment, another supervisor mode SPR may be used to set the maximum number of execution units utilized, either globally or per thread. This allows the operating system to set limits on aggregation factors to fine-tune system performance. A value of zero in this register denotes no limit.

The actual aggregation factor that may be used and returned in the destination register, according to one embodiment, is the mathematical minimum of the aggregation factors supported by the three types of registers, the two special-purpose registers, and the maximum aggregation factor that can be supported by other limits inherent to any particular implementation of the processor.

Figure 9:
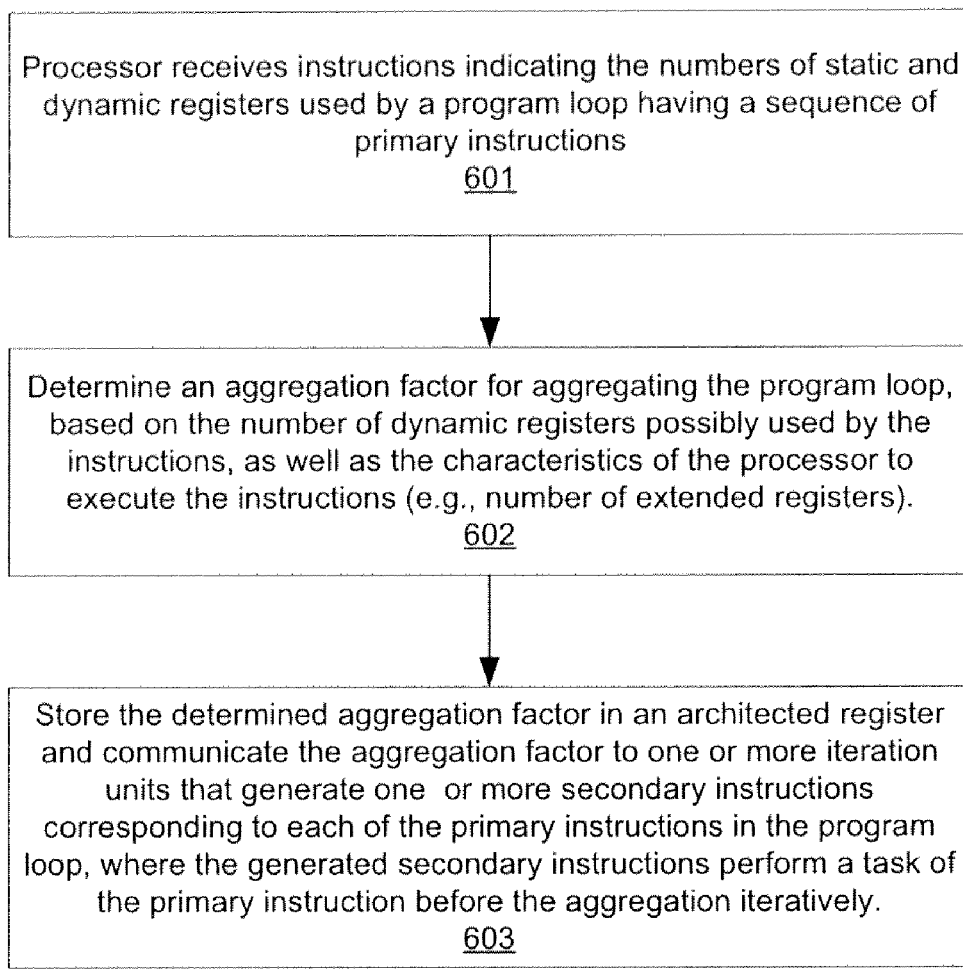
FIG. 9 is a flow diagram illustrating an exemplary process for determining an aggregation factor according to one embodiment of the invention.

FIG. 9 is a flow diagram illustrating an exemplary process for calibrating a loop according to one embodiment of the invention. Exemplary process 600 may be performed by a processing logic that may comprise hardware (circuitry, dedicated logic, etc.), software (such as is run on a dedicated machine), or a combination of both.

In one embodiment, exemplary process 600 may be implemented as operations in response to one or more instructions, such as, "static" and/or "dynamic" instructions described above. In one embodiment, an exemplary instruction, when executed by a processor, causes the processor to perform a series of operations, where the operations include, but are not limited to, recognizing number of static registers and dynamic registers used by one or more primary instructions in a program loop, when the program loop is executed at runtime, and determining an aggregation factor for the program loop based on the number of static and dynamic registers used in the program loop, wherein the aggregation factor is used to aggregate the program loop.

Referring to FIG. 9, at block 601, a dispatch-iteration unit of a processor receives a sequence of instructions of a program loop generated by a compiler, where the sequence of instructions includes the number of static registers and dynamic registers possibly used by the instructions implementing a loop.

At block 602, an aggregation factor is determined for iterating the program loop based on the number of the static and dynamic registers possibly used by the instructions, as well as the characteristics of the processor, such as, for example, the number of extended registers. The aggregation factor may be determined by the dispatch unit. However, other units of the processor, such as iteration units, may perform the determination of the aggregation factor. In one embodiment, the aggregation factor is determined by dividing the total number of the dynamic registers available to the processor with the number of the dynamic registers that are possibly used by the program loop. In a particular embodiment, such a division may be performed via a lookup table or alternatively, by other high-speed circuitries.

At block 603, the aggregation factor is stored in an architected register and is communicated to the iteration units. Alternatively, this value is also maintained internally, within the dispatch-iteration unit, accessible by one or more iteration unit that generates one or more secondary instructions corresponding to selected primary instructions in the program loop, where the secondary instructions perform one or more loop iterations of the task of the primary instruction. Other operations apparent to those with ordinary skill in the art may also be performed.

Exemplary Index Register Initialization

Since dynamic loop aggregation executes multiple iterations of a loop in a single pass, it may be required to have a separate copy of the loop index variable for each iteration. This is efficiently accomplished through an index initialization instruction as follows:

index rD

This instruction loads the values M+0 to M+N−1, into N copies of the dynamic index variable rD, where N is the aggregation factor, and M is the initial value of the indexed register. For example, for a loop aggregated by a factor of five using ten dynamic registers, this might be accomplished by generating a series of instructions as shown below. Dispatching the primary instruction:

index r7

Results in the following sequence of secondary instructions occurring:

addi xr07, r7, 0
addi xr17, r7, 1
addi xr27, r7, 2
addi xr37, r7, 3
addi xr47, r7, 4

The "index" instruction is inherently iterative, based on the previously calculated aggregation factor and dynamic register specifications. This is because this particular instruction does not follow the normal rules for auto-iteration, in that destination register is treated as dynamic, while the source register is treated as static. Note also that the immediate field if the "addi" instruction is modified. It will be appreciated that the names of the instructions are used for the purposes of illustration only. Other names may be used.

Figure 10:
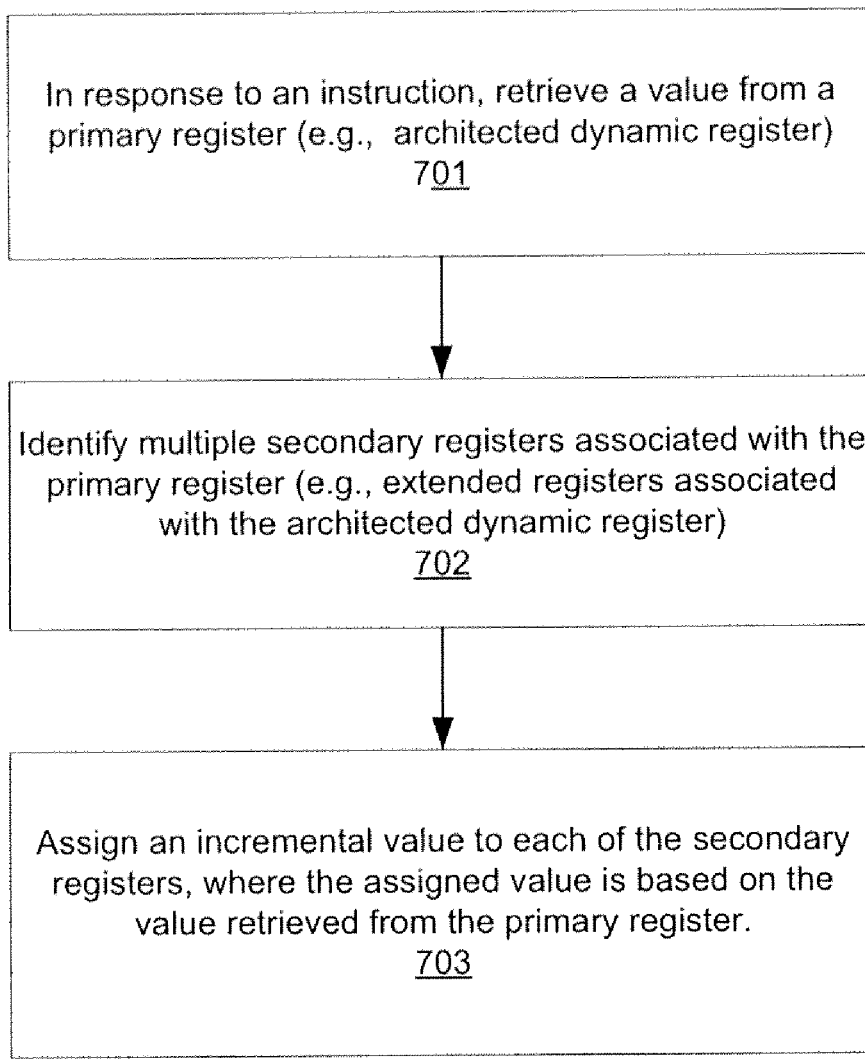
FIG. 10 is a flow diagram illustrating an exemplary process for indexing dynamic registers according to one embodiment of the invention.

FIG. 10 is a flow diagram illustrating an exemplary process for initializing registers for aggregating a program loop according to one embodiment of the invention. In one embodiment, an exemplary instruction 700, when executed by a processor, causes the processor to perform a series of operations, where the operations include, but are not limited to, retrieving a value from a primary register, such as, for example an architected dynamic register (block 701), identifying multiple secondary registers (e.g., extended registers) associated with the primary register (block 702), and assigning incremental values to each of the secondary registers based on the value retrieved from the primary register (block 703), where the secondary registers are used to aggregate a program loop at runtime.

Exemplary Dynamic Spill Registers

During the course of compiling functions written in high-level languages, such as C/C++, it is often possible for the function to require more registers than the number of architected registers contained in the processor. Normally, this problem is solved by spilling register contents to memory between uses, and reading them back into the registers when the values are needed.

Since macroscalar processors require a sequence block to enclose reading and writing of the same memory location within a program loop, spilling registers would undermine the performance benefit of loop aggregation. Since there are large numbers of registers in the processor to support dynamic loop aggregation, according to one embodiment, some of these registers may be used to store the contents of spilled dynamic registers, instead of writing those registers to memory. These registers are referred to as dynamic spill registers and they are unique to the iteration they are referenced in, just as architected dynamic registers are. Since they are not static registers, they do not trigger the need for a sequence block. In one embodiment, the dynamic spill registers may be implemented using the extended registers or other dedicated registers.

In one embodiment, dynamic spill registers may be referenced through a pair of instructions that move data from architected dynamic registers to dynamic spill registers, or from dynamic spill registers to architected dynamic registers. These instructions may be used to move data between any of the architected registers, and effectively extend the number of registers available from the view of the primary instructions. For example, according to one embodiment, the data movement between a dynamic register and a dynamic spill register may be performed in response to the following instruction examples:

MTASR dreg,areg (Move to aggregation spill register)
MFASR dreg,areg (Move from aggregation spill register)

For example, in a processor having 32 architected registers, the register indicated by "areg" may be any of the 32 architected registers, while the register indicated by "dreg" must be a dynamic register. For example:

MTASR r36, r30

The above instruction would take the value in dynamic register r30 and move it to dynamic register r36. Since each r30 has a unique alias for each iteration, this instruction would move multiple aliases of r30 to multiple aliases of r36. This effectively extends the number of registers available for use by the primary loop instructions.

Dynamic spill registers are included in the count of total dynamic registers required by a loop during loop calibration. In an alternative embodiment, the dynamic spill registers may be allocated dynamically at runtime dependent upon a specific system design. The number of the dynamic spill registers needed may be determined by a compiler during the compilation.

Exemplary Vector Block Iteration

According to one embodiment, vector block iteration is controlled by a prefix instruction that causes the subsequent instructions comprising the vector block to be auto-iterated as per the previously established aggregation factor (F). In one embodiment, the number of instructions in the vector block is constantly encoded in the instruction word. According to another embodiment, the number of instructions comprising the vector block is calculated from the offset to the end of the vector block, encoded in the instruction. According to one embodiment, the prefix instruction is used to iterate both vector blocks and sequence blocks, differentiated by a field in the instruction that specifies the type of block. Other configurations may exist within the scope of the present application.

Within vector blocks, each instruction is iterated F times (e.g., the aggregation factor). For each iteration, extended register numbers are adjusted to ensure that each iteration has a unique copy of the dynamic registers. In one embodiment, any predicate blocks within a vector block may be treated as a single instruction for the purposes of auto-iteration.

With the exception of dispatch-iteration unit(s) (e.g., iteration unit 810 of FIG. 11), iteration units are associated with specific types of execution units. A single iteration unit may dispatch secondary instructions to several execution units of the requisite type in parallel, dispatching several iterations of the instruction per cycle. This ensures that when there is an instruction to be iterated, multiple execution units of a given type may be utilized in parallel.

For instance, according to one embodiment, in a processor with four FPU's (floating point units), a single floating-point iteration unit (also referred to herein as an iterator) would dispatch four instructions per cycle, one per FPU. This ensures that all FPU's are utilized, regardless of their number. The smallest number of execution units that may be utilized in parallel determines the aggregate iteration bandwidth of a vector block. For instance, according to one embodiment, if there are four complex integer units and eight simple integer units, the number of complex units is the bottleneck for the block, effectively limiting execution to 4 IPC for dependent integer instructions where complex operations are involved.

In order to properly balance resources, according to one embodiment, a processor containing eight simple integer units would section them into two groups of four, to balance complex integer instruction bandwidths. The first group of four integer units would be used to execute the first integer instruction to be iterated, while the second group could be used to execute iterations of a subsequent integer instruction in parallel. This process is also referred to as concurrent posting.

When loop-aggregation factors are large, the results of an operation will begin to become available, and remain unused, long before the corresponding primary instruction generating them has finished iterating. If the results are destined for a different execution unit, then subsequent instructions may be iterated in parallel with the ongoing iterations. This effectively leverages multiple iteration units concurrently, so long as subsequent instructions are destined for different execution units. Since each iteration unit may dispatch to multiple execution units, this increases IPC greatly.

During loop aggregations, it is possible for instructions that load data from memory to overreach the bounds of data array they are operating on. In such instances, it is possible for an exception to occur. In order to prevent this from interfering with the loop aggregation process, in one embodiment, fatal exceptions are masked and a hidden bit in the destination register is set to indicate the result of this operation is poisoned. Any attempt to use this register for further calculations generates poisoned results. If an attempt is made to consolidate poisoned data, an exception is generated at that time. Any attempt to store poisoned data to a static register or memory also results in an exception. Break instructions predicated on poisoned data are taken, but a poisoned bit in the break flag associated with that iteration is also set. If the break instance that finally terminates the loop is a poisoned one, then an exception is also generated. Other conditions apparent to those with ordinary skill in the art may also be included.

When multiple instructions are posted to multiple iteration units, care may be taken to ensure that subsequent instructions do not get ahead of prior instructions. Otherwise, the program dependencies may be violated potentially resulting in incorrect operation. In order to avoid this problem, according to one embodiment, iteration units are chained together when instructions are posted to them, such that iteration N of one instruction triggers iteration (N−1) of the next instruction, which triggers iteration (N−2) of the next, etc. In this way, primary instructions for a given iteration dispatch in-order, across multiple iteration units, ensuring proper operation. In another embodiment, out-of-order dispatch may be employed to optimize the use of processor resources.

Figure 12:
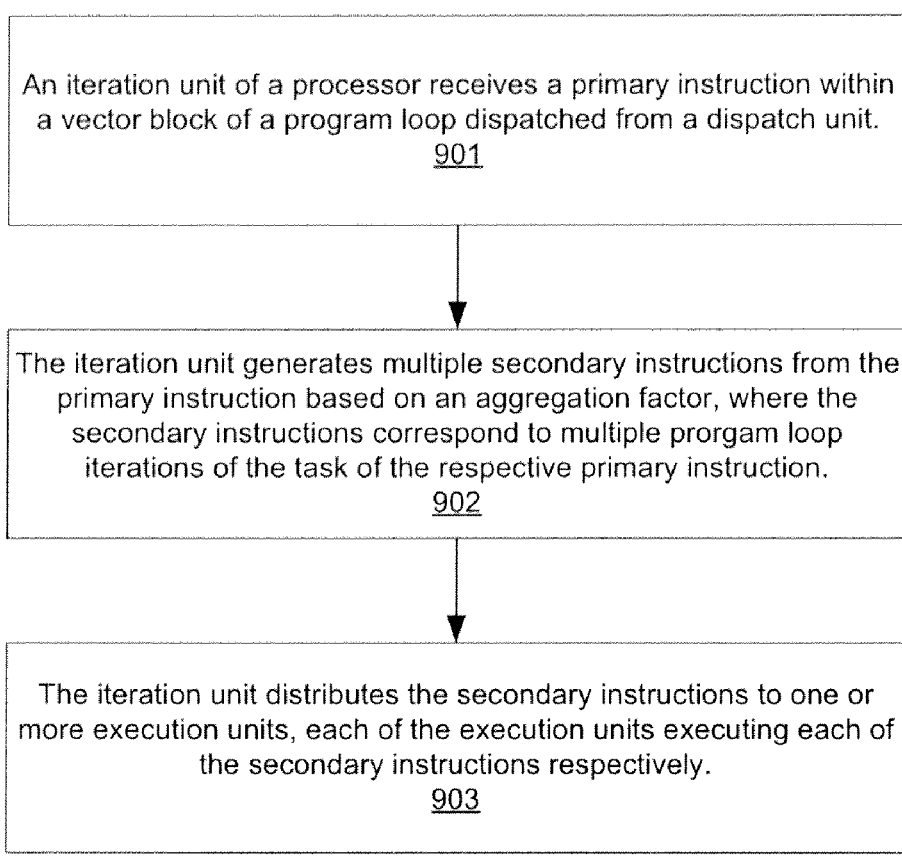
FIG. 12 is a flow diagram illustrating an exemplary process for processing vector blocks of instructions according to one embodiment of the invention.

FIG. 12 is a flow diagram illustrating an exemplary process for processing vector blocks of instructions according to one embodiment of the invention. Exemplary process 900 may be performed by a processing logic that may comprise hardware (circuitry, dedicated logic, etc.), software (such as is run on a dedicated machine), or a combination of both.

Referring to FIG. 12, at block 901, an iteration unit of a processor receives a primary instruction of a vector block of a program loop dispatched from a dispatch unit. At block 902, the iteration unit generates one or more secondary instructions from the primary instruction, where the secondary instructions perform one or more iterations of the task of the primary instruction based on an aggregation factor. In one embodiment, the number of the secondary instructions is relatively equivalent to the aggregation factor.

At block 903, the iteration unit distributes the secondary instructions to one or more execution units, where each of the execution units executes each of the secondary instructions. Other operations apparent to those with ordinary skill in the art may be included.

Exemplary Predicate Block Iteration

In one embodiment, compound-predication blocks count as a single instruction, regardless of the number of instructions that may dynamically select from. For each iteration, a prefix instruction is evaluated, and an appropriate secondary instruction (if any) is generated, based on the primary instruction indicated by the predicate conditions. Dynamic register numbers are adjusted for the predicate registers used by the prefix instruction, as well as the dynamic registers used by any of the instructions.

Since predicate blocks may result in secondary instructions being dispatched to a variety of execution units based on one or more dynamic conditions, predicate blocks may be iterated by the iteration unit located within the dispatch-iteration unit (e.g., iteration unit 810 of FIG. 11), which may dispatch to any execution unit. Regardless of whether an instruction is dispatched, iterations may still occur lock step with other iteration units as previously described. Alternatively, the predicate block instructions may be dispatched via other iteration units, such as iteration units 802-805 of FIG. 11. In this embodiment, the iteration units receive the same predicate block instructions, and generate secondary instructions only for primary instructions that correspond to the execution unit attached to each iteration unit, when the predicate conditions are met. The generated secondary instructions may be executed by one or more execution units.

FIG. 13 is a flow diagram illustrating an exemplary process for processing a predicate block of instructions, according to one embodiment of the invention. Exemplary process 1000 may be performed by a processing logic that may comprise hardware (circuitry, dedicated logic, etc.), software (such as is run on a dedicated machine), or a combination of both. In one embodiment, exemplary process 1000 includes, but is not limited to, identifying a predicate block of instructions of a program loop, the predicate block of instructions including one or more instructions depending on one or more predicate conditions, and dispatching one or none of the instructions of the predicate block as a secondary instruction to an execution unit for execution based on the one or more predicate conditions, while a remainder of the predicate block of instructions is not dispatched.

Referring to FIG. 13, at block 1001, a dispatch unit of a processor identifies a predicate block of instructions within a program loop, where the predicate block includes multiple instructions that depend on one or more predicate conditions. At block 1002, the dispatch unit examines the one or more predicate conditions to determine which one or none of the multiple instructions may be executed. In one embodiment, the one or more predicate conditions are stored in one or more predicate registers, which may be a part of the dynamic registers.

At block 1003, an iteration unit dispatches one or none of the multiple instructions to be executed based on the predicate conditions to an execution unit, while the rest of the multiple instructions are not dispatched. At block 1004, the dispatched instruction, if there is any, is executed by an execution unit. Other operations may be performed.

In an alternative implementation, the predicate registers encode a number having multiple bits, such as, for example, a 3-bit number, that indicates the instruction to be selected from the subsequent list of instructions, and a field in the instruction indicates the following number of instructions to be selected from. This is useful in implementing the C-style "switch" statement.

Exemplary Sequence Block Iteration

For sequence blocks of instructions, simply replicating each instruction in-turn may not correctly aggregate all loops. FIGS. 14A-14C are block diagrams illustrating an exemplary sequence block iteration according to one embodiment of the invention. Referring to FIG. 14A, consider the code example 1101 that finds the largest value in an array. For clarity, variables that represent dynamic registers are preceded with an underscore such as _x.

If the loop example 1101 were to be aggregated simply through instruction auto-iteration, and the variable "large" is contained in a static register, all iterations of a given pass would compare a[x] against the same value of the variable "large". If the variable "large" were contained in a dynamic register, then each iteration would calculate it's own value of the variable "large", independently of other iterations. Because these instructions depend on values written by previous iterations of the loop, there is no choice but to execute these instructions sequentially. In one embodiment, sequence blocks force the processor to execute all of the instructions in the block sequentially for a single iteration, before proceeding with subsequent iterations. Fortunately, most sequences of this nature are small, and usually do not comprise the entire loop body, unlike the example shown in FIG. 14A for the sake of simplicity.

FIG. 14B is a block diagram illustrating an exemplary macroscalar implantation of the loop example 1101 of FIG. 14A, according to one embodiment. For readability, register numbers have been eliminated. Dynamic registers have been designated with an underscore before the name (e.g., _x, _pred, _temp, etc.). All other variables are static registers. The percent "%" sign indicates that the instruction will be iterated, and the brackets { } designate the sequence block, such as block 1103.

Referring to FIG. 14B, the set of brackets { } encompasses the sequence block, which maintains the integrity of the static register for the variable "large", between loop iterations. In one embodiment, whenever a static register is modified, the first read and the last write may be encompassed within a sequence block. In certain embodiments, the size of a sequence block may be less than the size of the circular buffer used to contain sequences of macroscalar instructions for dispatch processing.

In one embodiment, the predicated execution is more efficient than predicated dispatch for predication within sequence blocks, although less capable. This is because predicated execution, by its nature, has a shorter latency from predicate calculation to dependent-instruction execution than predicated dispatch. Normally single instruction auto-iteration covers the latency associated with predicated dispatch, but this is not typically the case within sequence blocks.

According to one embodiment, the size of a sequence block should be less than the size of the circular buffer used to contain sequences of macroscalar instructions for dispatch processing. In one embodiment, the circular buffer includes at least 64 entries. However, more or less entries may be implemented. Other configurations may exist.

As described above, the sequence block in the example shown in FIG. 14A is necessary, since the value of variable "large" could possibly change during each iteration of the loop. However, if the operation being performed is separable and the order of execution between iterations is not critical, according to one embodiment, it is frequently possible for the compiler to perform sequence-block relocation, removing the sequence block to outside the body of the loop. This is the case for common tasks such as addition, subtraction, minimum and maximum operations on arrays.

If the array in the example above has a significantly large amount of entries, such as one million entries, the sequence block in the example above would be processed one million times, sequentially. While it is not possible to remove the sequence block, it is possible to move the sequence block after the completion of the loop. For example, if the aggregation factor for this loop is 20, the instructions can be executed sequentially 20 times after the loop has completed, instead of one million times, with the same effect.

For example, as shown in code example 1104 of FIG. 14C according to one embodiment, notice that instances of variable "large" and variable "position" within the loop body 1106 are now dynamic variables and that the body of the loop is now a vector block (e.g., block 1106). The sequence block 1105 has been modified and moved to the end of the loop 1106. For an aggregation factor of 20, the loop calculates 20 "largest element" partial results for 20 subsets of the million-entry array. After the loop completes execution, the sequence block 1105 after the loop consolidates the 20 partial results into the final result.

Note that this technique appears violate the basic premise that dynamic registers are not shared between iterations of a loop. However, this premise only applies to the dependency analysis that is required to categorize variables as static or dynamic, and reflects the dependencies in the source code. Once this categorization has been made, a compiler is free to create new dependencies between dynamic variables, such as the ones shown in FIG. 14C.

Figure 15:
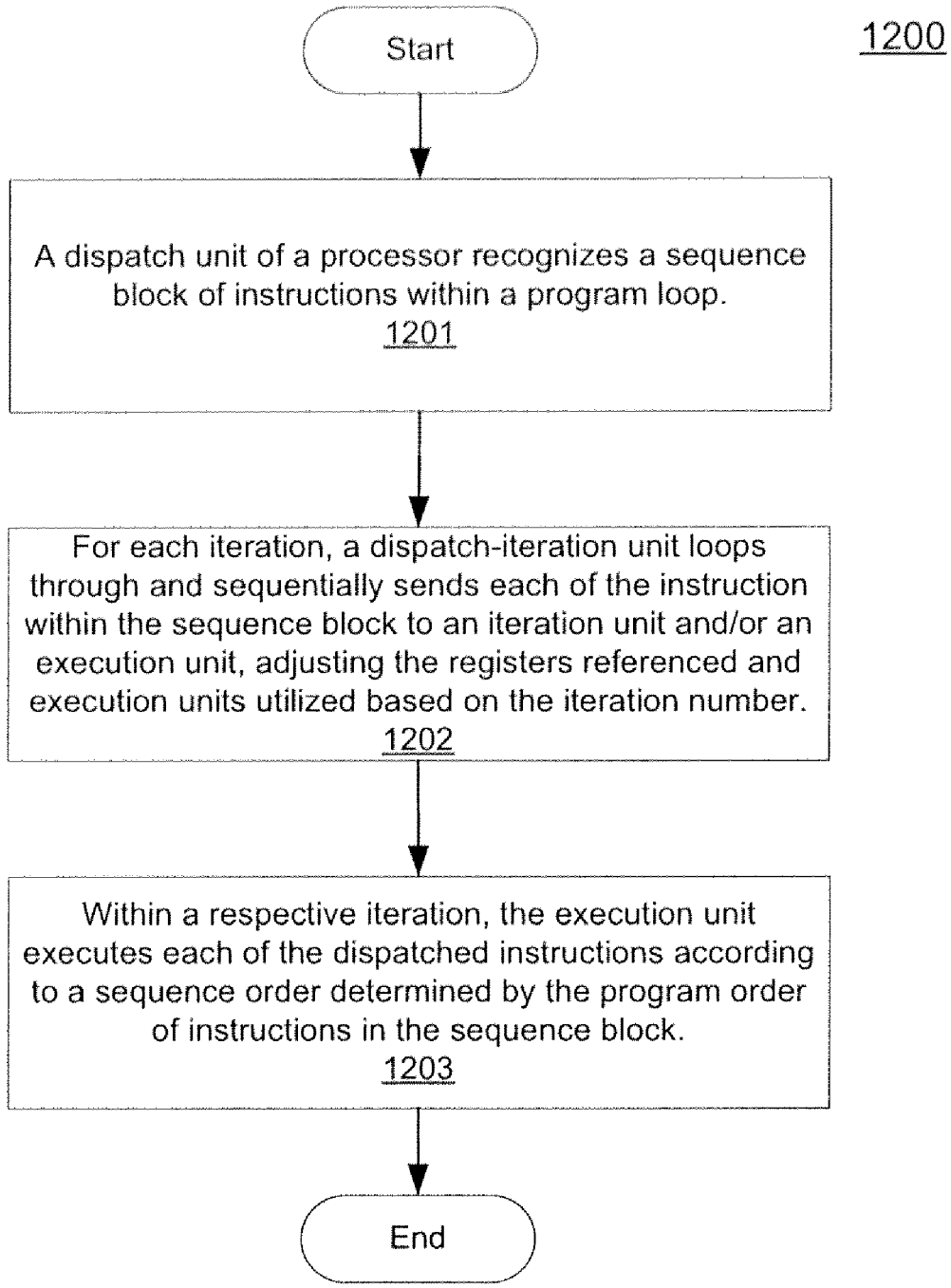
FIG. 15 is a flow diagram illustrating an exemplary process for processing sequence blocks of instructions according to one embodiment of the invention.

FIG. 15 is a flow diagram illustrating an exemplary process for processing sequence blocks of instructions according to one embodiment of the invention. Exemplary process 1200 may be performed by a processing logic that may comprise hardware (circuitry, dedicated logic, etc.), software (such as is run on a dedicated machine), or a combination of both. In one embodiment, exemplary process 1200 includes, but is not limited to, recognizing a sequence block of primary instructions of a program loop, and executing each instruction of the block, in sequence, for each iteration specified by the aggregation factor.

Referring to FIG. 15, at block 1201; a dispatch unit of a processor recognizes a sequence block of instructions within a program loop. In one embodiment, the sequence block may be identified by a compiler when compiling the sequence code. At block 1202, the dispatch-iterator sequentially dispatches each of the instructions within the sequence block to one or more iteration units and/or one or more execution units. The dispatch-iterator may further adjust the extended registers aliased to dynamic register references. At block 1203, within the respective iteration, the execution unit executes each of the dispatched instructions in program order. In one embodiment, for each of the instructions in a sequence block, one or more iterations may be performed, and the sequence block may be iterated until the aggregation factor is satisfied. Other operations apparent to those with ordinary skill in the art may be performed.

Figure 16:
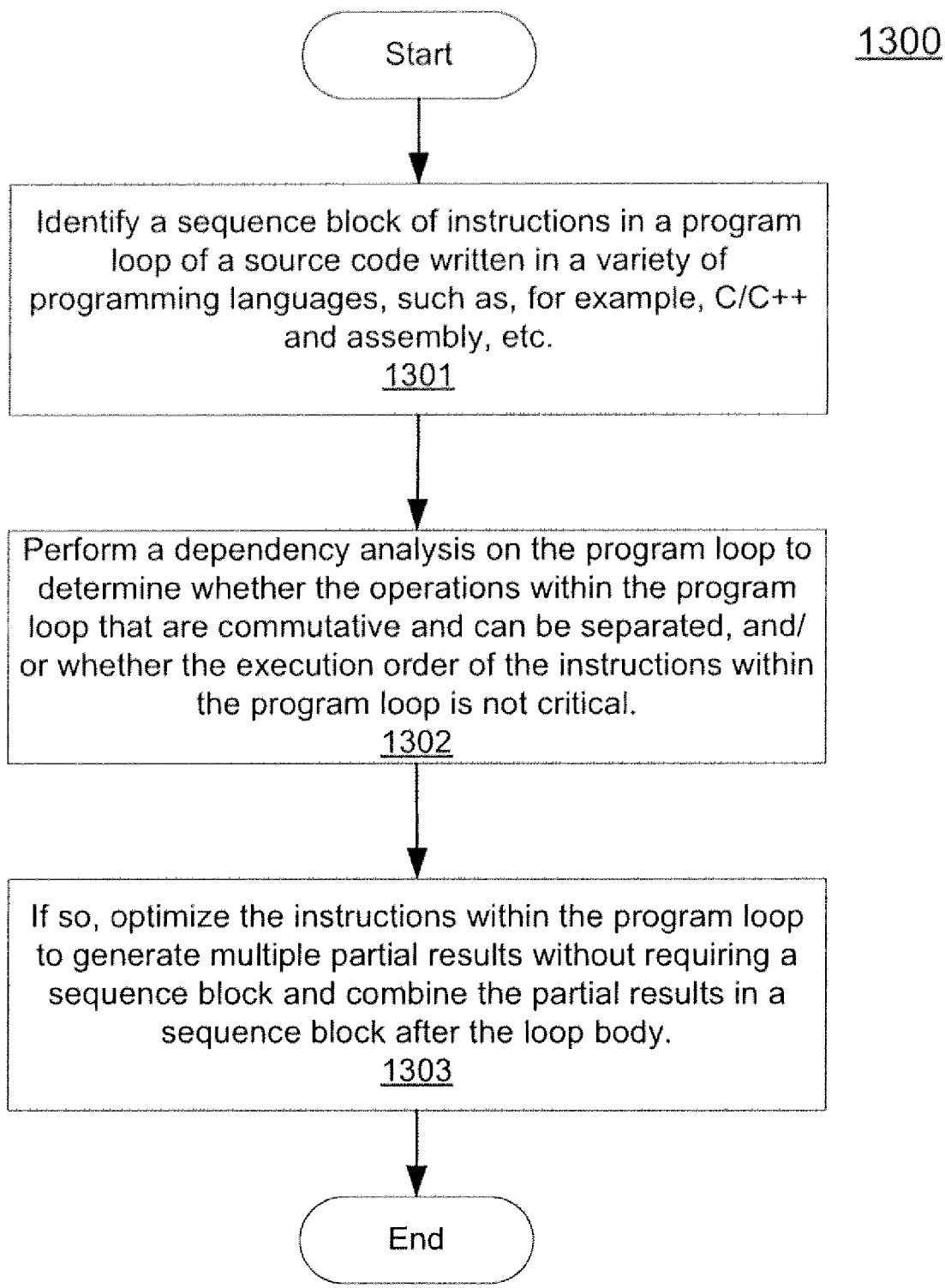
FIG. 16 is a flow diagram illustrating an exemplary process for performing sequence block relocation according to another embodiment of the invention.

FIG. 16 is a flow diagram illustrating an exemplary process for sequence block relocation within a program loop according to one embodiment of the invention. Exemplary process 1300 may be performed by a processing logic that may comprise hardware (circuitry, dedicated logic, etc.), software (such as is run on a dedicated machine), or a combination of both. In one embodiment, the exemplary process 1300 may be performed by a compiler when compiling source code.

Referring to FIG. 16, at block 1301, a sequence block of instructions in a program loop of source code is identified. The source code may be written in a variety of program languages, such as, for example, C/C++ or assembly, etc. At block 1302, a dependency analysis is performed to determine whether the operations within the program loop may be separable and whether the execution order of the instructions within the program loop is not critical (for example, mathematically associative). If so, at block 1303, an optimization is performed on the instructions of the program loop to generate multiple partial results without requiring a sequence block and to combine the partial results in a sequence block after the loop body. Other operations may be performed.

Exemplary Sequence Zones

Sequence blocks are able to control the iteration of short sequences of instructions without overhead. In some instances, it is necessary to have large blocks of instructions that are sequentially executed that contain branches, static zones, or otherwise cannot fit within the limits of a sequence block. For these circumstances, according to one embodiment, sequence zones may be defined, which allow standard PC (program counter) directed fetch/execute behavior within the sequence zone.

In one embodiment, upon entry to a sequence zone, the program counter is pointed to the sequence zone, and used for primary instruction fetch. Secondary instructions are generated for each primary instruction, corresponding to the correct active iteration of the sequence zone. At the end of the sequence zone, the program counter is reset to point to the first instruction of the sequence zone, and the process repeats for the next iteration of the zone. The number of iterations of the sequence zone is controlled by the aggregation factor. Any iteration units that are still iterating vector blocks launched before the sequence zone was entered continue to iterate until they run out. This can occur in parallel with instructions executing in the sequence zone, provided there are no blocking data hazards.

In one embodiment, a sequence zone is defined with a prefix instruction that indicates the relative address of the end of the sequence zone. Once the sequence zone is entered, instructions are fetched in PC-directed (normal) manner until the end of the sequence zone. At the end of the sequence zone, rather than continuing to fetch instructions, fetch/execute is re-directed back to the top of the sequence zone, and the iteration number is incremented. This continues until the sequence zone has been iterated the number of times specified by the aggregation factor. As with sequence blocks, the mapping of dynamic registers to extended registers used is adjusted by the iteration number.

Figure 17:
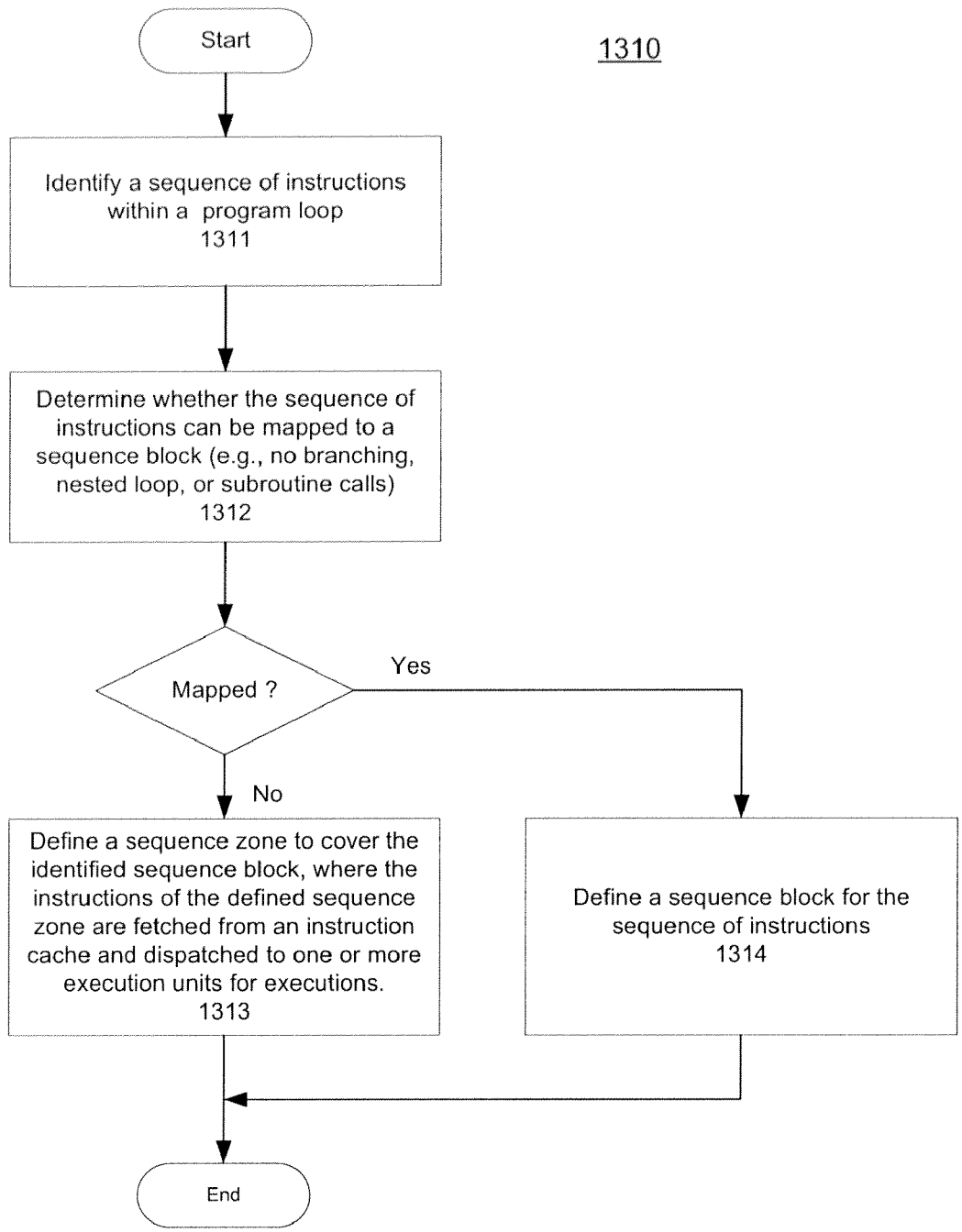
FIG. 17 is a flow diagram illustrating an exemplary process for defining a sequence zone according to one embodiment of the invention.

FIG. 17 is a flow diagram illustrating an exemplary process for defining a sequence zone of a program loop according to one embodiment. Exemplary process 1310 may be performed by a processing logic that may comprise hardware (circuitry, dedicated logic, etc.), software (such as is run on a dedicated machine), or a combination of both.

Referring to FIG. 17, at block 1311, a sequence of instructions within a program loop is identified. In one embodiment, the sequence is identified by a compiler when compiling the corresponding source code written in a variety of programming languages, such as, for example, C/C++ and Assembly, etc.

At block 1312, it is determined whether a sequence of instructions requires a sequence zone (e.g., includes branching, nested loops, or function calls, etc.). If it is determined that the sequence of instructions requires a sequence zone, at block 1313, a sequence zone is defined to cover the identified sequence of instructions, where the instructions of the sequence zone are fetched from an instruction cache (e.g., instruction cache 560) using a program counter and dispatched to one or more execution units for executions. If it is determined that the sequence of instructions cannot be mapped to a sequence zone, at block 1314, a sequence block is defined, where the instructions of the sequence block may be stored in a buffer of a dispatch-iterator and sequentially dispatched to one or more execution units for executions. [This limitation is a "where clause" to further define what constitutes a sequence zone, rather than performed at this time and place, without it, the flowchart is not unique] Other operations may also be performed.

Figure 18:
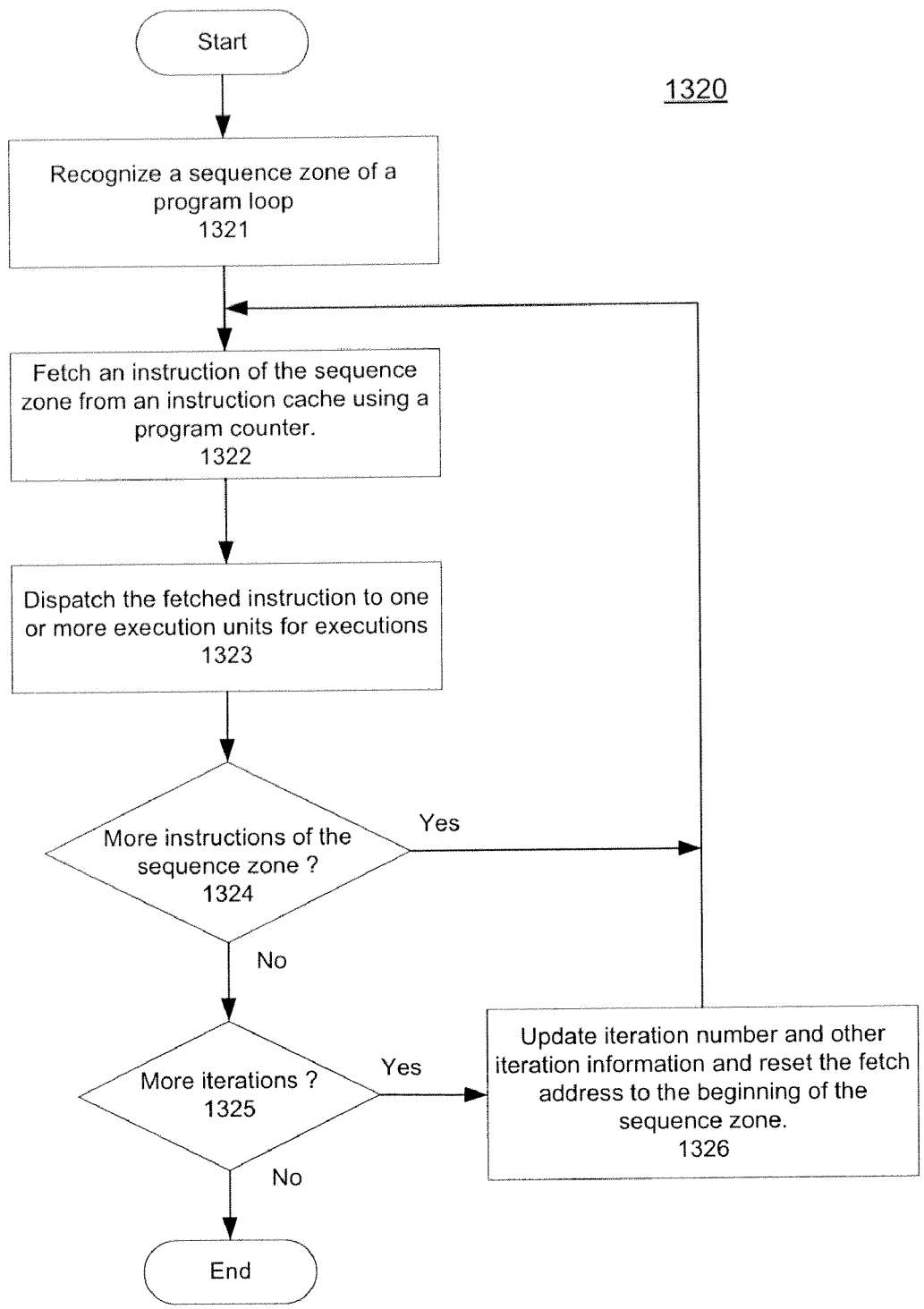
FIG. 18 is a flow diagram illustrating an exemplary process for processing a sequence zone of instructions according to one embodiment of the invention.

FIG. 18 is a flow diagram illustrating an exemplary process for processing instructions of a sequence zone according to one embodiment. Exemplary process 1320 may be performed by a processing logic that may comprise hardware (circuitry, dedicated logic, etc.), software (such as is run on a dedicated machine), or a combination of both.

Referring to FIG. 18, at block 1321, a sequence zone of a program loop is recognized. In one embodiment, the sequence zone is recognized by a dispatch-iterator. At block 1322, a primary instruction of the sequence zone is fetched from an instruction cache (e.g., instruction cache 560) using a program counter. At block 1323, a corresponding secondary instruction is dispatched to one or more execution units for executions. These operations may be repeated for all of the primary instructions within the sequence zone (block 1324) and the processing may be repeated for all of the iterations (block 1325) after the appropriate iteration information has been updated and the fetch addresses have been reset to the beginning of the sequence zone (block 1326). Other operations may also be performed.

Exemplary Static Zones

Since sequence zones represent a zone of standard fetch-execute behavior, according to one embodiment, branching is allowable, if the target address is within the sequence zone. This permits large if-then-else blocks and case statements to be implemented within an aggregated loop that would not otherwise fit within a sequence block. However, nested aggregated loops and subroutine calls within sequence zones may be required to utilize an additional mechanism within the sequence zone to guarantee correct function.

Since sequence zones are used within aggregated loops, the existence of a nested aggregated inner loop would cause a conflict with the resource used for iterating the outer loops. Similarly, a function call may also result in an aggregated loop within the called function, which cannot be known at compiling time. In one embodiment, static zones, which may only be contained within sequence zones, are defined to allow nesting of aggregated loops and/or function calls.

In one embodiment, entry to a static zone is caused by an instruction in the code, resulting in all register references accessing only the architected registers. Extended registers will no longer be accessed. In certain embodiments, any vestigial vector blocks, launched before the sequence zone was entered and are still iterating, may be allowed to run out before entry to the static zone. In another certain embodiment, vestigial vector block iteration is paused, to be continued after the static zone has ended. The formal state of the iterators, write flags, break flags, continue flags, sequence zone parameters, and other pertinent control data are preserved, along with the information that delineates static and dynamic registers calculated during loop calibration. The values contained by the extended registers are also preserved. At this point, the processor is in the normal, non-aggregated state of execution, but active loop aggregation can be restored to permit continuation of the aggregated loop enclosing the static zone. In this state, there is nothing preventing a subroutine call and/or aggregation of a nested loop. The end of a sequence zone is determined by an instruction that results in the dynamic registers and associated iteration control information being restored. The enclosing sequence zone continues execution on the same iteration that it left off on. It will be appreciated that the method of preserving the formal state and extended register contents may consist of switching between banks of state/register data, and generating an exception if no additional banks are available, or preserving the information in the aggregation state cache.

Figure 19:
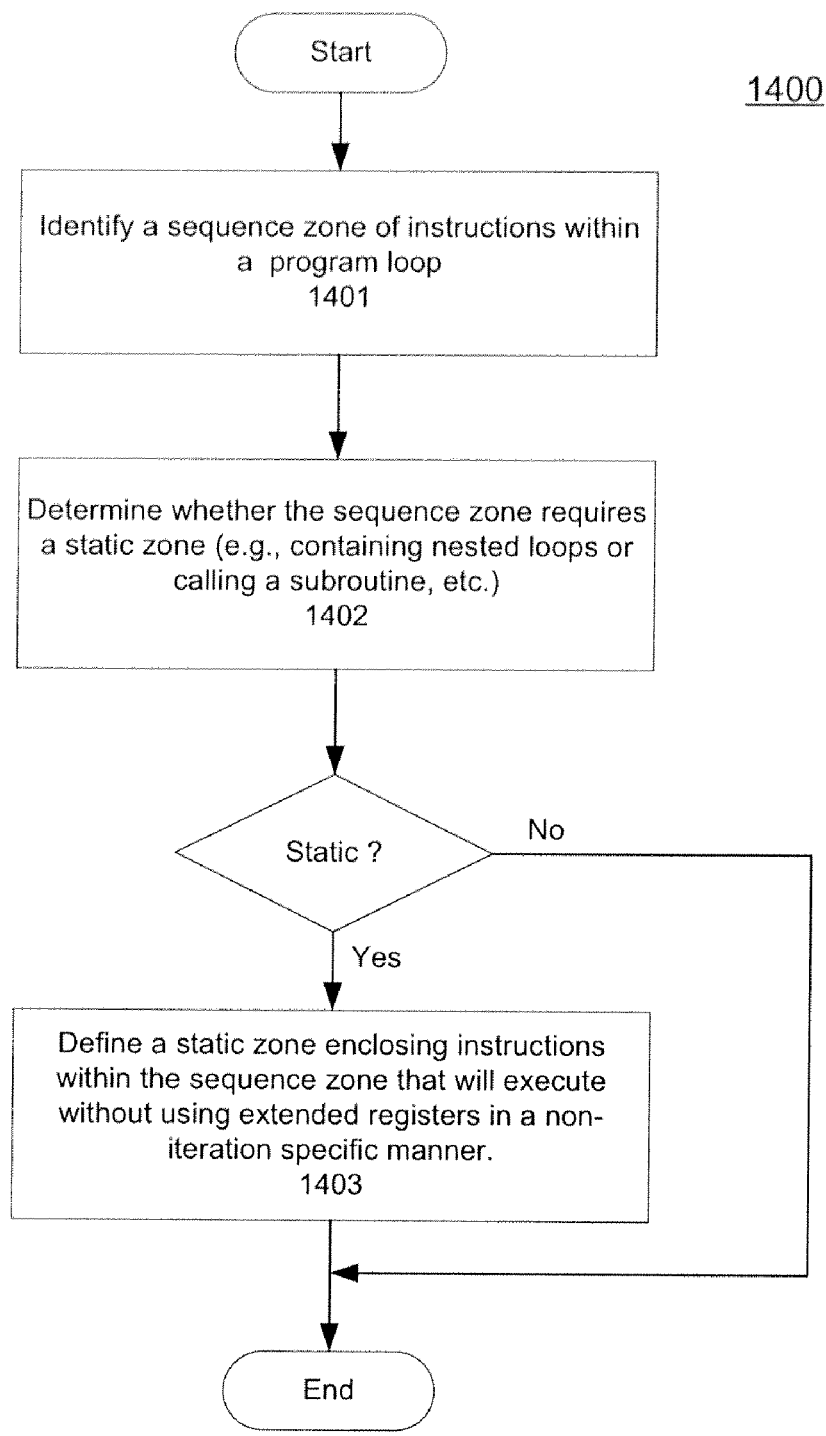
FIG. 19 is a flow diagram illustrating an exemplary process for defining a static zone according to one embodiment of the invention.

FIG. 19 is a flow diagram illustrating an exemplary process for defining a static zone of a program loop, according to one embodiment. Exemplary process 1400 may be performed by a processing logic that may comprise hardware (circuitry, dedicated logic, etc.), software (such as is run on a dedicated machine), or a combination of both.

Referring to FIG. 19, at block 1401, a sequence zone is identified within a program loop. In one embodiment, the sequence zone is defined using at least one of the aforementioned techniques. At block 1402, it is determined whether the sequence zone requires a static zone, such as, for example, whether the sequence zone contains any nested loops and/or function calls. If so, at block 1403, a static zone is defined within the sequence zone to cover the determined instruction or instructions, where the instructions within the defined static zone are executed without using the extended registers in a non-iteration specific manner. This in effect turns the dynamic registers into static registers. Other operations may also be performed.

Figure 20:
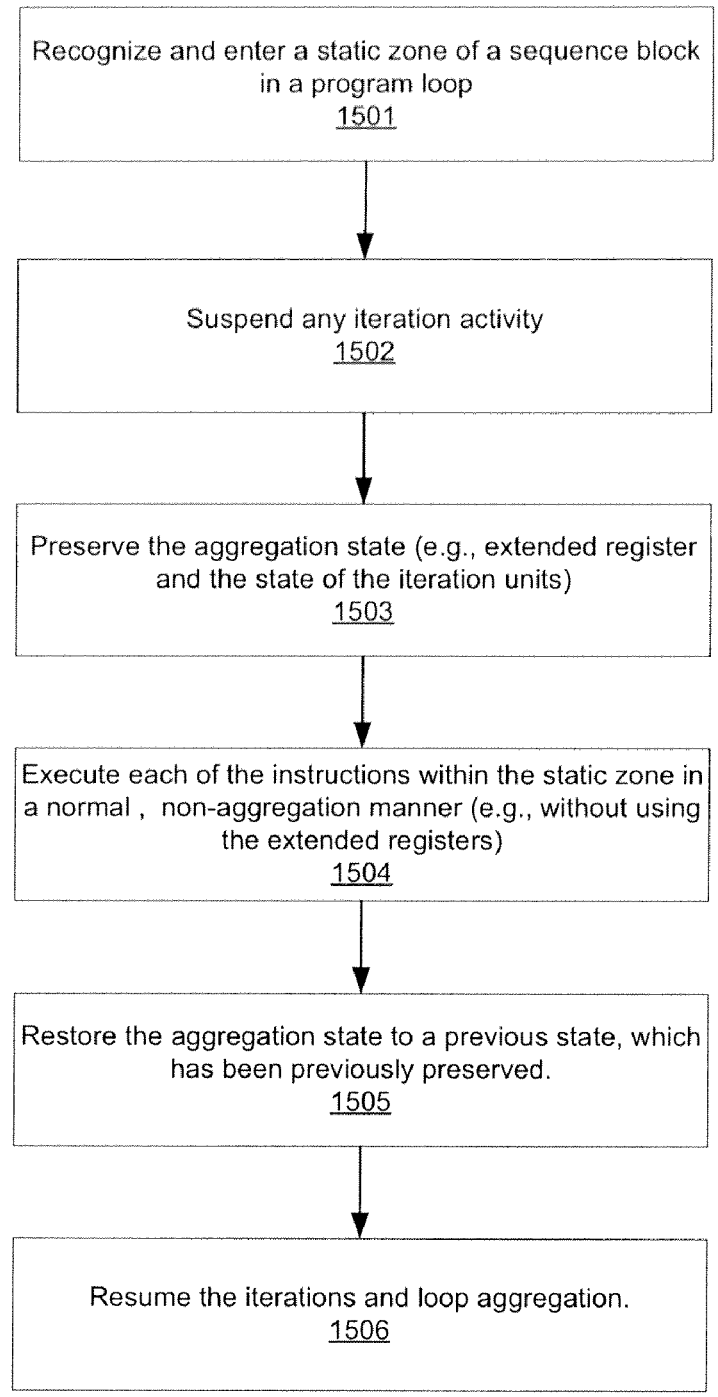
FIG. 20 is a flow diagram illustrating an exemplary process for processing a static zone according to one embodiment of the invention.

FIG. 20 is a flow diagram illustrating an exemplary process for processing a static zone according to one embodiment of the invention. Exemplary process 1500 may be performed by a processing logic that may comprise hardware (circuitry, dedicated logic, etc.), software (such as is run on a dedicated machine), or a combination of both. Exemplary 1500 may be performed as a part of operations performed at block 1404 of FIG. 14.

Referring to FIG. 20, at block 1501, the processing logic enters a static zone within a sequence zone of a program loop. At block 1502, any iteration activity is suspended. At block 1503, the aggregation state, such as, for example, extended registers and/or state of the iteration units, is preserved. In one embodiment, such an aggregation state may be saved in the aggregation state cache. At block 1504, each of the instructions within the static zone is executed in a normal manner, where the loop iteration number has no effect on register addressing (e.g., without using extended registers). At the end of the static zone, at block 1505, the aggregation state, including extended registers is restored with the values previously saved and at block 1506, the iterations and loop aggregation may be resumed. Other operations may be performed.

Exemplary Aggregation State Cache

According to one embodiment, before entering a static zone, the content of the registers of the current process may be preserved in an aggregation state cache to record the state of the aggregation. The aggregation state cache is a cache that stores the dynamic state of the processor during aggregation of a loop, such as, for example, content of extended registers, formal state of the iteration units, and/or program counter, etc. This enables nesting of aggregated loops through preserving the state of the processor executing a particular loop mid-pass, and allowing a nested loop to reuse the iteration units and extended registers. After the inner loop is complete, the previous state of the enclosing loop can be restored and execution of the enclosing loop may resume where it left off.

In one embodiment, the aggregation state cache may be implemented as a banked set of extended registers and state, such that no copying of values is necessary to aggregate multiple loops. The state information for the new loops may be added by changing the active bank, thereby leaving the previous bank intact. However, this may cause an exception if all of the banks are full, which may cause the operating system to store the contents of one of the aggregation state banks in the system memory, thus freeing it for use. Similarly, if an attempt is made to revert to a previously used aggregation state, and the correct state is not present in the aggregation state cache, an exception may be caused, upon which operating system may restore the stored aggregation state from the system memory.

According to one embodiment, the aggregation state cache may be used for handling nested loop. Nesting of aggregation loops is permitted by preserving the state of the enclosing loop and allocating an entry for the nested loop's aggregation state in the aggregation state cache. The nested loop is aggregated using this newly allocated aggregation state, thus preserving the state of the processor resources associated with the enclosing aggregated loop. Upon termination of the nested loop, the previous state of the loop aggregation is restored from the aggregation state cache, supplying the information to permit continuation of the enclosing loop.

The aggregation state cache may be implemented within a processor using, for example, portions of the extended registers specifically allocated for such purposes. Alternatively, the aggregation state cache may be implemented outside of the processor, but accessible by the processor. In certain embodiments, the aggregation state cache may be implemented using a round-robin replacement fashion to determine the replacement policy for entries. Other algorithms, such as, for example, a least-recently-used algorithm, may be utilized.

According to one embodiment, when preservation and restoration is required, the values of the working registers may be copied from and to the aggregation state cache. In response to a preservation request, if there are no unused cache entries available, an exception may be generated. Similarly, in response to a restoration request, if the requested entry is not in the aggregation state cache, an exception may also be generated. In a particular embodiment, the aggregation state cache may be implemented as multiple banks of working registers, where the active bank is changed and a new entry in the aggregation state cache is allocated or de-allocated (e.g., released).

The allocation and de-allocation may be triggered via one or more instructions. Such instructions may be inserted into the instruction stream by a compiler when compiling the source code. Similarly, the preservation and restoration may be requested via one or more instructions. Alternatively, the above actions may be triggered via one or more interrupts (including software and/or hardware interrupts). Such interrupts may be generated via an exception, either internally or externally. Other configurations may exist.

Exemplary Segmentations of a Processor

In one embodiment, a processor may be sliced (e.g., segmented) into multiple slices, where each slice includes one or more functional units and the register files(s) associated with those execution units, and each slice may operate independently. As a result, one or more slices may be disabled when such slices are not needed. For example, when certain slices are not needed, such slices may be powered down to conserve powers, particularly, in a portable system.

Figure 21:
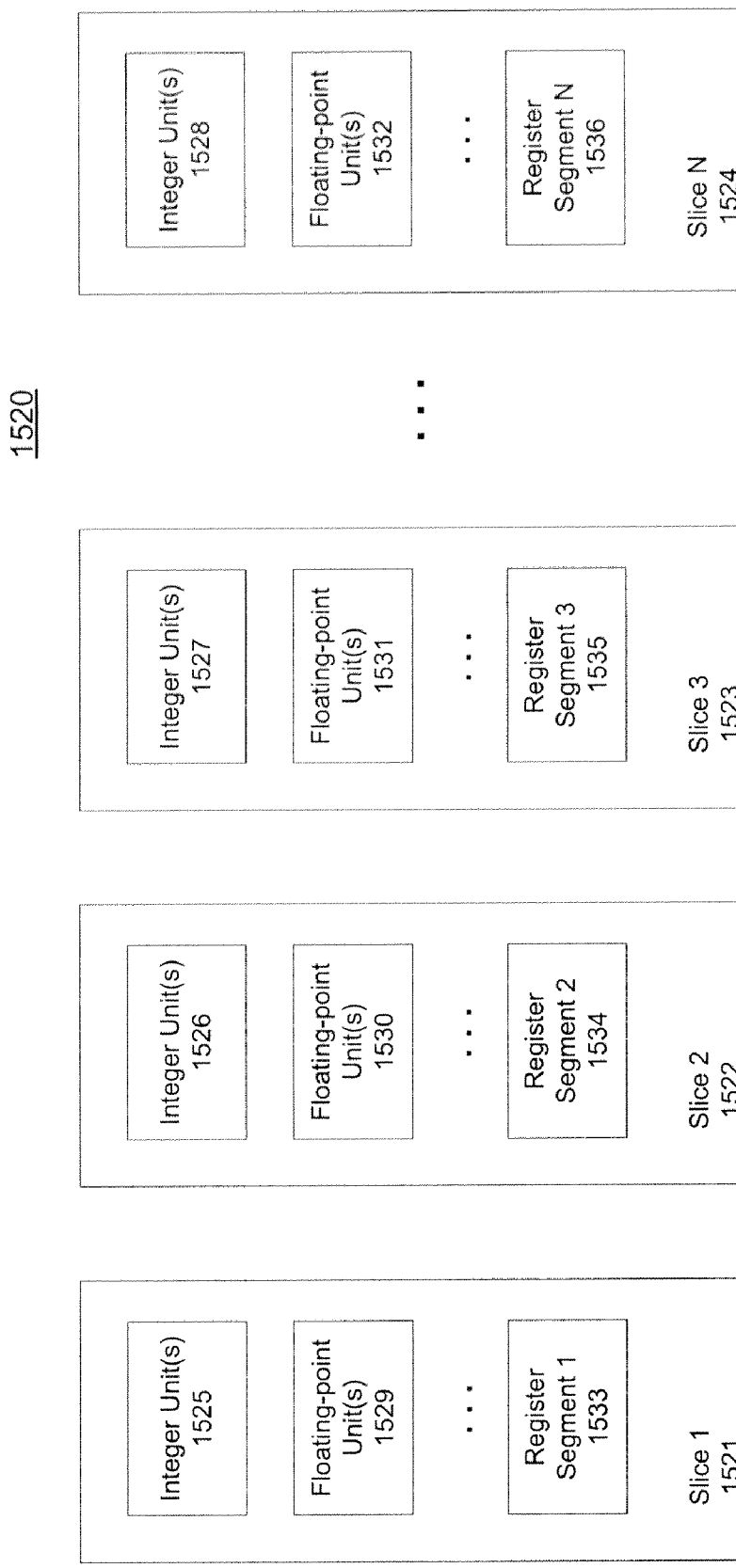
FIG. 21 is a block diagram illustrating an exemplary processor having multiple slices according to one embodiment of the invention.

FIG. 21 is a block diagram illustrating an exemplary processor having one or more slices according to one embodiment of the invention. In one embodiment, the exemplary processor 1520 includes, but is not limited to, one or more slices 1521-1524, where each of the slices 1521-1524 includes one or more functional units, such as integer units 1525-1528 and/or floating point units 1529-1532 respectively, and a portion of a register file or files, also referred to as register segments 1533-1536. Other functional units, such as, for example, memory access unit, etc., may be included in a slice.

In one embodiment, number of the slices active or inactive may be determined at runtime, based on, for example, the direction of the user to the operating system. When a slice is powered down, the iteration units of the processor may be notified that such slice may not be used for loop aggregation. If a particular slice is being used for loop aggregation, according to one embodiment, the process for powering down certain slices may be delayed until such loop aggregation finishes or is reactivated by the Operating system in response to an exception, in the case where an inactive loop that was using the slice, before it was disabled, is reactivated.

Saving and restoring potentially hundreds of dynamic registers on every iteration of a static zone is performance-prohibitive. In one embodiment, this situation can be avoided by segmenting the register file associated with a given execution unit and using the segments in a round-robin fashion as the static zone nesting level increases. Each level of the nested loops may use a unique segment of the registers, such that no copying is needed when the operations go from one level to another.

FIG. 22 is a block diagram illustrating an exemplary code of a nested loop according to one embodiment. In this embodiment, exemplary code 1550 includes, but is not limited to, nested loops 1551-1554. In one embodiment, the aggregation state for the current loop is preserved and a new segment of the register file is allocated for each of the nested loops 1551-1554 before entering the respective loop. After an inner loop is terminated, the associated segment of registers may be deallocated and the outer loop's aggregation state may be restored allowing the outer loop to continue.

Figure 23:
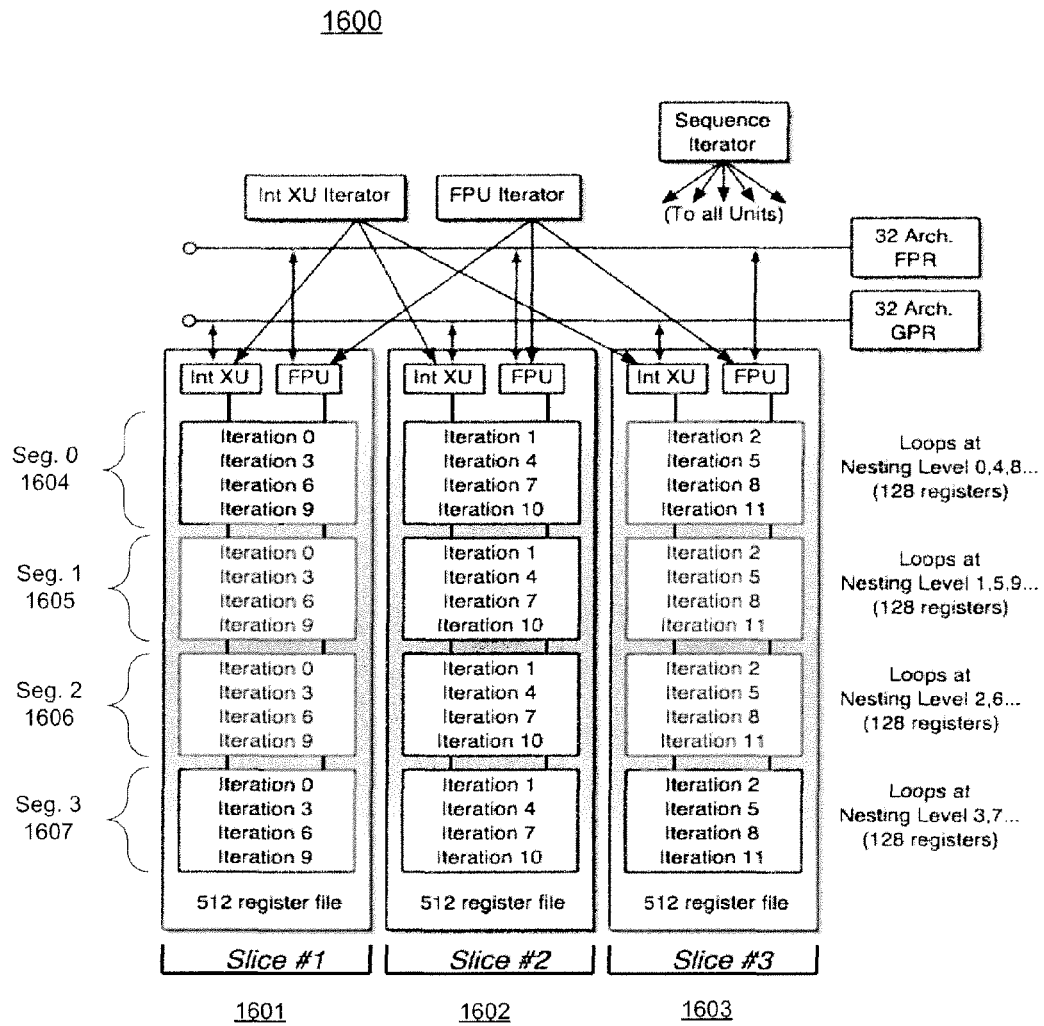
FIG. 23 is block diagram illustrating an exemplary register configuration of a processor, according to another embodiment of the invention.

FIG. 23 is a block diagram illustrating certain portions of an exemplary macroscalar processor according to one embodiment of the invention. In this embodiment, for the purposes of illustration, only the Integer and FP units are shown in the exemplary macroscalar processor. Other units (e.g., LSU, BRU, etc) are not shown in order not to unnecessarily obscure the embodiments of the invention. In this example, the exemplary processor 1600 includes 32 architected FPR's and 32 architected GPR's. However, the exemplary processor 1600 is not limited to the configurations shown in FIG. 23.

Referring to FIG. 23, in this example, the exemplary processor 1600 can execute 3 iterations of a vector block per cycle and thus, using three slices 1601-1603 of the processor. If the aggregation factor is 12, then an iteration unit would dispatch 3 iterations of the active instruction for 4 consecutive cycles, before beginning iteration of the next instruction.

FIG. 23 illustrates a segmented register scheme, where nested aggregated loops utilize different segments of the register file (e.g., register segments 1604-1607), thereby preserving the formal state of enclosing loop aggregation that is simultaneously in-progress When an attempt is made, for example at nesting level 4, by a nested loop to re-use a register segment that is already in-use by a higher-order enclosing loop, an exception is generated, causing the dynamic register contents to be written to memory. This allows four levels of aggregated loops, as shown in FIG. 22 as an example, to be simultaneously active without spilling registers to memory. A similar mechanism is used when an interrupt occurs, to avoid saving substantially all dynamic registers during an interrupt or context switch.

Figure 24:
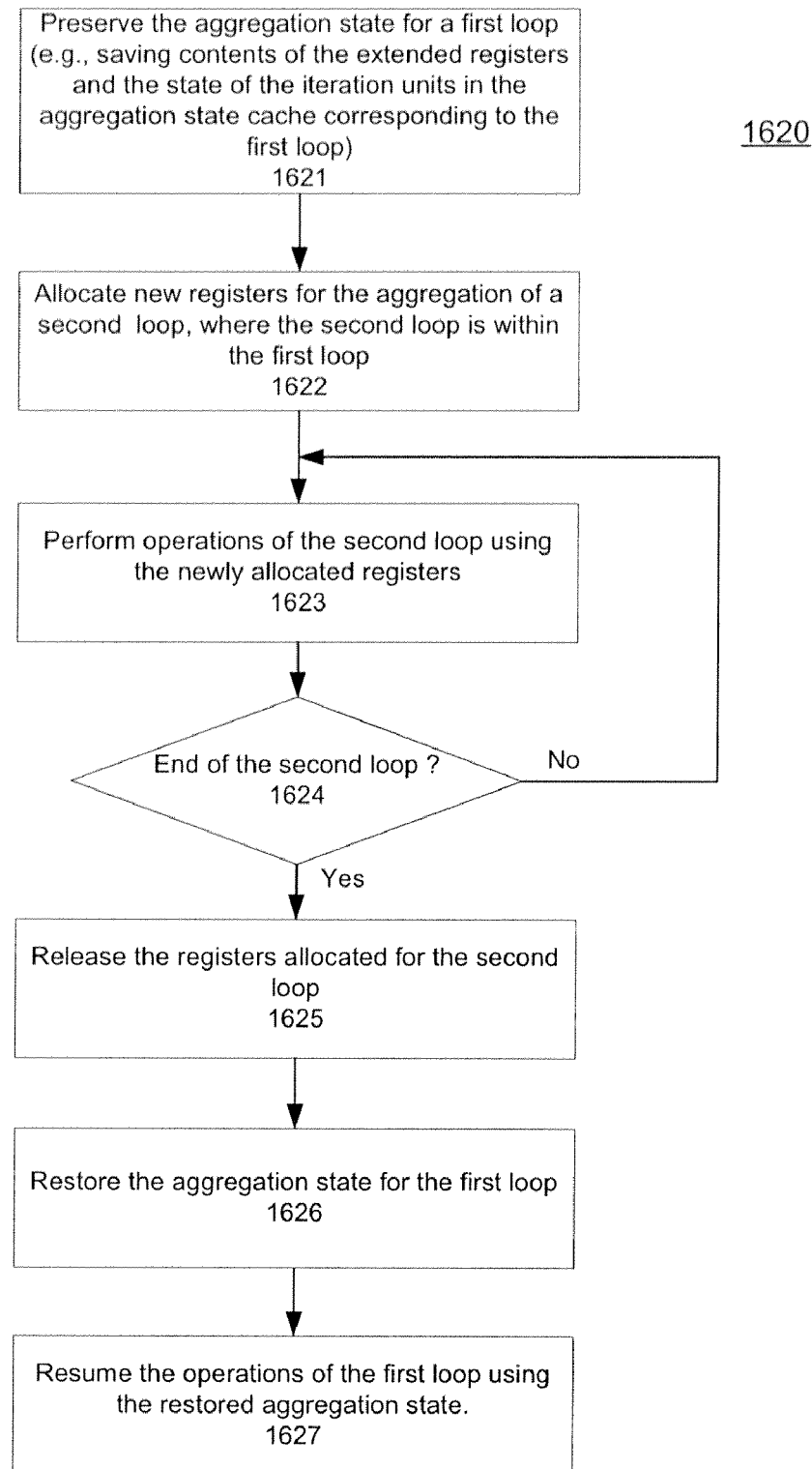
FIG. 24 is a flow diagram illustrating an exemplary process for handling nested loops according to one embodiment of the invention.

FIG. 24 is a flow diagram illustrating an exemplary process for handling nested loop aggregation according to one embodiment of the invention. Exemplary process 1620 may be performed by a processing logic that may comprise hardware (circuitry, dedicated logic, etc.), software (such as is run on a dedicated machine), or a combination of both.

Referring to FIG. 24, when a process enters from a first loop into an inner second loop, at block 1621, the aggregation state of the first loop is preserved. In one embodiment, at least the contents of the extended registers and the state of the iteration units associated with the first loop are saved into the aggregation state cache corresponding to the first loop. At block 1622, a new set of registers for the aggregation of the second loop is allocated. At block 1623, the process enters the inner second loop and performs the operations of the second loop using the newly allocated registers, until the end of the second loop (block 1624). When the second loop is terminated, at block 1625, the registers allocated for the second loop are de-allocated. At block 1626, the aggregation state of the first loop is restored and at block 1627, the first loop operations resume using the restored aggregation state. Other operations may also be performed.

Exemplary Block and Zone Predication

Blocks and zones may be predicated upon a single predicate register. This is not done via predicate blocks, but accomplished with either a prefix instruction to the block/zone prefix, or a block/zone variant instruction. Sequence blocks and zones may be predicated upon either a static or dynamic predicate register. The sequence block/zone is iterated only for iterations where the value of the predicate is true. Static zones may also be predicated upon either a static or dynamic predicate register. The typical case for a predicated static zone is to encapsulate a function call or nested loop that only occurs under a rare set of data-driven conditions. Vector blocks may also be predicated. Where a vector block is predicated upon a static predicate register, a false predicate will cause the vector block to be ignore entirely. Otherwise, for vector blocks predicated upon dynamic predicate registers, the predicate controls the vector block on an iteration-by-iteration basis. This can be useful for performance reasons, in cases where the processor is configured to run with a small number of execution units per iterator, such as in low power or symmetric multithreaded applications.

Exemplary Iteration Control Instruction Handling

Iteration control instructions affect the operation of the dispatch-iterator and individual iterator units during dynamic loop aggregation. These instructions are generated in response to the presence of a C-style "break" or "continue" statement within the body of the loop. The "break" or "continue" statements affect the handling of subsequent instructions and/or iterations during dynamic loop aggregation.

Because these instructions will affect how iteration units handle subsequent instructions, they need to take effect immediately. However, in order to maintain coherency with respect to exceptions, execution may take place as per the commitment model of the processor. Rather than stalling iteration until these instructions have committed, according to one embodiment, the iteration unit sets the informal state to indicate the expected change to the break or continue flags. If an interrupt, exception, or branch mispredict occurs, the informal state is invalidated, forcing the dispatch unit to use the information stored in the formal state. Otherwise, the informal state is the default state used to control the iterator under normal circumstances.

The C-style "continue" statement normally causes a C program to immediately skip to the bottom of a loop, and begin the next iteration. When dynamic loop aggregation is active, and a "continue" statement is encountered, according to one embodiment, a bit is set indicating that no further instructions should be dispatched for this iteration. Since there are N iterations currently executing at this point, dispatch, and iteration, should otherwise proceed normally, except that no secondary instructions are dispatched for the iteration containing the "continue" statement. This behavior ceases at the bottom of the loop; when all continue flags are cleared in preparation for the next pass through the loop body.

The C-style "break" statement normally causes a C program to immediately exit the enclosing loop or switch statement. When dynamic loop aggregation is active, and a "break" statement is encountered, according to one embodiment, a bit is set indicating that no further secondary instructions should be dispatched for this, or subsequently numbered iterations. Simultaneously, any write flags corresponding to iterations after the current iteration is cleared, invalidating writes that have already occurred for iterations subsequent to the breaking iteration. Since there are N iterations currently executing at this point, dispatch and iteration should otherwise proceed normally, except that no instructions are dispatched for the iteration containing the "break" statement, or subsequent iterations. Only secondary instruction corresponding to iterations earlier than the iteration where the "break" statement was encountered will continue to execute. When the bottom of the loop body is reached, the loop will terminate.

As N iterations of an instruction are executed, the processor may not be certain if the instruction it just executed should have actually been executed or not, since its possible that a "break" statement in an earlier iteration of the loop will be encountered later on, invalidating normally "future" operations that actually have already occurred. A similar situation exists when writing to RAM, and the compiler must force a sequence block if a write to RAM or a static register precedes a "break" statement. However, since dynamic registers are the mechanism that permits multiple iterations of a loop to execute concurrently, forcing sequence blocks for dynamic register writes would negate the benefits of dynamic loop aggregation.

As a result, according to one embodiment, the processor builds an indeterminate state that cannot be resolved until all instructions of that pass of the loop have executed. When a pass over a dynamically aggregated loop completes, the dynamic registers, each of which can have multiple values stored in multiple registers, can be consolidated back into the architected registers.

For example, consider the piece of code shown in FIG. 25A, for the purposes of illustration, constants have been used here for clarity. But to understand the complexity of this small piece of nonsense code, presume that all constants are actually variables passed in at run-time, resulting in the compiler being unable to statically predict the behavior of this code. Furthermore, it is assumed that the aggregation factor is 7, meaning that all the action occurs within a single pass as shown in FIG. 25B.

In the above example as shown in FIG. 25B, execution occurs from left-to-right, row-by-row. Assignments to the correct final states of the dynamic base variables a, b, c and x are shown in bold and underlined for clarity. The correct state for q is unchanged. The processor must copy the correct state into the variables a, b, c, and x at the end of the loop, while leaving q intact, as a part of a consolidation process.

Since loops can be of indefinite length, it is impractical to track all previous states of all registers for the life of the loop. Fortunately, at the end of each multi-iterative pass over the loop body, it is known whether any breaks were encountered, and it is possible to calculate the correct state for each architected dynamic register, were the loop to terminate at that point.

Figure 26:
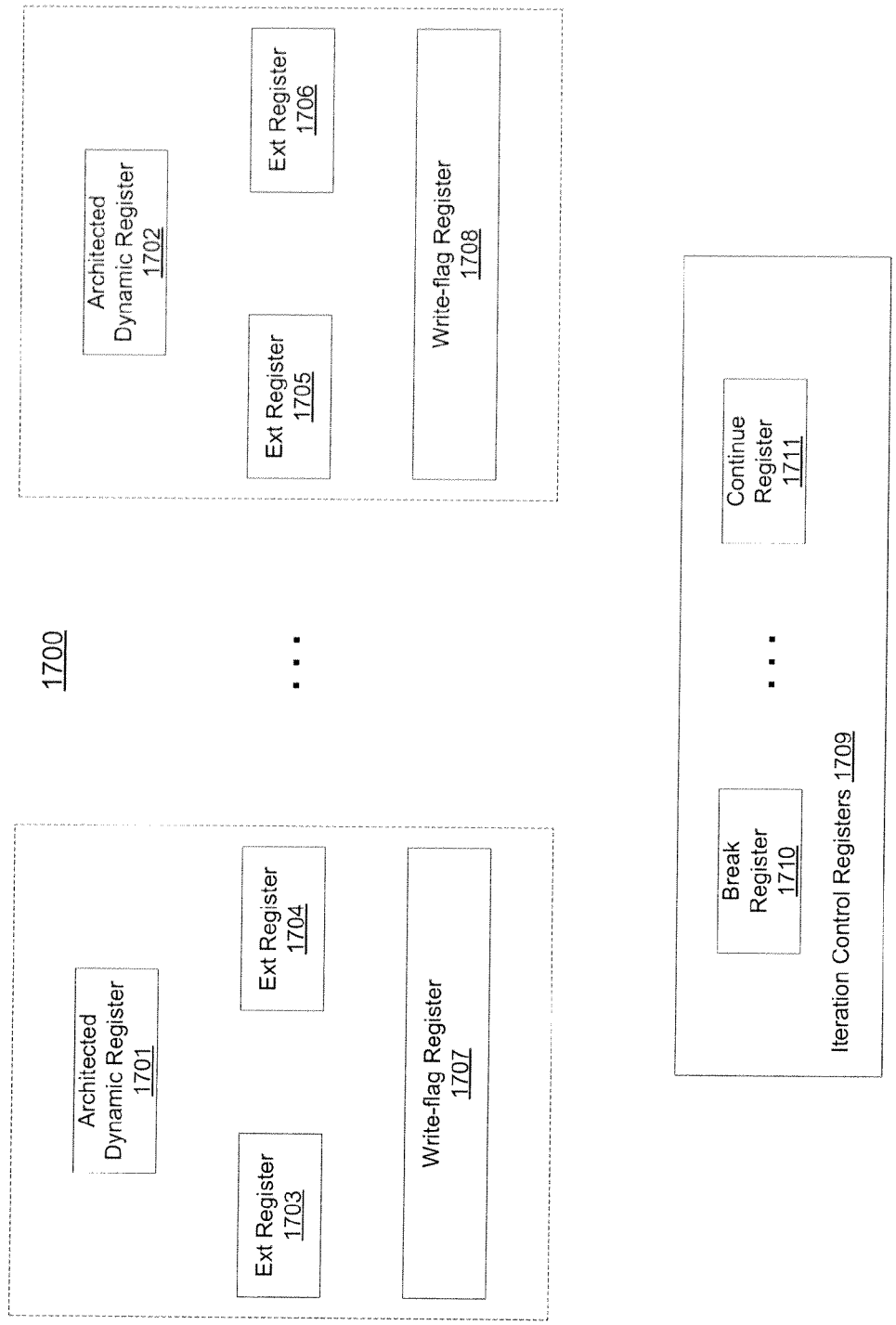
FIG. 26 is a block diagram illustrating an exemplary register configuration for handling iteration control instructions, according to one embodiment of the invention.

According to one embodiment, a write-flag register associated with each of the dynamic registers may be used in conjunction with a break register and a continue register to handle the "break" instruction and the "continue" instruction. FIG. 26 is a block diagram illustrating an exemplary register configuration according to one embodiment. Referring to FIG. 26, in one embodiment, an exemplary configuration 1700 includes one or more dynamic registers 1701 and 1702 used for loop aggregation. For each of the dynamic registers 1701 and 1702, multiple extended registers 1703-1706 are allocated for the respective dynamic registers 1701-1702.

In addition, for each of the dynamic registers 1701-1702, a write-flag register, such as write-flag registers 1707 and 1708 may be used to record when a write operation is made to one of the extended registers 1703-1706. Furthermore, there are one or more iteration control registers 1709 globally shared by the rest of the configuration. In one embodiment, the iteration control registers 1709 includes, but is not limited to, a break register 1710 and a continue register 1711 to handle a C-style "break" and "continue" instructions respectively. In one embodiment, the break register 1710 and continue register 1711 are used to record the iteration upon which a "break" and a "continue" instructions occurs. The break register 1710 and continue register 1711 may be a one-bit array or just a single bit register dependent upon the configuration of the processor. Other configurations may exist.

Figure 27:
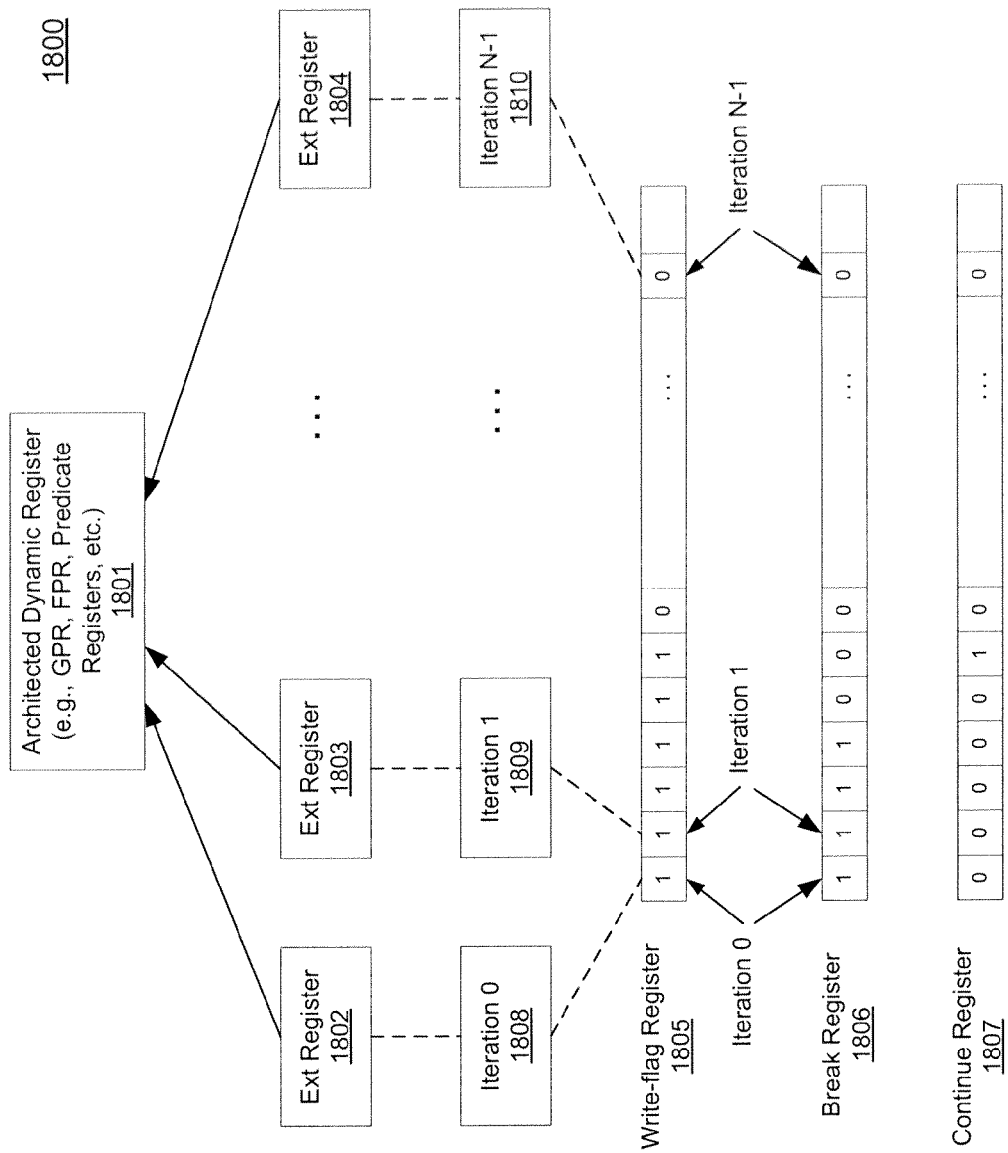
FIG. 27 is a block diagram illustrating an exemplary process for handling iteration control instructions, according to one embodiment of the invention.

FIG. 27 is block diagram illustrating an exemplary configuration for handling iteration control instructions, according to one embodiment of the invention. In one embodiment, exemplary configuration 1800 includes, but is not limited to an architected dynamic register 1801 and one or more extended registers 1802-1804. The registers 1802-1804 may be a part of a large pool of registers of the processor that can be dynamically allocated. For example, the architected dynamic register 1801 may be used as an architected dynamic register for holding x, while extended registers 1802-1804 may be used as extended registers for holding the value of x corresponding to multiple iterations, such as x1-x6 of the example shown in FIGS. 25A and 25B.

In addition, according to one embodiment, the exemplary configuration 1800 includes, but is not limited to, a write-flag register 1805 corresponding to the architected registers of the processor, a break-flag register 1806, and a continue-flag register 1807. For example, write-flag register 1805 may be implemented as write-flag register 1707 of FIG. 26 and the dynamic register 1801 may be implemented as dynamic register 1701 of FIG. 26, while break-flag register 1806 and continue-flag register 1807 may be implemented as break register 1710 and continue register 1711 respectively. In one embodiment, the write flag register 1805, the break register 1806, and the continue register 1807 is an array of 1-bit values corresponding to the maximum aggregation factor of the particular implementation. The break-flag register 1806 and continue flag register 1807 may also be referred to as iteration control registers. The name of the registers 1806 and 1807 are used for the purposes of illustration only. In one embodiment, there is a write flag register for each of the architected registers. For example, if a processor has 32 GPR architected registers, 32 FPR architected registers, and 32 architected predicate registers, the processor would have 32 write-flag registers for 32 GPR architected registers, 32 write-flag registers for 32 FPR architected registers, and 32 write-flag registers for 32 architected predicate registers. In one embodiment, there is only one iteration control register for each type of iteration control globally shared by the entire aggregated loop. For example, there is a break register for a "break" type of iteration control and a continue register for a "continue" type of iteration control.

In one embodiment, for each of the possible architected registers and each register class (GPR, Predicate, FPR), the write flag register 1805 records writes to that register in the bit position corresponding to the iteration (e.g., iterations 1808-1810) as it was written. The number of bits in these registers is unrelated to the size of the circular fetch/dispatch buffer, but sets an upper limit on the aggregation factor (F), that a given implementation can support. If, due to an increase in execution units and registers, larger aggregation factors are desired, then the size of these 1-bit arrays must also be increased.

In one embodiment, the break register 1806 may be used to record when a break occurs within the program loop. Similar to the write flag register 1805, the break register may include at least N bits to support an aggregation factor (F) of N. Each of the bits in the break register 1806 indicates a respective iteration (e.g., iterations 1808-1810) of the aggregated loop. For example, bit 0 corresponds to iteration 0 and bit 1 corresponds to iteration 1, and so on. In a particular embodiment, when a break instruction is executed, the corresponding bit in the break-flag register is set, the write-flag registers are masked to effectively invalidate previous writes that occurred in iterations subsequent to the break iteration, and all subsequent write operations belonging to iterations greater than or equal to the iteration in which the break occurred are masked. Further, the exemplary configuration 1800 includes a continue register 1807 to handle C-style "continue" statement.

At the end of each pass over the loop body, according to one embodiment, the write-flag register 1805 may be used to determine which of the extended registers may be consolidated back to corresponding architected dynamic registers. In one embodiment, an extended register having a valid value of the highest iteration may be consolidated to its architected dynamic register. For example, according to one embodiment, the write-flag register 1805 of the extended registers associated with an architected dynamic register may be used to determine the latest valid write-iteration for that dynamic register. FIGS. 28A and 28B are block diagrams illustrating an exemplary iteration control handling according to one embodiment of the invention. In this embodiment, the exemplary iteration control handling process is illustrated based on the example shown in FIGS. 25A and 25B using the exemplary register set shown in FIG. 27. Referring to FIG. 28A, when an operation occurs during iterations that would cause an iteration control operation, each of the write flag registers 1901-1905 corresponding to the architected dynamic registers for variables x, a, q, b, and c is updated. For example, when a break statement occurs as shown in FIG. 25B, all bits of the write flag register for variable x 1901 are set, since the corresponding iteration unit does not know the break occurs. The break register 1906 is used to record the iteration number when the break occurs.

In this example, the break occurs during iteration 3. As a result, the bit 3 is set to indicate that a break has occurred during iteration 3.

At the end of the iterations, according to one embodiment as shown in FIG. 28A, the write flag registers 1901-1905 would be in various states before the execution of the break instruction, as determined by the code shown in FIG. 25A. In one embodiment, a consolidation process is performed at the end of each multi-iteration pass over the loop body. FIG. 28B illustrates the state of the write-flag registers after the execution of the break instruction, the write flag registers 1901-1905 are used to determine which of the extended registers should be consolidated to its respective architected dynamic register.

According to one embodiment, the extended register corresponding to the iteration indicated by the highest number bit set in the corresponding write flag register may be consolidated into the corresponding architected dynamic register. For example, referring to FIG. 28B, at the end of the iterations, the respective write flag register 1901 has the highest non-zero bit of bit 3. Thus, the extended register corresponding to iteration 3 will be copied to the architected dynamic register for variable x (see, FIG. 6).

In one embodiment, a processing logic determines whether a "continue" instruction occurs. If not, the loop continues until it ends. If a "continue" instruction occurs, the iteration during which the "continue" statement occurs is recorded by setting a bit of the continue-flag register to a known value, such as, for example, a logical value of one. In this embodiment, the continue-flag register may be just a status bit to indicate whether a "continue" occurs. In one embodiment, the status bit prevents the generation of subsequent secondary instructions for the iteration in which the continue statement was executed, for the pass in which the continue statement was executed. Other operations may also be performed.

Exemplary Housekeeping Instructions

According to one embodiment, several additional functions may be required to accommodate the various possible conditions that occur after a pass over the loop body has executed. This includes, but is not limited to, checking the termination condition of the loop, and early termination caused by "break" statements, etc.

In one embodiment, an instruction to test the break-flag register may be needed. This instruction tests the break bits to determine if any are set, and branches accordingly. In a particular embodiment, an EQ flag in the condition register reflects whether any break bits are set. If EQ is set, then no breaks have occurred, and execution continues normally. This is typically the first thing done at the end of a pass through the loop body, in preparation for another pass, or loop termination. Other instructions apparent to those with ordinary skill in the art may be implemented.

According to another embodiment, an instruction for clearing the write-flags, break-flags, and continue-flags may be needed. This instruction clears any flags that may have been set during the previous pass through the loop. This is typically performed at the completion of a pass over the loop body, and the last thing done at the end of loop, in preparation for returning to normal code.

According to a further embodiment, an instruction for consolidating registers may be needed. This instruction consolidates the specified dynamic register from the extended registers as indicated by the process described in the section on consolidation. This instruction has no effect on the condition register. This instruction is forward pipeline synchronizing, requiring that all other prior instructions commit before it executes. Forward pipeline synchronization does not affect instruction fetch or memory operations, and subsequent instructions may execute but not commit before this instruction executes.

Exemplary Execution Model

In one embodiment, the execution model for a macroscalar processor is similar to existing processor architectures, with the exception that the dispatch unit also functions as an pseudo-execution unit for dispatch-control instructions. Instructions that affect the behavior of dispatch-iterator and/or iterator units, such as "break" and "continue", may take effect immediately to control the dispatch of subsequent instructions. However, in order to maintain coherency of the machine state with respect to exception and branch mispredict events, these instructions must update the formal machine state as per the instruction commitment policies of the processor.

In order to accommodate these conflicting requirements, according to one embodiment, the processor maintains both informal and formal states of the dispatch-iterator and iteration units. When a dispatch-control instruction is dispatched, the specified parameters in the informal state are updated to reflect the prescribed state. As long as the informal state of the dispatch unit is valid, it takes precedence over the formal state.

Dispatch-control instructions are also queued in the affected iterator units for execution, where they await the opportunity to be committed to the formal machine state. Commitment is when the formal state of the affected units is altered.

Immediately upon an interrupt or exception, the informal state of the dispatch unit is invalidated in hardware, correctly forcing it to use the formal state upon return from the interrupt or exception. This may result in some instructions that had not crossed the exception threshold being correctly re-dispatched upon return from interrupt.

Exemplary Exception Model

Since certain instructions are used to handle dynamic aggregation, the interrupt and exception handling may be required to perform differently. In one embodiment, non-iterating prefix instructions include compound predication prefixes, and those prefix instructions that, when combined with the subsequent instruction, result in the generation of new internal operations. In these cases, the address associated with the new internal operation needs to be that of the prefix instruction that helped generate it, so that, upon return-frominterrupt, the process will correctly restart. For precise exceptions, the exception handler must correctly process the prefix in order to determine the correct response, according to one embodiment.

For instructions of any type (prefixed or not) that occur while auto-iteration is active, the exception return address is handled differently. In one embodiment, the return address for the exception is considered to be the instruction that spawned the iteration process, such that entire sequence blocks will be re-fetched from memory when the exception returns.

Some exceptions may result in the instruction successfully executing a second time, while others may wish to resume execution at the following instruction, because that the exception handler has taken some positive action.

When execution is resumed after an exception during dynamic loop aggregation, according to one embodiment, fetch resumes at the prefix instruction for the enclosing vector or sequence block. This ensures that all instructions in a sequence block are present in the fetch buffer. Dispatch, however, resumes at the instructions and iterations that were in the active formal state of the dispatch-iteration and iterator units at the time of the exception.

Under normal conditions, in one embodiment, the register numbers specified by an instruction are altered when auto-iteration is in effect, otherwise, they represent the actual register read and written to. Within an exception handler, it is often desirable to deliberately change the contents of registers, for later use after the exception handler has returned.

Modifying dynamic registers when dynamic loop aggregation was is in effect at the time of the exception requires a slightly different mechanism, since the state of the dynamic register may be indeterminate, the appropriate extended register may need to be referenced. To accomplish this within an interrupt handler, in one embodiment, there is a prefix instruction that uses the current pre-interrupt iteration counters (from the formal state) to modify the registers specified by the subsequent instruction, to address the register that would have been used by the interrupted iteration, thus effectively replicating the environment the instruction would have dispatched/completed under, for the instruction affected by the prefix.

By using this mechanism, the exception handler is relieved of the burden of calculating exactly which register frame is affected. In one embodiment, the formal state may contain enough information to allow an exception handler to locate the actual instruction that caused a precise exception, irrespective of the return address.

Legacy exception handlers that do not intentionally modify register states and do not decode exception-causing instructions should function without modification. If the exception handler can call functions that may use dynamic loop aggregation, according to one embodiment, additional code may be needed to save the formal state of the dispatch unit and registers prior to calling the exception handler, and properly restores it afterward, such as with a context switch.

Exemplary Context Switch Handling

Whenever a context-switch occurs while dynamic aggregation is active, according to one embodiment, some or all of the formal state of the dispatch unit and/or iterators may be required to be preserved and restored, in addition to the program register contents, architected and/or extended. To accomplish this, according to one embodiment, an indexed method for reading and writing the formal processor state is used. Supervisor-mode software may query the number of program registers and state registers in the processor, and have a mechanism for reading and writing them in an indexed fashion.

Figure 29:
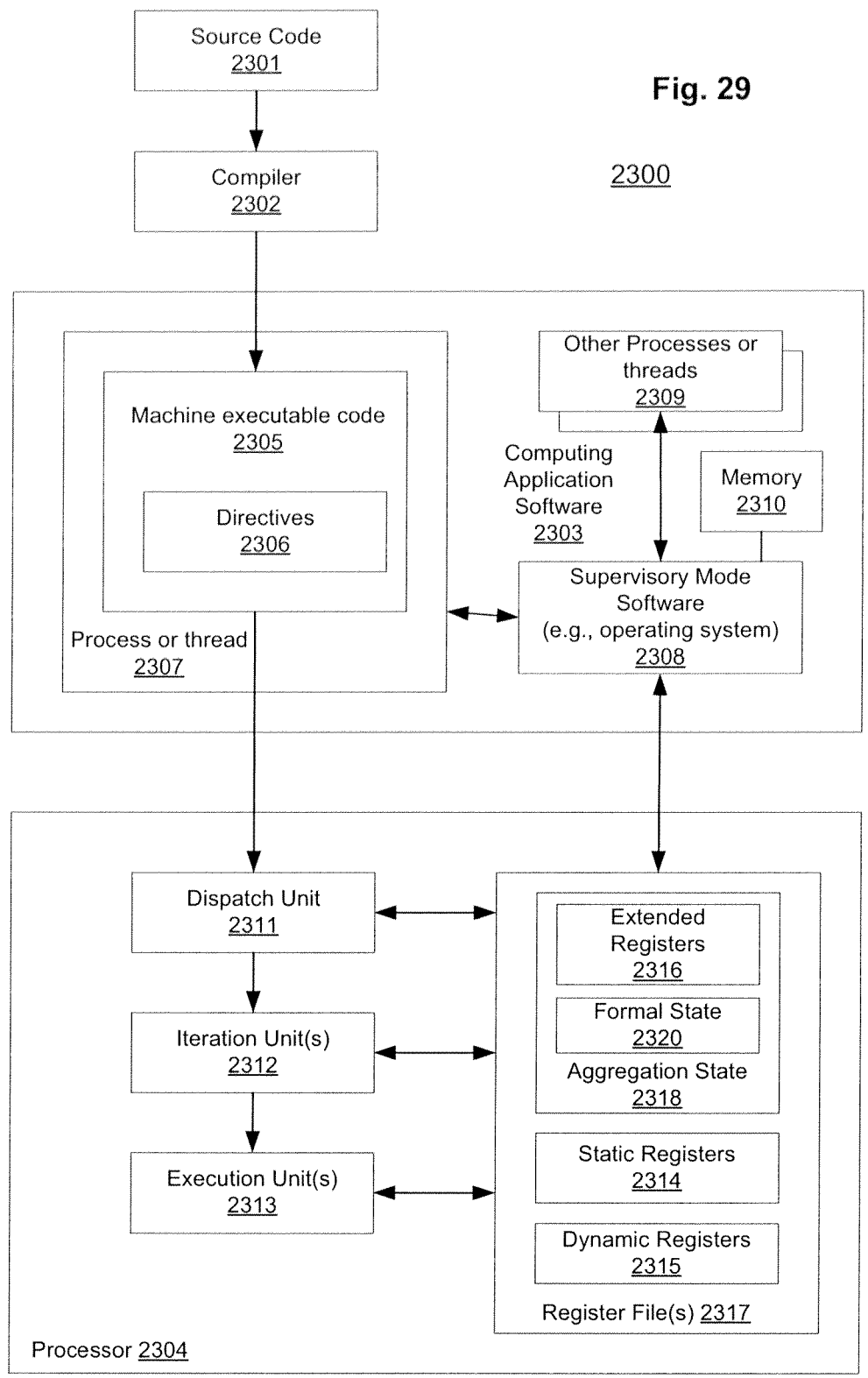
FIG. 29 is a block diagram illustrating an exemplary system according to one embodiment of the invention.

FIG. 29 is a block diagram illustrating an exemplary system for handling context switch according to one embodiment of the invention. In one embodiment, exemplary system 2300 includes, but is not limited to, a memory having computing application software therein to execute a first thread and a second thread, and a processor coupled to the memory and having one or more registers, some of the registers being used by the first and second threads when executing instructions of the first and second threads by the processor, where the computing application software communicates with the processor to perform at least one of reading and writing of at least one of the dynamic registers, including one or more extended registers when performing a context switch between the first and second threads.

Referring to FIG. 29, in one embodiment, exemplary system 2300 includes, but is not limited to, a compiler 2302 to compile one or more source code 2301. The source code 2301 may be written in variety of programming languages, such as, for example, C/C++ and assembly, etc. The compiler 2302 may be a C/C++ or an assembler compiler manufactured by a variety of vendors, such as, for example, Apple Computer and Microsoft Corporation, and/or other vendors. The compiler 2302 compiles the source code 2301 to generate a machine executable code 2305 which may be executed as a process or thread 2307 launched by supervisor mode software 2308. The supervisor mode software 2308 may also manage other processes or threads 2309 for other machine executable code.

The supervisor mode software 2308 may be a part of an operating system (OS) developed from a variety of vendors. For example, the OS may be a MacOS from Apple Computer or a Windows operating system from Microsoft Corporation. Alternatively, the OS may be a Unix or Linux operating system. Furthermore, the OS may be an embedded or real-time operating system, such as, for example, a Palm OS, etc.

In one embodiment, when compiling the source code 2301, the compiler parses the source code to identify one or more program loops that may be dynamically aggregated at execution time. For each of the program loops, the compiler 2302 may insert one or more directives 2306 in the instruction stream of machine executable code 2305. In one embodiment, the directives may identify the usage of the static and dynamic registers, such as static registers 2314 and dynamic registers 2315, and/or extended registers 2316, that are used during the loops.

The machine executable code 2305 may be generated by the compiler 2302 within the supervisor mode software 2308 of the same system. Alternatively, the machine executable code 2305 may be generated by the compiler 2303 of another system (e.g., a development system).

The machine executable code 2305 may be executed by a processor 2304 at the execution time. Processor 2304 may be implemented as exemplary processor 100 of FIG. 1A. Similar to the exemplary processor 100, processor 2304 includes, but is not limited to, a dispatch unit 2311 to receive the machine executable code 2305, determine the aggregation factor using the directives 2306 and the characteristics of the processor 2304 (e.g., latency), and dispatch selected primary instructions to one or more iteration units 2312. The iteration units 2312 generate secondary instructions, possibly using one or more static registers 2314 and dynamic registers 2315 stored in one or more register files 2317, to perform one or more iterations of the task of the dispatched instruction via one or more execution units 2313. In addition, the register files 2317 may further include an aggregation state cache 2318 for storing aggregation state when handling nested loop aggregation. In one embodiment, the aggregation state cache 2318 includes, but is not limited to, some or all of the extended registers 2316 and formal state registers 2320.

In addition, supervisor mode software 2308 has a higher privilege than other software running within the computing application software 2303. That is, the supervisor mode software 2308 may perform some operations that are not available to other software, such as, for example, accessing register files 2317 and/or aggregation state cache 2318 of processor 2304. The supervisor mode software 2308 may be stand-alone software communicatively coupled to the computing application software 2303. For example, the supervisor mode software 2308 may be developed by a manufacturer of processor 2304 and distributed to a vendor of the computing application software 2303.

In one embodiment, the supervisor mode software 2308 communicates with all the processes running on processor 2304, such as process 2307 and processes 2309. In addition, the supervisor mode software 2308 may also access the register files 2317 of the processor 2304, including read and write operations. When a context switch occurs, for example, from process 2307 to one of the other processes 2309, the supervisor mode software 2308 may access the register files 2317 to save all of the values of registers in the register files 2317 in the memory 2310 before performing the context switch. Thereafter, when another context switch occurs from one of the other processes 2309 back to process 2307, the supervisor mode software 2308 may access the register files 2317 again to restore the values of the registers in the register files 2317.

The supervisor mode software 2308 may access the register files 2317 of processor 2304 in a variety of manners. For example, the supervisor mode software 2308 may access the register files 2317 via one or more device drivers and/or BIOS (basic input/output system) system. Alternatively, the supervisor mode software 2308 may access the register files 2317 via one or more memory mapped registers corresponding to the registers of the register files in a dedicated memory region. Other configurations may exist.

Figure 30:
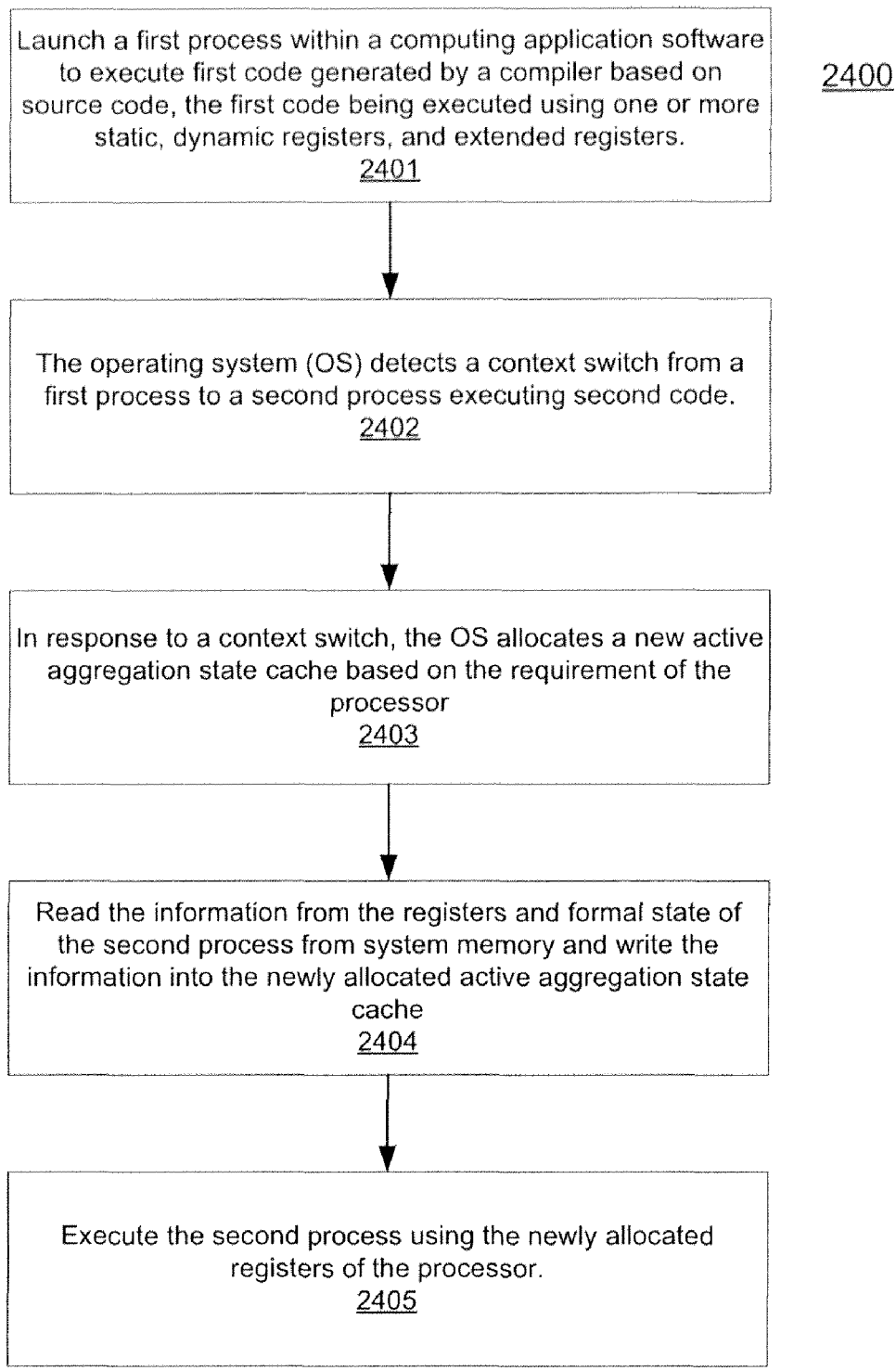
FIG. 30 is a flow diagram of an exemplary process for context switch according to one embodiment of the invention.

FIG. 30 is a flow diagram of an exemplary process for context switch according to one embodiment of the invention. Exemplary process 2400 may be performed by a processing logic that may comprise hardware (circuitry, dedicated logic, etc.), software (such as is run on a dedicated machine), or a combination of both. In one embodiment, exemplary process 2400 includes, but is not limited to, launching within an operating system (OS) a first thread for executing first code and a second thread for executing second code, and communicating between the OS and a processor that executes the first and second instructions to access one or more registers of the processor used by the first and second threads, when the OS performs a context switch between the first and second threads.

Referring to FIGS. 29 and 30, at block 2401, a first process or thread (e.g., process 2307) is launched within an operating system (e.g., computing application software 2303) to execute first code generated by a compiler (e.g., compiler 2302) based on source code (e.g., source code 2301). The first code is executed using one or more static registers and dynamic registers (e.g., some or all of the static registers 2314 and dynamic registers 2315), and extended registers (e.g., some or all of the extended registers 2316). At block 2402, the OS initiates a context switch from the first process to a second process (e.g., processes 2309) executing a second code.

At block 2403, the OS allocates a new set of aggregation state cache for the second process. At block 2404, the OS reads the information from the registers and formal state of the second process from the system memory and writes the information into the newly allocated aggregation state cache. At block 2405, the second process is executed using the newly allocated aggregation state cache. Other operations may also be performed.

Exemplary Data Stream Prefetching Mechanism

In general, accessing a memory location that is not already in the cache may require hundreds of cycles of latency before the data arrives in the processor. As a result, greater performance is achieved whenever data is in the cache. Data that is repeatedly accessed tends to remain the cache, simply because it is frequently referenced. Some classes of applications process a long sequence of data, where each element in the sequence is only accessed once. This access pattern virtually ensures that the required data will not be in the cache at the time it is needed. This type of access is also referred to as data stream and it is prevalent in multimedia applications.

In one embodiment, the data stream prefetching mechanism is used to prefetch data from the memory before they are used, to overcome the aforementioned deficiencies. Data stream prefetching is an act of reading stream data into the cache before it is requested by the software, thus minimizing the data access latency. This prediction is possible, since data streams are typically accessed in a highly regular pattern. In certain embodiments, there are two methods that can be used to initiate data stream prefetching: software directed and auto-detection. In software directed prefetch, the software program initiates the prefetch mechanism by instructing the processor directly how to prefetch the data stream.

In data stream auto-detection, according to one embodiment, the hardware attempts to identify data stream activity without direction from software. This is more difficult than receiving direction from software, but the vast majority of software does not perform software-directed prefetch. Since a macroscalar processor will typically contain a number of load/store units to access memory, and these will typically be used to execute multiple iterations of a "load" instruction in parallel, the multiple instruction units can be compared to identify a data stream access pattern.

For example, in a processor containing four load/store execution units, the address accessed by units #1 and #2 can be subtracted to determine an offset. This process can be repeated between units #2 and #3, and units #3 and #4. If all 3 offsets are substantially identical, then a data stream has been identified, and the addresses of future memory accesses from this instruction can be predicted. The current address and offset can be communicated to a data stream prefetch unit that will perform prefetching behavior based on the identification.

According to one embodiment, the memory accesses that can be prefetched may be those accessed by multiple secondary instructions corresponding to multiple iterations of a primary instruction. Such memory accesses are compared to determine the parameters that describe the corresponding data stream. The identification of the data stream may be used to cause the predicted future data accesses to be preloaded into the data cache before they are accessed by the program loop. In one embodiment, the parameters may include the address and the offset of the address for each subsequent anticipated memory access. The parameters may further include the number of the sequential accesses anticipated for a pass through the loop body.

Figure 31:
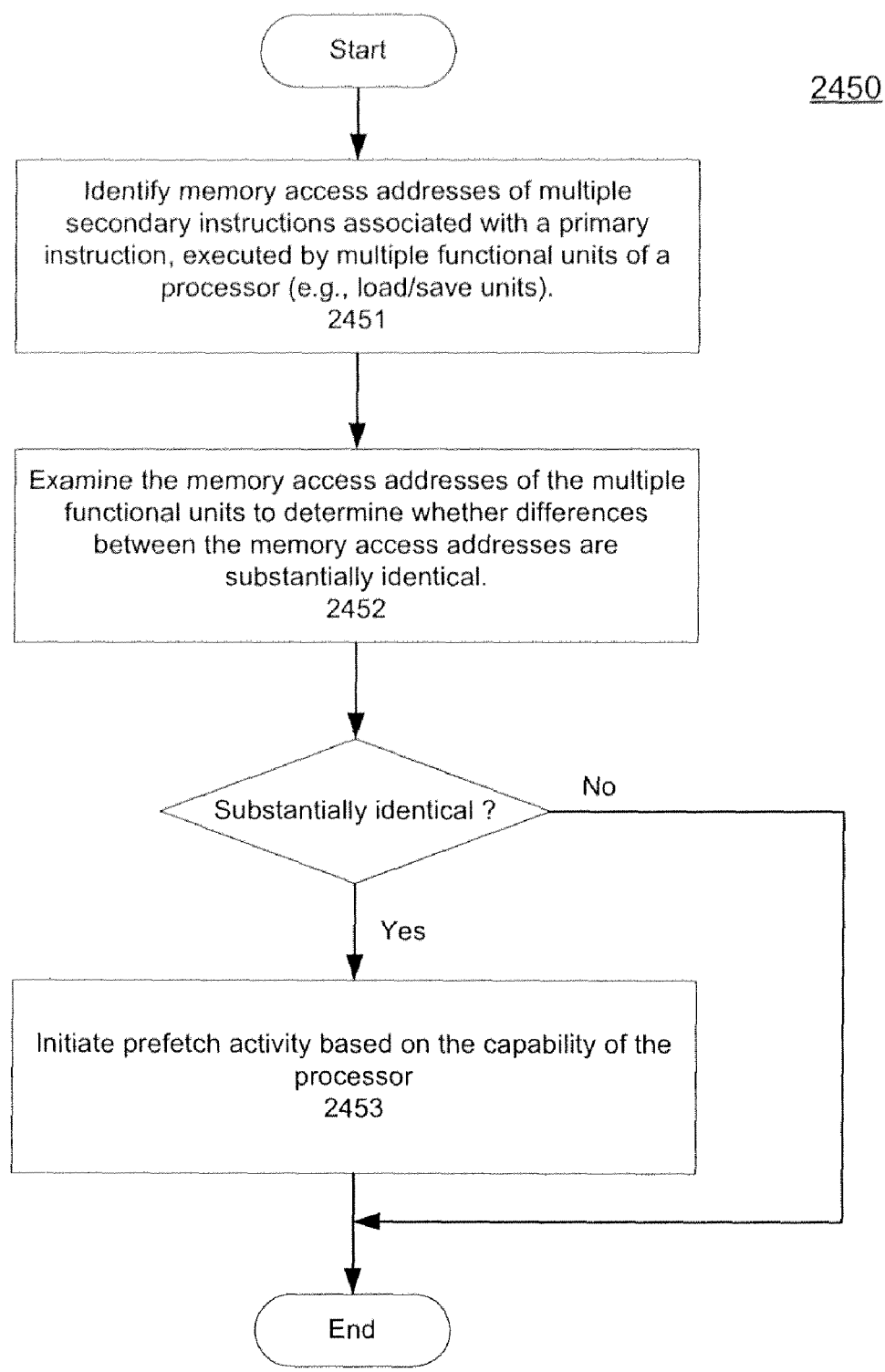
FIG. 31 is a flow diagram illustrating an exemplary process for handling data stream prefetching according to one embodiment of the invention.

FIG. 31 is a flow diagram illustrating an exemplary process for prefetching data from a memory for loop aggregation, according to one embodiment of the invention. Exemplary process 2450 may be performed by a processing logic that may comprise hardware (circuitry, dedicated logic, etc.), software (such as is run on a dedicated machine), or a combination of both.

Referring to FIG. 31, at block 2451, the processing logic identifies memory access addresses of multiple secondary instructions associated with a primary instruction, executed by multiple functional units of a processor, such as, for example, load/save units. At block 2452, the processing logic examines the memory addresses of the multiple functional units to determine whether the differences in memory address between adjacent iterations of the primary memory access instruction are substantially the same. In one embodiment, the addresses of the memory accesses may be subtracted from each other to determine whether the offsets are substantially identical. If the memory access addresses are substantially identical, at block 2453, the processing logic initiates prefetch activity based on the capability of the processor. Other operations may also be performed.

Exemplary Data Processing System

Figure 32:
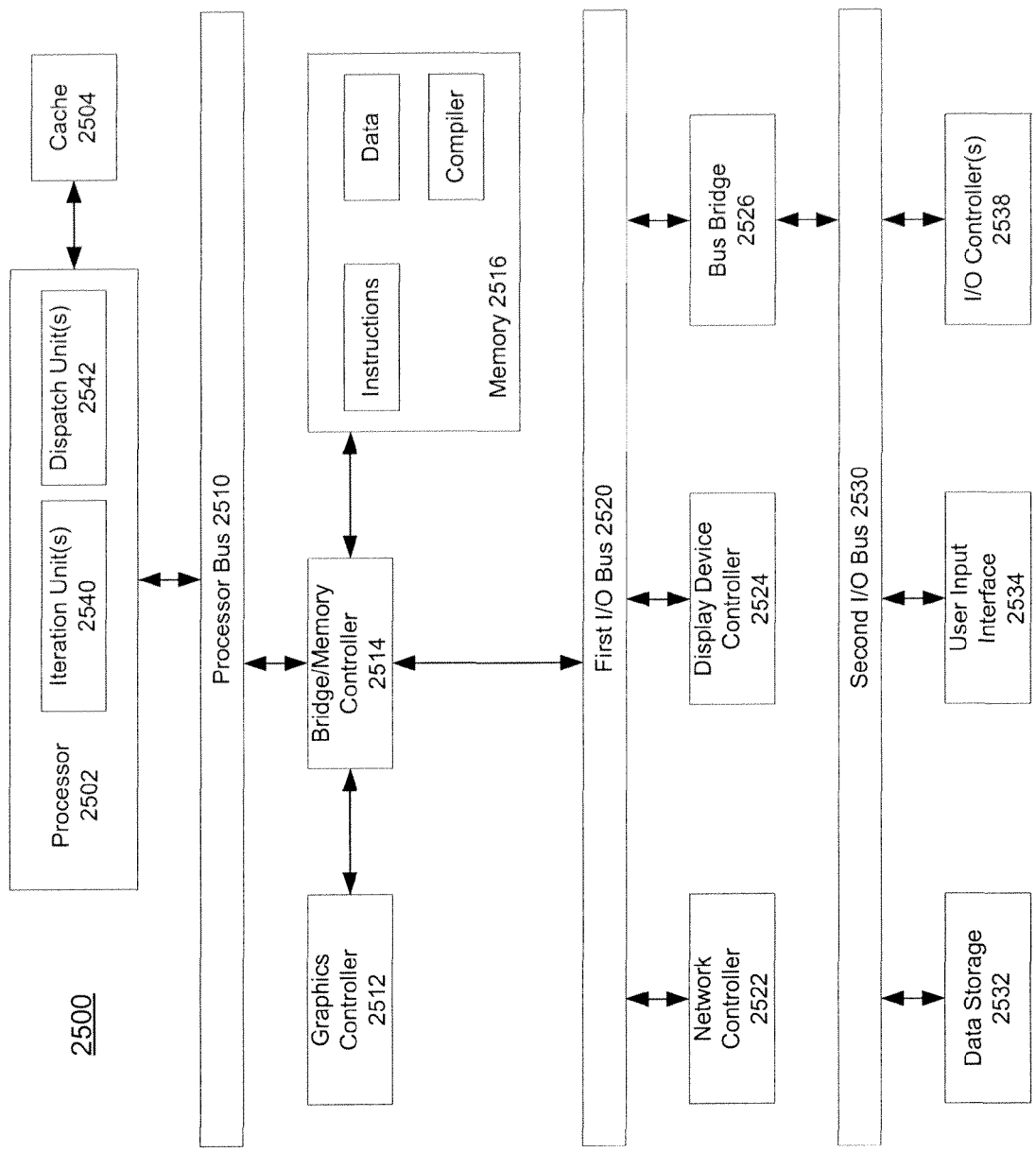
FIG. 32 is a block diagram illustrating an exemplary data processing system according to one embodiment of the present invention.

FIG. 32 is a block diagram illustrating an exemplary data processing system according to one embodiment of the present invention. The exemplary system 2500 may be used to perform the exemplary processes for dynamic loop aggregation described above. Note that while FIG. 32 illustrates various components of a computer system, it is not intended to represent any particular architecture or manner of interconnecting the components, as such details are not germane to the present invention. It will also be appreciated that network computers, handheld computers, cell phones, and other data processing systems, which have fewer components or perhaps more components, may also be used with the present invention. The computer system of FIG. 32 may, for example, be an Apple Macintosh computer or an IBM compatible PC.

Referring to FIG. 32, the computer system 2500 includes, but is not limited to, a processor 2502 that processes data signals. Processor 2502 may be an exemplary processor 100 illustrated in FIG. 1A. The processor 2502 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 32 shows an example of an embodiment of the present invention implemented as a single processor system 2500. However, it is understood that embodiments of the present invention may alternatively be implemented as systems having multiple processors. Processor 2502 may be coupled to a processor bus 2510 that transmits data signals between processor 2502 and other components in the system 2500.

In one embodiment, processor 2502 includes, but is not limited to, a dispatch unit 2540 and one or more iteration units 2542. The dispatch unit 2540 may be a dispatch unit 102 of exemplary processor 100 shown in FIG. 1A. One or more iteration units 2542 may be the iteration units 103-106 of FIG. 1A.

In addition, system 2500 includes a memory 2516. Memory 2516 may be a dynamic random access memory (DRAM) device, a static random access memory (SRAM) device, or other memory device. Memory 2516 may store instructions and/or data represented by data signals that may be executed by processor 2502. The instructions and/or data may include code for performing any and/or all of the techniques of the present invention. A compiler for compiling source code, including inserting directives for identifying static and dynamic registers used by a loop, can be residing in memory 2516 during code compilation. Memory 2516 may also contain additional software and/or data not shown. A cache memory 2504 may reside inside or outside the processor 2502 that stores data signals stored in memory 2516. Cache memory 2504 in this embodiment speeds up memory accesses by the processor by taking advantage of its locality of access.

Further, a bridge/memory controller 2514 may be coupled to the processor bus 2510 and memory 2516. The bridge/memory controller 2514 directs data signals between processor 2502, memory 2516, and other components in the system 2500 and bridges the data signals between processor bus 2510, memory 2516, and a first input/output (I/O) bus 2520. In some embodiments, the bridge/memory controller provides a graphics port for coupling to a graphics controller 2512. In this embodiment, graphics controller 2512 interfaces to a display device for displaying images rendered or otherwise processed by the graphics controller 2512 to a user. The display device may include a television set, a computer monitor, a flat panel display, or other suitable display devices.

First I/O bus 2520 may include a single bus or a combination of multiple buses. First I/O bus 2520 provides communication links between components in system 2500. A network controller 2522 may be coupled to the first I/O bus 2520. The network controller links system 2500 to a network that may include one or more processing systems and supports communication among various systems. The network of processing systems may include a local area network (LAN), a wide area network (WAN), the Internet, or other network. A compiler for compiling source code can be transferred from one computer to another system through a network. Similarly, compiled code that includes the directives inserted by the compiler can be transferred from a host machine (e.g., a development machine) to a target machine (e.g., an execution machine). In some embodiments, a display device controller 2524 may be coupled to the first I/O bus 2520. The display device controller 2524 allows coupling of a display device to system 2500 and acts as an interface between a display device and the system. The display device may comprise a television set, a computer monitor, a flat panel display, or other suitable display device. The display device receives data signals from processor 2502 through display device controller 2524 and displays information contained in the data signals to a user of system 2500.

A second I/O bus 2530 may comprise a single bus or a combination of multiple buses. The second I/O bus 2530 provides communication links between components in system 2500. A data storage device 2532 may be coupled to second I/O bus 2530. The data storage device 2532 may include a hard disk drive, a floppy disk drive, a CD-ROM device, a flash memory device, or other mass storage devices. Data storage device 2532 may include one or more of the described data storage devices.

A user input interface 2534 may be coupled to the second I/O bus 2530, such as, for example, a keyboard or a pointing device (e.g., a mouse). The user input interface 2534 may include a keyboard controller or other keyboard interface device. The user input interface 2534 may include a dedicated device or may reside in another device such as a bus controller or other controller device. The user input interface 2534 allows coupling of a user input device (e.g., a keyboard, a mouse, joystick, or trackball, etc.) to system 2500 and transmits data signals from a user input device to system 2500.

One or more I/O controllers 2538 may be used to connect one or more I/O devices to the exemplary system 2500. For example, the I/O controller 2538 may include a USB (universal serial bus) adapter for controlling USB peripherals or alternatively, an IEEE 1394 (also referred to as Firewire) bus controller for controlling IEEE 1394 compatible devices.

Furthermore, the elements of system 2500 perform their conventional functions well-known in the art. In particular, data storage device 2532 may be used to provide long-term storage for the executable instructions and data structures for embodiments of methods of dynamic loop aggregation in accordance with embodiments of the present invention, whereas memory 2516 is used to store on a shorter term basis the executable instructions of embodiments of the methods of dynamic loop aggregation in accordance with embodiments of the present invention during execution by processor 2502.

Although the above example describes the distribution of computer code via a data storage device, program code may be distributed by way of other computer readable mediums. For instance, a computer program may be distributed through a computer readable medium such as a floppy disk, a CD ROM, a carrier wave, a network, or even a transmission over the Internet. Software code compilers often use optimizations during the code compilation process in an attempt to generate faster and better code.

Exemplary Instruction Set Architecture

Classic superscalar architecture is able to execute instruction out-of-order to help hide the effects of data dependencies. Out-of-order execution also has the effect of hiding inefficiencies in the instruction set architecture (ISA) by using spare pipeline cycles. Since the goal is not to have spare cycles, certain changes to the ISA are called for.

Conditional program branches can be expensive, especially in algorithms where control-flow is data-driven and unpredictable, such as data decompression or sorting. Regardless of how well branch prediction performs, dynamically unrolled loops cannot include branching within the loop body, since it is not possible to have N copies of the program counter. Without the possibility of branching, some form of predication is called for if loops containing if/else blocks and other conditionally executed code are to be dynamically aggregated.

The amount of loop aggregating that can be performed is a determining factor in the performance of loops. This, in turn, is largely determined by the number of extended registers in the processor, divided by the number of dynamic registers required by the algorithm. Increasing the former and/or decreasing the latter until the resulting aggregation factor covers the longest pipeline used by the algorithm will result in improved performance. Making some simple enhancements to the ISA not only reduces the number of instructions required to implement a given loop, but also reduces the number of registers used, which together can have a multiplicative effect on performance.

During dynamic loop aggregation, according to one embodiment, instructions fetched from memory are altered as they are dispatched. In order to accomplish this, some instructions are actually commands intended for the dispatch-iterator. Since these commands typically affect the way subsequent instructions are dispatched, and are referred to as prefix instructions.

Exemplary Dispatch Predicate Instructions

In one embodiment, dispatch predication determines whether an instruction is dispatched. This is an efficient mechanism for implementing if/then/else constructs in aggregated code, since instructions that will not be executed do not consume pipeline slots. However, the values of the predicate registers used may be resolved before the instruction can be dispatched. In one embodiment, dispatch predication can select one of up to four instructions to be dispatched, based on the state of three selectable predicate registers. The three polarity bits are used to invert the polarity of the predicates during evaluation as indicated below, referencing the exemplary instruction encoding below.

opMacro(6), Pa(5), Pb(5), Pc(5), SelC (5), xoDP123(3), Polarity(3)

opMacro(6), Pa(5), Pb(5), Pc(5), SelC (5), xoDP4(3), Polarity(3)

In one embodiment, the predicated dispatch prefix instruction evaluates the state of predicate registers excusive-or'ed with the polarity constant, using the logical formula specified by the SelC index, the instruction designated by the logical formula is dispatched. The designated predicate registers are a data dependency within the dispatch block itself, and dispatch must stall if the contents of these registers are not yet available due to a prior calculation.

One-path predication either dispatches the following instruction, or skips it. If all three predicates are true (match the polarity bits) then the instruction is dispatched. Otherwise, it is skipped. If only one predicate is needed, then the same should be specified for Pa, Pb, and Pc. There is only one possibility for one-path predication:

0—{1,1,1} (Execute if all three predicates true)

For two-path predication, one of the subsequent two instructions is dispatched, depending on which predicate triplet in the table below matches the state of the three predicates. If the first set of triplets match, then the first instruction is dispatched. Otherwise, if the second set of triplets match, the second instruction is dispatched. If neither set of triplets match, then no instruction is dispatched. Each pair of triplets represents a different logical formula selected by the SelC field of the instruction.

1—{1,1,1} {1,1,0} Pa & Pb & Pc=Instruction #1. Pa & Pb & !Pc=Instruction #2

2—{1,1,1} {1,0,0} Pa & Pb & Pc=Instruction #1. Pa & !Pb & !Pc=Instruction #2

3—{1,1,1} {1,0,x}

4—{1,1,1} {0,0,0}

5—{1,1,1} {0,0,x}

6—{1,1,1} {0,x,x} This table accounts for all combinations of

7—{1,1,x} {1,0,x} 3-variable, 2-path nested if-then-else forms.

8—{1,1,x} {0,0,x}

9—{1,1,x} {0,x,1}

10—{1,1,x} {0,x,x}

11—{1,x,x} {0,x,x}

For three-path predication, one of the subsequent three instructions is dispatched, depending on which predicate triplet in the table below matches the state of the three predicates. If there is no match, then no instruction is dispatched. Each set of three triplets represents a different logical formula selected by the SelC field of the instruction.

12—{1,1,1} {1,1,0} {1,0,1} This table accounts for all combinations of

13—{1,1,1} {1,1,0} {1,0,x} 3-variable, 3-path nested if-then-else forms.

14—{1,1,1} {1,1,0} {0,0,1}

15—{1,1,1} {1,1,0} {0,0,x}

16—{1,1,1} {1,1,0} {0,x,1}

17—{1,1,1} {1,1,0} {0,x,x}

18—{1,1,1} {1,0,0} {0,1,0}

19—{1,1,1} {1,0,0} {0,1,x}

20—{1,1,1} {1,0,0} {0,x,x}

21—{1,1,1} {1,0,0} {x,1,0}

22-{1,1,1} {1,0,x} {0,1,x}

23—{1,1,1} {1,0,x} {0,0,0}

24—{1,1,1} {1,0,x} {0,0,x}

25—{1,1,1} {1,0,x} {0,x,1}
26—{1,1,1} {1,0,x} {0,x,0}
27—{1,1,1} {1,0,x} {0,x,x}
28—{1,1,x} {1,0,x} {0,1,x}
29—{1,1,x} {1,0,x} {0,x,1}
30—{1,1,x} {1,0,x} {0,x,x}
31—{1,1,x} {0,x,1} {x,0,0}

For four-path predication, one of the subsequent four instructions is dispatched, depending on which predicate triplet in the table below matches the state of the three predicates. If there is no match, then no instruction is dispatched. Each set of four triplets represents a different logical formula selected by the SelC field of the instruction.

0—{1,1,1} {1,1,0} {1,0,1} {1,0,0} This table accounts for all combinations of
1—{1,1,1} {1,1,0} {1,0,1} {0,1,1} 3-variable, 4-path nested if-then-else forms.
2—{1,1,1} {1,1,0} {1,0,1} {0,1,0}
3—{1,1,1} {1,1,0} {1,0,1} {0,1,x}
4—{1,1,1} {1,1,0} {1,0,1} {0,0,0}
5—{1,1,1} {1,1,0} {1,0,1} {0,0,x}
6—{1,1,1} {1,1,0} {1,0,1} {0,x,x}
7—{1,1,1} {1,1,0} {1,0,1} {x,0,0}
8—{1,1,1} {1,1,0} {1,0,x} {0,1,x}
9—{1,1,1} {1,1,0} {1,0,x} {0,0,1}
10—{1,1,1} {1,1,0} {1,0,x} {0,0,x}
11—{1,1,1} {1,1,0} {1,0,x} {0,x,1}
12—{1,1,1} {1,1,0} {1,0,x} {0,x,x}
13—{1,1,1} {1,1,0} {0,0,1} {0,0,0}
14—{1,1,1} {1,1,0} {0,0,1} {0,x,0}
15—{1,1,1} {1,1,0} {0,x,1} {0,x,0}
16—{1,1,1} {1,1,0} {0,x,1} {x,0,0}
17—{1,1,1} {1,0,0} {0,1,0} {0,0,1}
18—{1,1,1} {1,0,0} {0,0,x} {0,0,x}
19—{1,1,1} {1,0,0} {0,1,x} {0,0,x}
20—{1,1,1} {1,0,0} {0,1,x} {x,0,1}
21—{1,1,1} {1,0,0} {x,1,0} {x,0,1}
22—{1,1,1} {1,0,x} {0,1,x} {0,0,0}
23—{1,1,1} {1,0,x} {0,1,x} {0,0,x}
24—{1,1,1} {1,0,x} {0,0,0} {0,x,1}
25—{1,1,1} {1,0,x} {0,0,x} {x,1,0}
26—{1,1,1} {1,0,x} {0,0,x} {x,1,0}
27—{1,1,x} {1,0,x} {0,1,x} {0,0,x}
28—{1,1,x} {1,0,x} {0,x,1} {0,x,0}
29—Unused.
30—Unused.
31—Unused.

Dispatch predication allows nested if/then/else statements to be implemented without branches. Below are some examples according to certain embodiments:

One-Path predication:

```
        if (Pa)       // (SelC = 0)
            {1,1,1}
```

Two-Path predication:

```
        if (Pa)       // (SelC = 11)
            {1,x,x}
        else
            {0,x,x}
```

Three-Path Predication:

```
        if (Pa)       // (SelC = 30)
            if (Pb)
                {1,1,x}
            else
                {1,0,x}
        else
            {0,x,x}
```

Four-Path Predication:

```
        if (Pa)       // (SelC = 28)
            if (Pb)
                Instruction #1 {1,1,x}
            else
                Instruction #2 {1,0,x}
        else
            if (Pc)
                Instruction #3 {0,x,1}
            else
                Instruction #4 {0,x,0}
```

Four-Path Predication requiring altered polarity:

```
        if (Pa)       // (SelC = 12, Polarity=111)
            Instruction #4 {0,x,x}
        else if (Pb)
            Instruction #3 {1,0,x}
        else if (Pc)
            Instruction #2 {1,1,0}
        else
            Instruction #1 {1,1,1}
```

Note that the above exemplary instructions are described for purposes of illustration only. It will be appreciated that the names and structures of the specific instructions may vary without departing the spirit and scope of the embodiments of the present invention. Other instructions apparent to those with ordinary skill in the art may also be implemented.

In one embodiment, architected processor registers are configured as either static or dynamic registers at the commencement of loop aggregation. In yet another embodiment, the processor may contain separate sets of static and dynamic registers. In one embodiment, there may be separate extended register sets to hold integer and floating-point extended registers. In another embodiment, integer and floating-point extended registers may be shared from a pool of generic registers.

In one embodiment, predicate registers may be single-bit registers. In another embodiment, predicate registers may be general-purpose integer registers. In one embodiment, slices of extended registers are exclusively associated with a fraction of the execution units in the processor, thereby reducing the number of access ports required by the registers files, and also making it possibly to add additional execution unit simply by adding additional set of extended registers.

Note that for the purposes of illustration, a compiler has been used as an example throughout the present application to perform some of the above processes. It will be appreciated that some of the above processes may also be performed by other components when the executable program is created, such as, for example, a linker, an assembler, or a software developer.

Exemplary Executions of Sequence Blocks

In a macroscalar architecture, the performance of sequence blocks within an algorithm imposes a limiting factor on the performance of the algorithm overall. For large aggregation factors, results from early iterations may become available long before later iterations. If subsequent sequence blocks having data or structural dependent upon earlier vector blocks would be forced to wait to begin execution until the completion of the preceding vector blocks, the processor will be underutilized during execution of the sequence block.

According to one embodiment, a method is used to allow an execution of a sequence block to overlap with the execution of one or more vector blocks (e.g., neighboring vector blocks). This requires the sequence block to begin execution in anticipation of its formal program order. In most cases, this can result in complete or partial amortization of the sequence block by the overlapping vector blocks, effectively reducing the performance impact of the sequence block.

For example, according to one embodiment, sequence blocks encountered during instruction prefetch are immediately prepared for execution, regardless of their ordering in the instruction stream. A sequence block does not span subroutine calls or conditional branches with unresolved determinants. Anticipatory execution is not predicted. It is undertaken when the sequence block is certain to execute. Where there is a resource between sequence block instructions vector block instructions, according to one embodiment, the instructions originating from the sequence block are given priority. Vector blocks scheduled to execute after a sequence block are allowed to overlap execution of the sequence block, resolving pending data dependencies.

There are several factors which may limit anticipatory execution of sequence blocks. According to one embodiment, dependencies relied upon by instructions in the sequence block need to be resolved before those instructions may execute. Memory writes need to occur in order with other memory operations. A write to a particular static register need to occur in order with other operations on the same static register. Vector block instructions that update static registers or a memory are given priority over sequence block instructions where the above ordering rules would prevent the use of multiple execution resources during that cycle.

For example, according to one embodiment, when a sequence-block instruction might require the use of one of the FPU's of the processor, but a vector block is using all of the FPU's for a vector block operation, the sequence block may be given the use of the FPU for that cycle, and the iteration of the vector block designated for that particular PFU may be stalled and may be executed in a following cycle. Since vector block instructions are insensitive to execution order, this avoids resulting in incorrect program behavior.

Figures 33A, 33B:
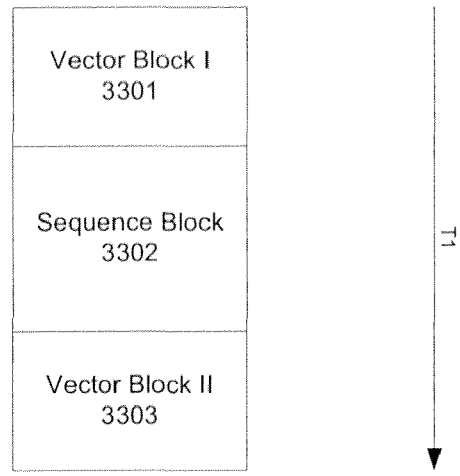
FIGS. 33A and 33B are block diagrams illustrating a typical execution of instructions of a program loop using a macroscalar processor, according to one embodiment.

FIGS. 33A and 33B are block diagrams illustrating a typical execution of instructions of a program loop using a macroscalar processor, according to one embodiment. In this example, referring to FIG. 33A, the instructions of a program loop includes a first vector block 3301, a sequence block 3302, and a second vector block 3303. The vector block 3301 is intended to be executed first followed by sequence block 3302 and vector block 3303.

For the illustration purposes only, it is assumed that vector block 3301 includes three instructions V0, V1, and V2 and the sequence block 3302 includes two instructions S3 and S4. Four slices of a macroscalar processor are used, where each slice has its own logically or physically iteration and execution unit(s). An example of slices of a macroscalar processor is showed in FIG. 23. Typically, referring to FIG. 33B, vector block instructions V0-V2 are executed in parallel 3351 by all slices. Thereafter, sequence block instructions S3 and S4 are executed sequentially by each slice as shown in 3352. Since the sequence block instructions cannot be iterated in parallel, while one of the slice is executing S3 and S4 in an iteration, other slices are idle as indicated by "—" as shown in FIG. 33B. In addition, such executions take longer since not all slices are being used concurrently during the sequence block execution. As a result, some slices may be under-utilized while a sequence block is being executed.

Figures 34A, 34B:
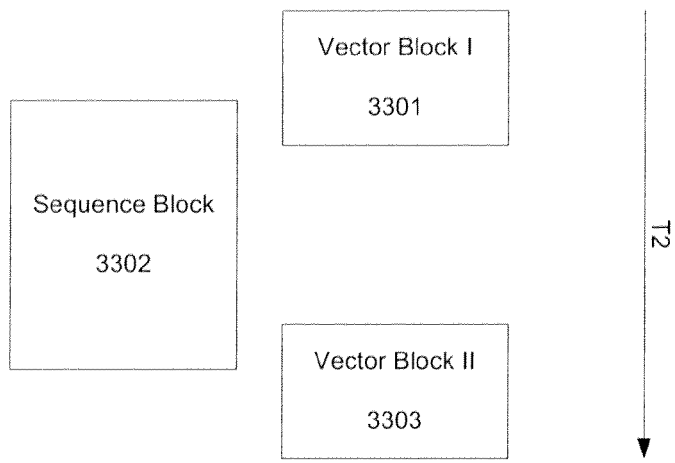
FIGS. 34A and 34B are block diagrams illustrating an exemplary executions of overlapped vector and sequence blocks according to one embodiment.

FIGS. 34A and 34B are block diagrams illustrating an exemplary executions of overlapped vector and sequence blocks according to one embodiment. In this embodiment, referring to FIG. 34A, at least portions of the vector blocks 3301 and 3303 are overlapped with the sequence block 3302 when executed. As a result, the time to execute these instructions T2 will be shorter than the time T1 shown in FIG. 33A.

According to one embodiment, during an iteration of a vector block, a slice of the macroscalar processor is preempted to execute a sequence block assigned to that slice in parallel with other slices executing the rest of the vector blocks. The preempted vector block by that slice may be executed in the subsequent iterations following the execution of the sequence block by that slice.

Referring to FIG. 34B, during the iterations 3401, slice 0 is preempted to execute sequence block instructions $S3_0$ and $S4_0$. That is, instead of executing vector block instructions $V0_0$ and $V0_4$, the preempted slice 0 is used to execute in parallel with other slices 1-3 that are executing vector block instructions $V0_1$ and $V0_7$. The preempted vector block instructions $V0_0$ and $V0_4$ are executed in the subsequent iterations 3402 during which sequence block instructions $S3_1$ and $S4_1$ are executed by another slice (e.g., slice 1). Similar operations are performed during iterations 3403 and 3404 for slices 2-3. As a result, the total execution time for vector block 3301 and sequence block 3302 may be greatly reduced. Similarly, it will be appreciated that executions of sequence block 3302 and vector block 3303 may be overlapped using the techniques described above. In one embodiment, the overlapping execution may be performed if there is no dependency between the vector blocks and the sequence blocks. According to one embodiment, the rearrangement of the instructions may be performed by a compiler in a dispatch unit (e.g., dispatch unit 102 of FIG. 1) of a processor, or a combination of both.

Figure 35:
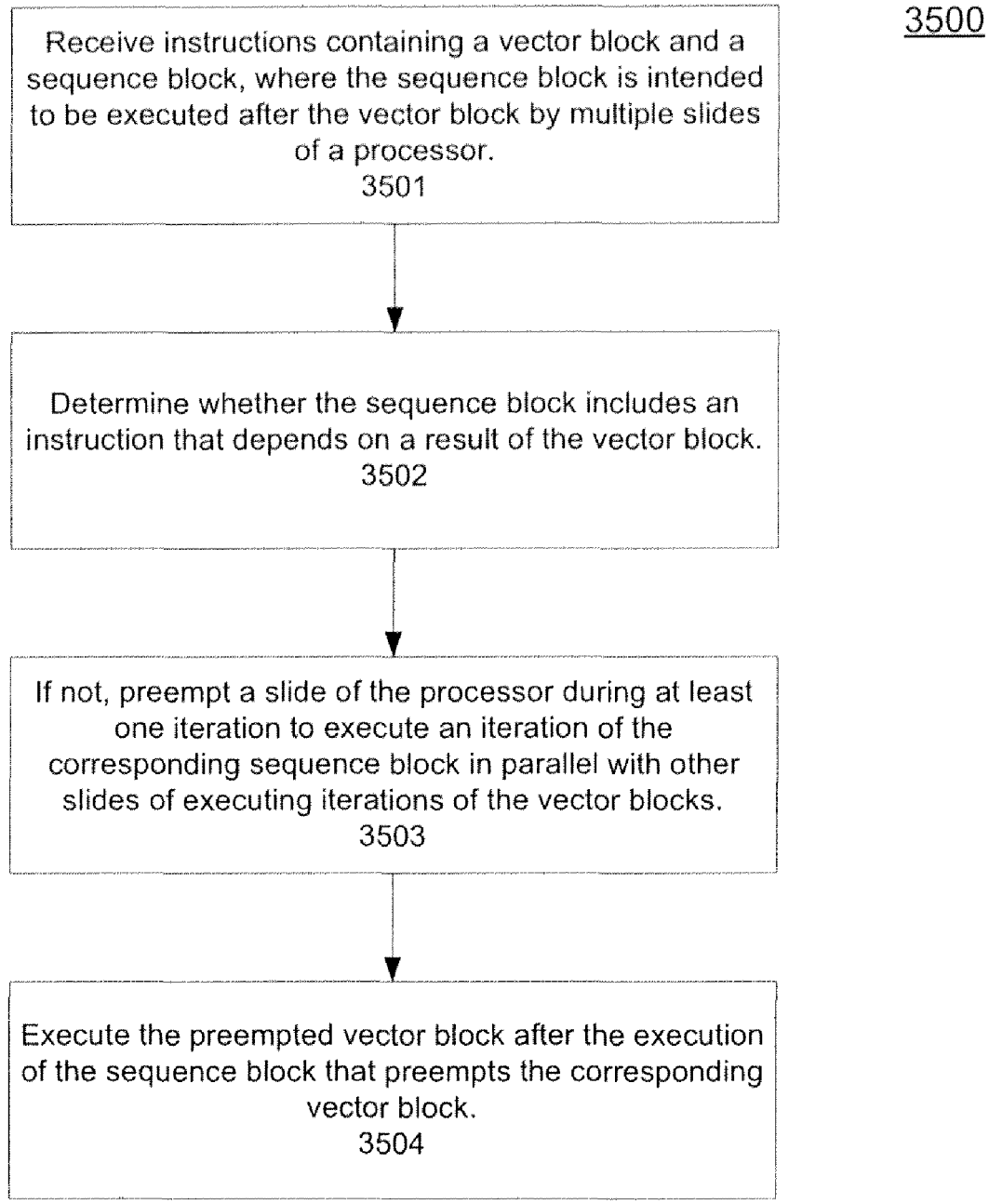
FIG. 35 is a flow diagram illustrating an exemplary process for executing sequence block instructions according to one embodiment.

FIG. 35 is a flow diagram illustrating an exemplary process for executing sequence block instructions according to one embodiment. Exemplary process 3500 may be performed by a processing logic that may comprise hardware (circuitry, dedicated logic, etc.), software (such as is run on a dedicated machine), or a combination of both. In one embodiment, exemplary process 3500 includes, but is not limited to, receiving by the processor instructions of a program loop having a vector block and a sequence block intended to be executed after the vector block. The processor includes one or more slices and each of the slices is capable of executing an instruction of an iteration of the program loop substantially in parallel. For each iteration of the program loop, an instruction of the sequence block is executed using one of the slices while executing instructions of the vector block using a remainder of the slices substantially in parallel.

Referring to FIG. 35, at block 3501, a processing logic receives instructions of a program loop containing a vector block and a sequence block, where the sequence block is intended to be executed after the vector block by multiple slices of the processor. At block 3502, the processing logic determines whether the sequence block includes an instruction that depends from a result of the vector block execution.

If not, at block 3503, a slice of the processor is preempted during at least one cycle (e.g., slice 0 of iterations 3401 of FIG. 34B) during which an execution of the sequence block is performed in parallel with other slices (e.g., slices 1-3 of FIG. 34B) executing iterations of the vector block. Note that each cycle may include one or more iterations. At block 3504, the preempted vector block is executed after the execution of the sequence block by the corresponding slice. Other operations may also be performed.

Exemplary Architected Register Set Expansion

Macroscalar processors utilize the architected registers (e.g., a total of 32 architected registers of a PowerPC processor) as designators for both static and dynamic registers used during loop aggregation. However, there are cases where the number of static and dynamic registers required by a loop may be greater than a number of total architected registers of a particular platform. Since macroscalar processors contain a large pool of extended registers for use during loop aggregation, according to one embodiment, a method is provided for accessing these extended registers to be utilized to expand the number of dynamic registers available during loop aggregation. This is typically useful when an instruction sets limits a field to specify a register to a number of bits, such as, for example, 5 bits. As a result, the registers that can be referenced as limited to the total number or registers limited by a particular architecture unless the instruction set has to be redesigned.

Figure 36A:
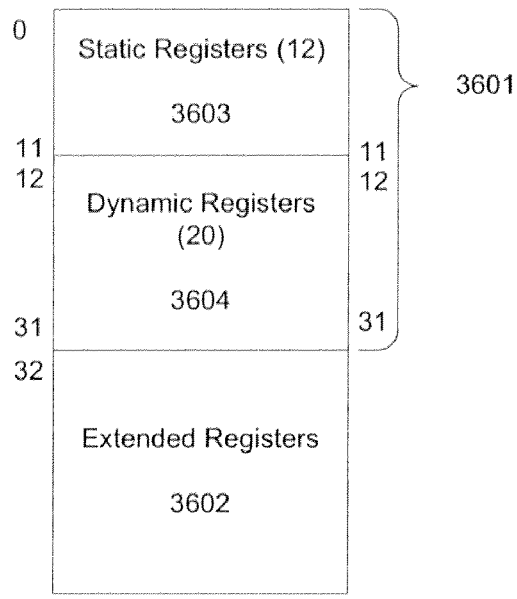
FIGS. 36A-36C are block diagrams illustrating an exemplary register set expansion according to one embodiment.
Figure 36B:
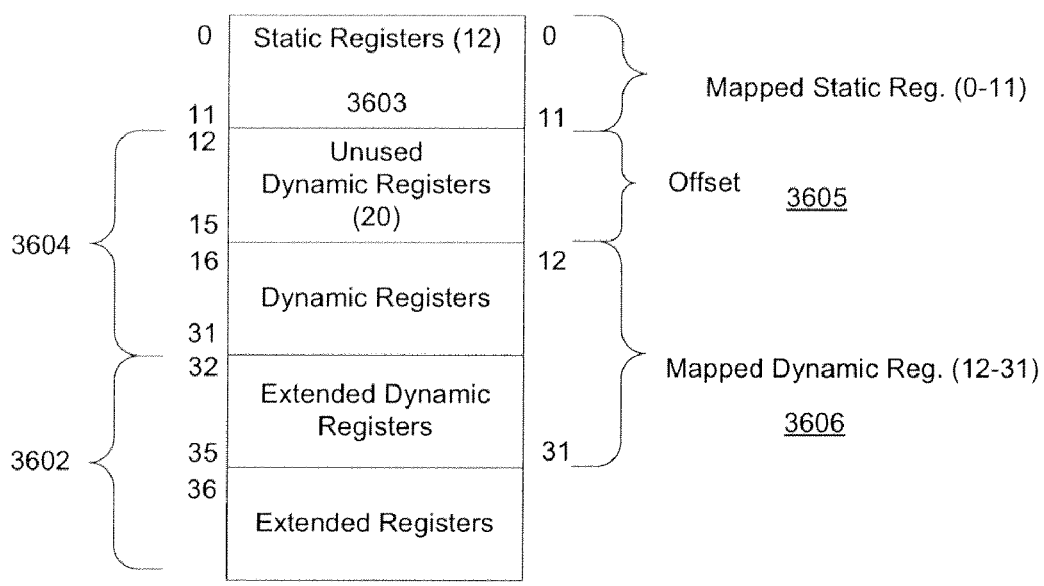
Figure 36C:
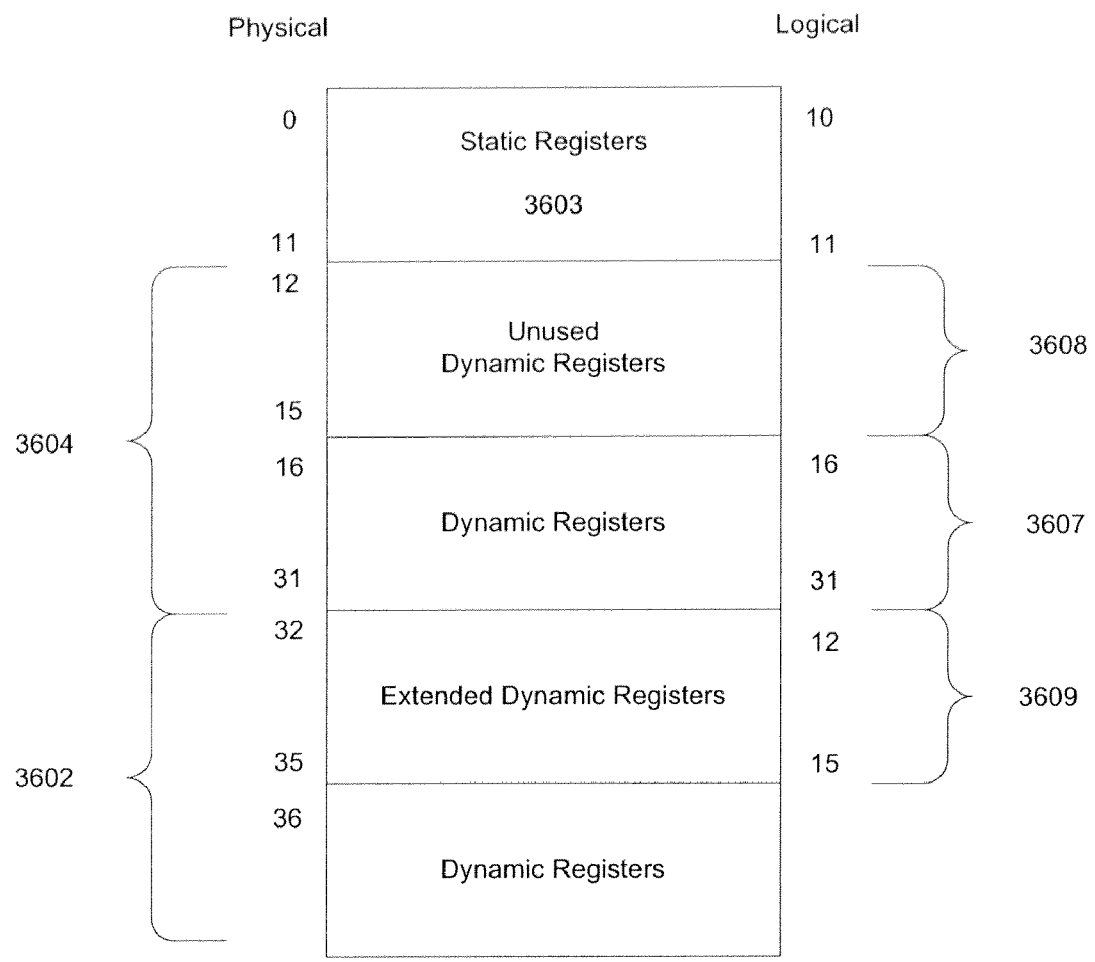

FIGS. 36A-36B are block diagrams illustrating an exemplary register set expansion according to one embodiment. For the illustration purposes, it is assumed that a processor includes 32 architected registers as shown in FIG. 36A. Referring to FIG. 36A, the register set of a processor includes architected register set 3601, which includes static register set 3603, dynamic register set 3604, and extended register set 3602. In one embodiment, when the architected registers need to expand, referring to FIG. 36B, an offset 3605 is added to the register number used during all dynamic register accesses resulting in mapped (e.g., shifted) dynamic register set 3606 using a portion of the extended register set 3602. This has the advantage of having no upper limit to the number of registers accessible to the loop aggregation. It also effectively renames all dynamic registers 3606.

According to an alternatively embodiment, only a portion of the dynamic registers is shifted using one or more extended registers, as shown in FIG. 36B. In a particular embodiment, an offset is added to the register number used for a dynamic register access, but only if the dynamic register number referenced is greater than a predetermined threshold. This has the advantage of only renaming a minimal number of dynamic registers, but is limited to a maximum capability of doubling the number of dynamic registers accessible to the loop aggregation as shown in FIG. 36B.

Figure 37:
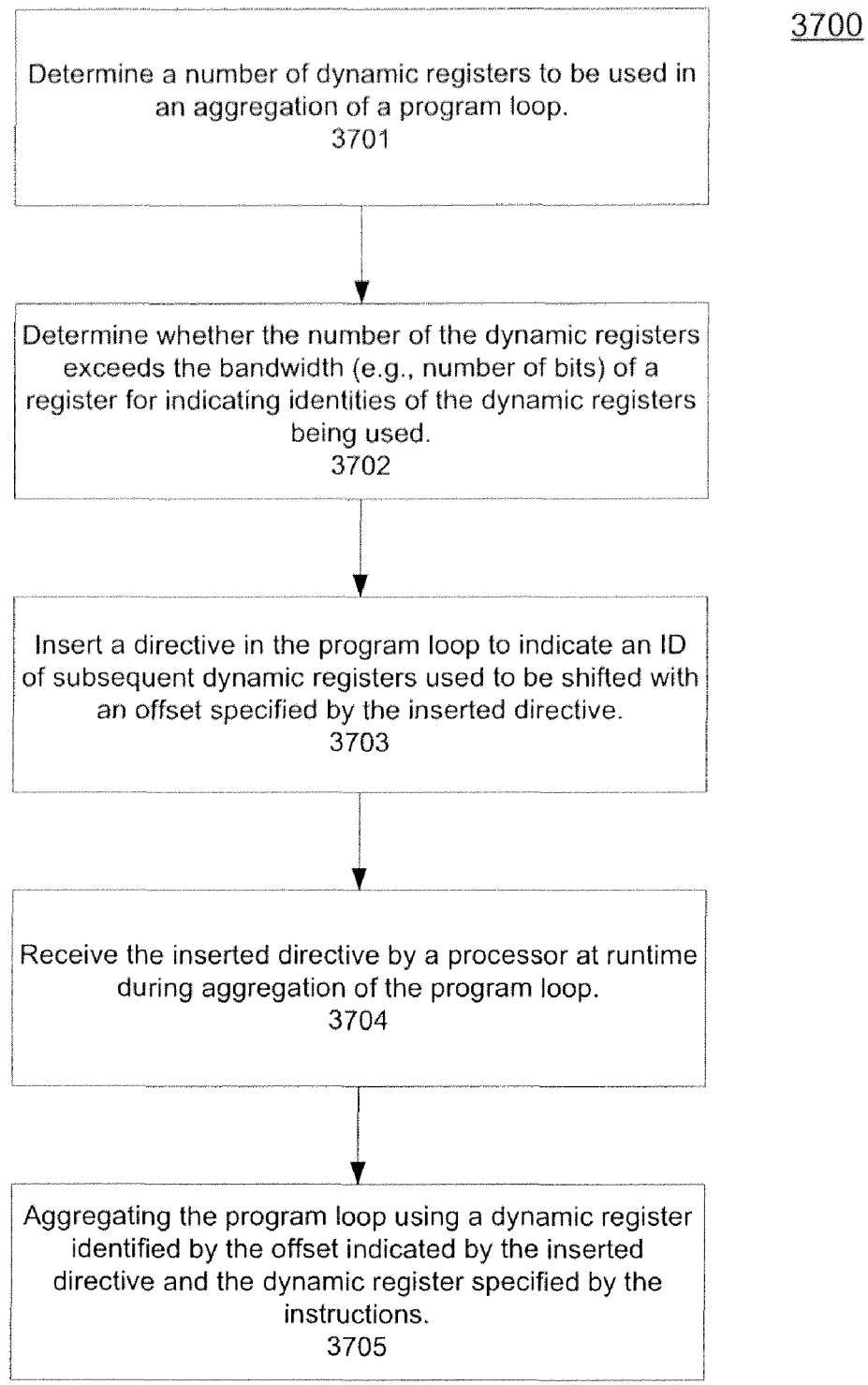
FIG. 37 is a flow diagram illustrating an exemplary process for mapping registers of a processor according to one embodiment.

FIG. 37 is a flow diagram illustrating an exemplary process for mapping registers of a processor according to one embodiment. Exemplary process 3700 may be performed by a processing logic that may comprise hardware (circuitry, dedicated logic, etc.), software (such as is run on a dedicated machine), or a combination of both. In one embodiment, exemplary process 3700 includes, but is not limited to, determining whether a number of dynamic registers of a processor to be used in a program loop exceeds a predetermined threshold, where the processor including one or more static registers, dynamic registers, and extended registers. One or more of the extended registers are allocated to be used in the program loop in place of at least a portion of the determined number of dynamic registers intended to be used in the program loop, such that a number of dynamic registers used in aggregating the program loop does not exceed the predetermined threshold.

Referring to FIG. 37, at block 3701, the processing logic (e.g., a compiler) determines a number of dynamic registers to be used in an aggregation of a program loop. At block 3702, the processing logic determines whether a number of the dynamic registers exceeds the width (e.g., number of bits to specify the registers) of a field for indicating the dynamic registers being used. If so, at block 3703, one or more directives are inserted into the code to indicate certain subsequent dynamic registers used to be shifted with an offset specified by the inserted directives. Subsequently, at block 3704, the code having the inserted directives is received by a processor executing the instructions. At block 3705, the program loop is aggregated using one or more dynamic registers identified by the offset indicated by the inserted directives and the dynamic registers specified by the instructions. Other operations may also be performed.

According to one embodiment, one or more directives may be inserted into the code stream to specify which of the registers will be shifted and/or the predetermined threshold, for example, by a compiler, a dispatch unit of a processor, or in combination of both.

Exemplary Enhancements of Sequence Block Efficiency

In a macroscalar architecture, sequence blocks are one of the primary performance-limiting constructs. Within sequence blocks, several classes of frequently used algorithmic forms have emerged as fundamental primitive sequence used repeatedly across many different circumstances and algorithms. Since not all sequence blocks found in macroscalar code can be removed, it becomes important to support efficient sequence block execution for those sequence blocks that cannot be eliminated through other means.

For example, in cases where a static register is referenced throughout a program loop between updates, it is possible to reduce the number of instructions of the static block associated with updating the static register by copying the value of the static register at each iteration into an iteration-specific dynamic register for later use. It is frequently the case that the static block is reduced entirely to updating the static register and copying it to the dynamic register. According to one embodiment, two operations may be combined into a single instruction that can be executed every cycle.

According to one embodiment, certain instructions or directives may be designed to implement these approaches as follows:

Copy_on_Read.

Copy_on_Write.

These instructions or prefixes allow data to be copied to an additional destination register, but without requiring additional instructions to accomplish this. They are modifiers to existing instructions, allowing the result of mathematical operations to be copied to one or more destination registers. In the case of Copy_on_Read instructions, one of the inputs to the execution unit is copied to the alternate destination register. In the case of Copy_on_Write instructions, the calculated result is copied to the alternate destination register.

In one embodiment, these instructions or directives may be inserted into the code stream by a compiler when compiling a source code. Alternatively, these instructions or directives may be inserted by a dispatch unit of a processor when dispatching instructions to an iteration unit and/or execution unit for iterations. Further, these operations may be performed by a combination of both the compiler and the dispatch unit.

Figure 38A:
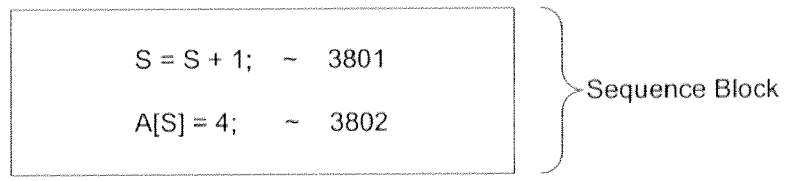
FIGS. 38A-38D are diagrams illustrating an exemplary enhancement of a sequence block execution according to one embodiment.
Figure 38B:
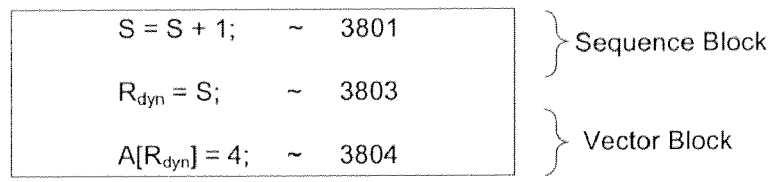
Figure 38C:
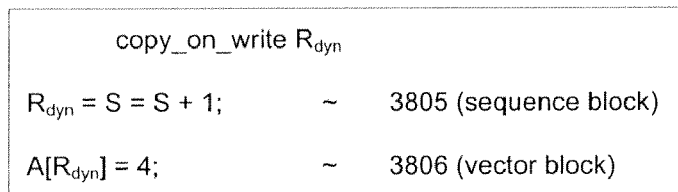

FIGS. 38A-38C are diagrams illustrating an exemplary enhancement of a sequence block execution according to one embodiment. For example, as shown in FIG. 38A, an instruction 3801 is executed to write to a variable "S" and later on "S" is used as an index of an array which is assigned to a value (instruction 3802). Since the second instruction 3802 depends on a result of the first instruction 3801 (e.g., value of "S"), the instructions of FIG. 38A would be considered as a sequence block. When a macroscalar processor aggregates the program loop shown in FIG. 38B typically, a dynamic register $R_{dyn}$ is used to hold a copy of value of "S" for the iterations (instruction 3803). Thereafter, $R_{dyn}$ is used as an index for subsequent instructions 3804. With the above Copy_on_Write, the first two instructions of FIG. 38B 3801 and 3803 may be combined as shown in FIG. 38C. When the variable "S" is assigned to a value, the value may also be copied to a specified dynamic register on a single instruction execution (instruction 3805). As a result, the second execution (e.g., instruction 3803) of FIG. 38B may be removed and the efficiency of the sequence block execution is improved. Two outputs from each execution unit also allow simplified connection to the register files, since each output is connected to either the static or dynamic register path, but not to both. According to one embodiment, the directives of Copy_on_Write may be inserted into the code stream by a compiler, a dispatch unit of a processor, or a combination of both.

Figure 38D:
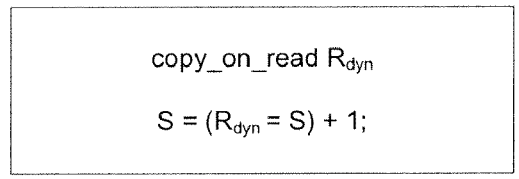
Figure 39:
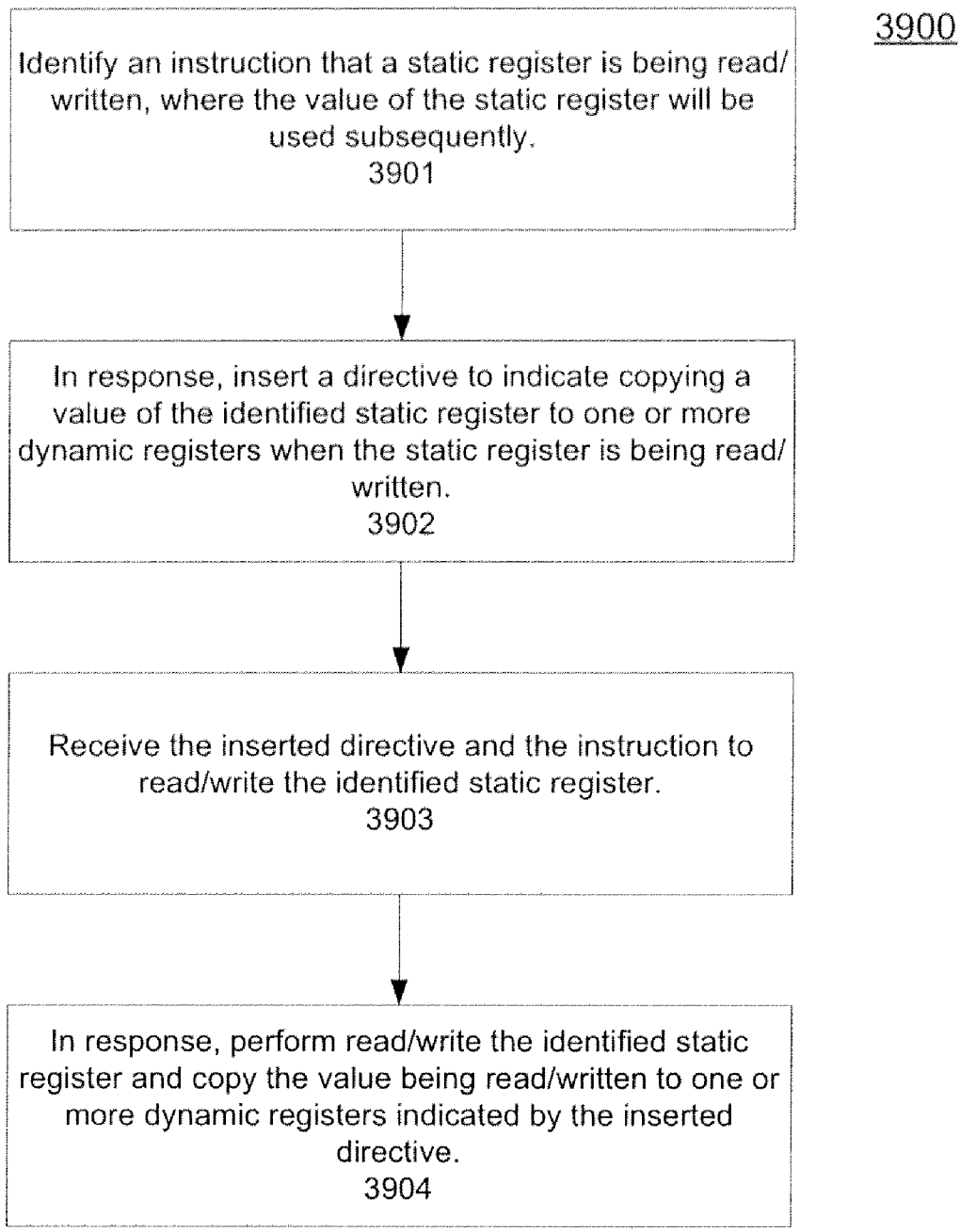
FIG. 39 is a flow diagram illustrating an exemplary process for enhancing sequence block execution according to one embodiment.

FIG. 39 is a flow diagram illustrating an exemplary process for enhancing sequence block execution according to one embodiment. Exemplary process 3900 may be performed by a processing logic that may comprise hardware (circuitry, dedicated logic, etc.), software (such as is run on a dedicated machine), or a combination of both. In one embodiment, exemplary process 3900 includes, but is not limited to, identifying a static register of a processor to be accessed by an instruction of an iteration of a program loop, where a value of the static register is used in a subsequent iteration. In response to the instruction executed by the processor, the value of the static register is copied to a dynamic register of the processor, where the dynamic register is used in the subsequent iteration of the program loop. The value of the static register is copied without additional instructions from source code corresponding to the instruction of the iteration received by the processor. Similarly, as shown in FIG. 38D, in the case of Copy_on_Read, the value of S is read and copied into $R_{dyn}$ before perform "S=S+1" operation.

Referring to FIG. 39, at block 3901, the processing logic identifies an instruction of a program loop that a static register to be accessed (e.g., read or write operation), where the value of the static register may be used in subsequently within the program loop. In response, at block 3902, the processing logic inserts one or more directives to indicate copying a value of the identified static register to one or more dynamic registers when the static register is accessed. In one embodiment, the above operations may be performed by a compiler, a dispatch unit of a processor, or a combination of both. Subsequently, at block 3903, the modified instructions including the inserted directives are received by a processor. In response, at block 3904, the static register is accessed and a value of the static register is copied into one or more dynamic registers identified by the one or more directives. Other operations may also be performed.

Within sequence blocks, it is sometimes the case that the code for one branch of conditionally executed code is longer than the opposite branch. In this case, it is desirable for the shorter path to be able to direct the next iteration of the sequence block to begin as soon as the task of the shorter path is complete. In one embodiment, an instruction or directive is used to direct a current iteration to stop and to start a next iteration immediately dependent upon a predicate condition, for example, by a compiler, a dispatch unit of a processor, or a combination of both. In a particular embodiment, an example of the instruction or directive is illustrated as follows:

Directed_Next_Iteration

This instruction immediately causes the next iteration of a sequence block to begin execution immediately, without requiring that the end of the sequence block be reached (e.g., the rest of the sequence block of a current iteration).

Figure 40A:
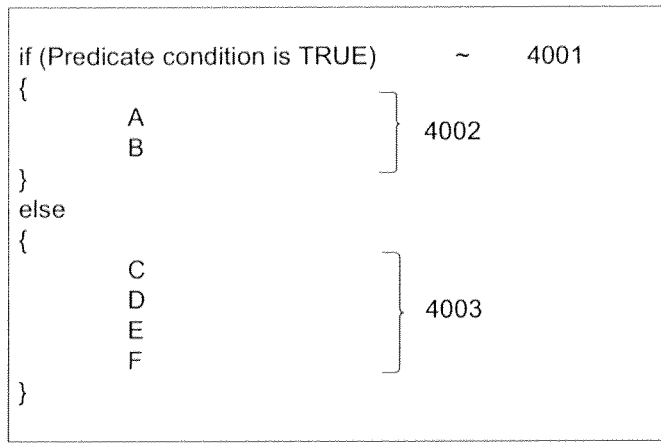
FIGS. 40A-40C are exemplary codes illustrating enhancing sequence block execution according to another embodiment.
Figure 40B:
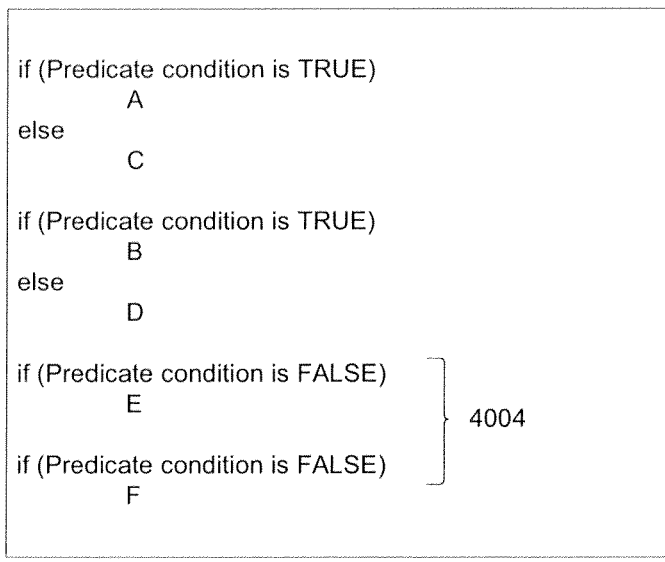
Figure 40C:
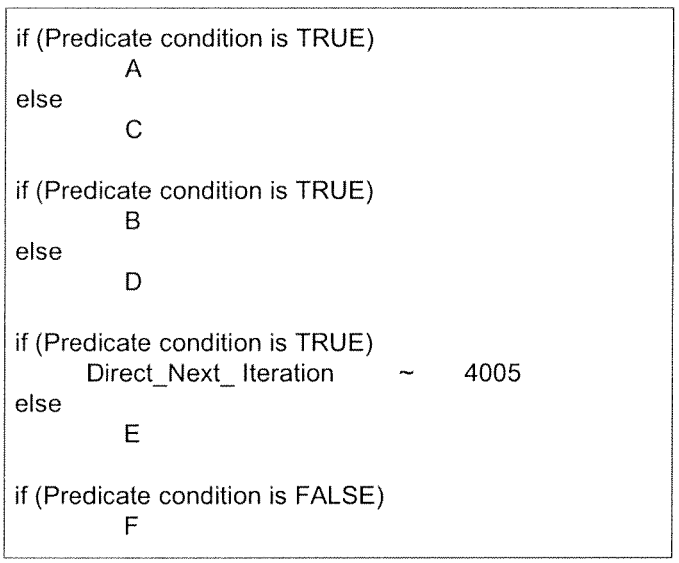

FIGS. 40A-40C are exemplary codes illustrating enhancing sequence block execution according to another embodiment. For example, as shown in FIG. 40A, instructions of a program loop include branch operations dependent upon a predicate condition 4001. In this example, instructions A and B (instructions 4002) will be executed when the predicate condition is true, or otherwise, instructions C-F (instructions 4003) will be executed when the predicate condition is false. As shown in FIG. 40A, the branch code 4003 when the predicate condition is false is longer than the branch code 4002 when the predicate condition is true.

In a typical execution at the processor level, as shown in FIG. 40B, each instruction is evaluated against the predicate condition. Instructions E and F are also evaluated against the predicate condition (instruction block 4004), where they will be executed if the predicate condition is false. However, if the predicate condition is true, such evaluations for instructions E and F are still performed.

Accordingly, instructions of the program loop may be modified by inserting instruction/directive Directed_Next_Iteration 4005 prior to evaluating instructions E and F, as shown in FIG. 40C. As a result, if the predicate condition is true, the current iteration will be terminated and a next iteration starts immediately. As a result, the evaluations of instructions E and F may be reduced. In one embodiment, these instructions or directives may be inserted into the code stream by a compiler, a dispatch unit of a processor, or a combination of both.

Figure 41:
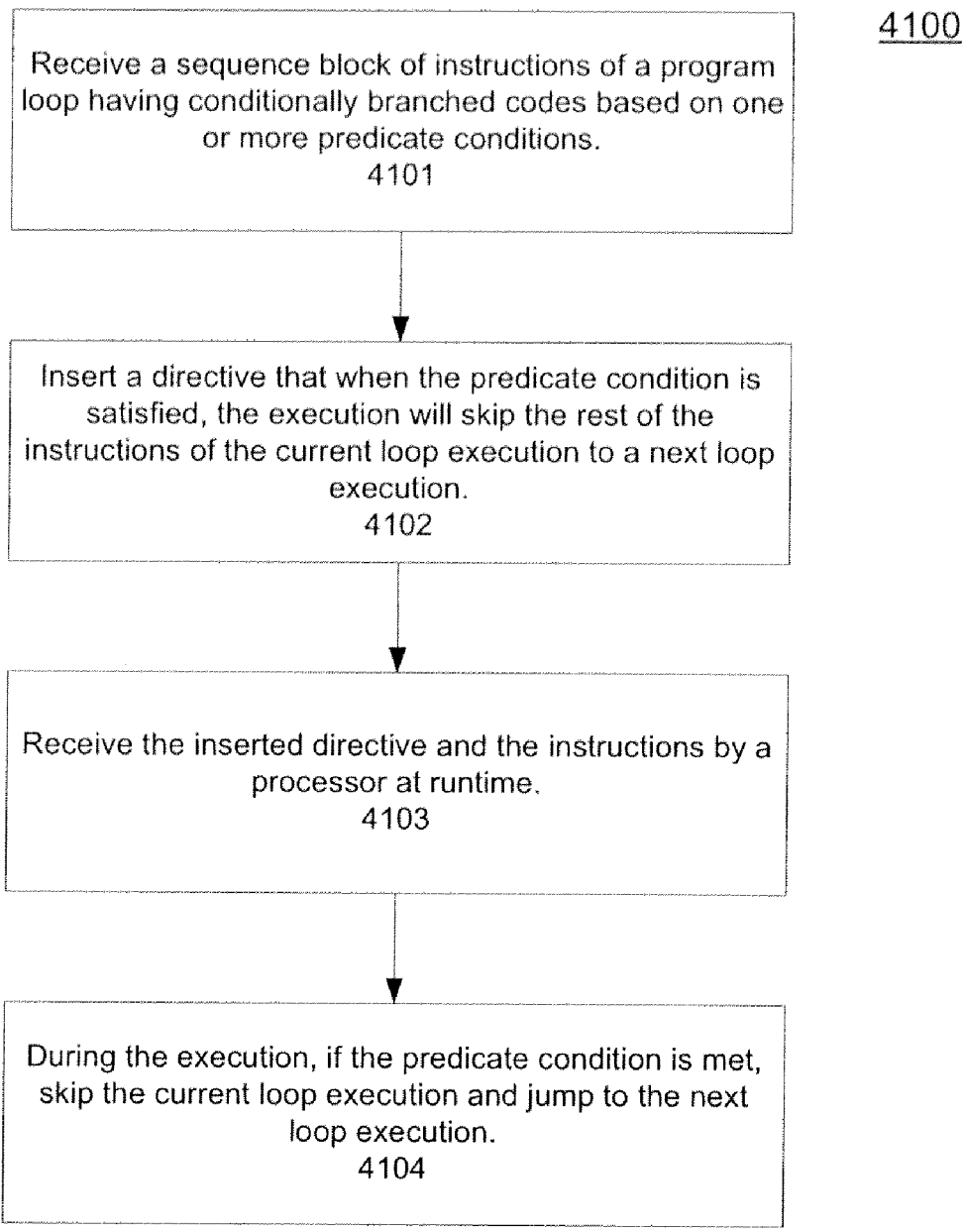
FIG. 41 is a flow diagram illustrating an exemplary process for enhancing sequence block execution efficiency according to another embodiment.

FIG. 41 is a flow diagram illustrating an exemplary process for enhancing sequence block execution efficiency according to another embodiment. Exemplary process 4100 may be performed by a processing logic that may comprise hardware (circuitry, dedicated logic, etc.), software (such as is run on a dedicated machine), or a combination of both. In one embodiment, exemplary process 4100 includes, but is not limited to, identifying instructions of a sequence block of a program loop, the sequence block including a first conditional branch code and a second conditional branch code dependent upon a predicate condition, wherein the first conditional branch code is longer than the second conditional branch code, and modifying the instructions such that when instructions of the second branch code that satisfy the predicate condition have been executed during a current iteration, execution of a next iteration starts without examining a remainder of the first branch code that has not been executed in the current iteration.

Referring to FIG. 41, at block 4101, the processing logic receives sequence block instructions of a program loop having conditionally branched codes based on one or more predicate conditions. In response, at block 4102, the processing logic modify the instructions and inserts one or more directives such that when the predicate condition is satisfied, the execution of a current iteration will skip the rest of the instructions and start a next iteration, as soon as the codes of shorter branch have completed. The one or more directives may be inserted by a compiler, a dispatch unit of a processor, or a combination of both. Subsequently, at block 4103, the modified instructions and inserted directives are received by a processor at runtime. At block 4104, during execution, if the predicate condition is met, the current iteration is stop and a next iteration will start immediately. Other operations may also be performed.

Many algorithms embody the concept of setting a sticky flag (e.g., a value of one or zero) to represent that a certain condition has occurred, which may trigger a later action. When this flag is checked by the same loop that writes to it, this relation becomes a loop-carried dependency that results in the instantiation of a sequence block. There are two operations to the procedure, determining the first predicate through a conditional test, and then conditionally setting a second predicate based on the condition of the first predicate. According to one embodiment, this process can be simplified into a single instruction that sets the second predicate based on conditional test, but only if the results of the conditional tests meet the criteria. This is also referred to as a value-qualified predicate assignment.

Value-qualified predicate assignment assigns a result of a Boolean comparison to the destination predicate only if the result is the condition (e.g., true or false) specified as the qualifier in the instruction. Otherwise, the destination predicate remains unchanged from its previous state. In one embodiment, an instruction or directive may used as follows:
Only_Assign_If (True)
Only_Assign_If (False)
When the processor detects such a directive at runtime, the processor would assign a result of a Boolean comparison to a register only if the result of the Boolean comparison is the condition specified by the inserted directive.

FIGS. 42A-42C are exemplary pseudo codes illustrating an enhancement of sequence block execution according to one embodiment. For example, referring to FIG. 42A, instructions of a program loop include an instruction 4201 to determine a predicate condition of whether A[x] equals to 4. If so, a variable of Flag is assigned with a Boolean value (e.g., 1 or 0) as shown as instruction 4202. When a processor executes these instructions, as shown in FIG. 42B, a first comparison of whether A[x] equals to 4 is performed and its result is assigned to a predicate register of "p" (instruction 4204). Then a second comparison (instruction 4204) is perform to determine whether a value stored in the predicate register "p" satisfies a condition specified by the instruction 4201. If so, a variable of Flag is assigned with a Boolean value (e.g., 1 or 0) as shown as instruction 4205.

According to one embodiment, as shown in FIG. 42C, an additional instruction or directive 4206 is used to indicate a Boolean result of the first comparison of FIGS. 42A and 42B is assigned to the variable Flag if the Boolean result satisfies a condition specified by the inserted directive 4206 without using additional comparison instruction (e.g. 4204 of FIG. 42B) as shown as instruction 4207. As a result, the second comparison required by FIG. 42B may be eliminated.

In one embodiment, these instructions or directives may be inserted into the code stream by a compiler when compiling a source code. Alternatively, these instructions or directives may be inserted by a dispatch unit of a processor when dispatching instructions to an iteration unit and/or execution unit for iterations.

Figure 43:
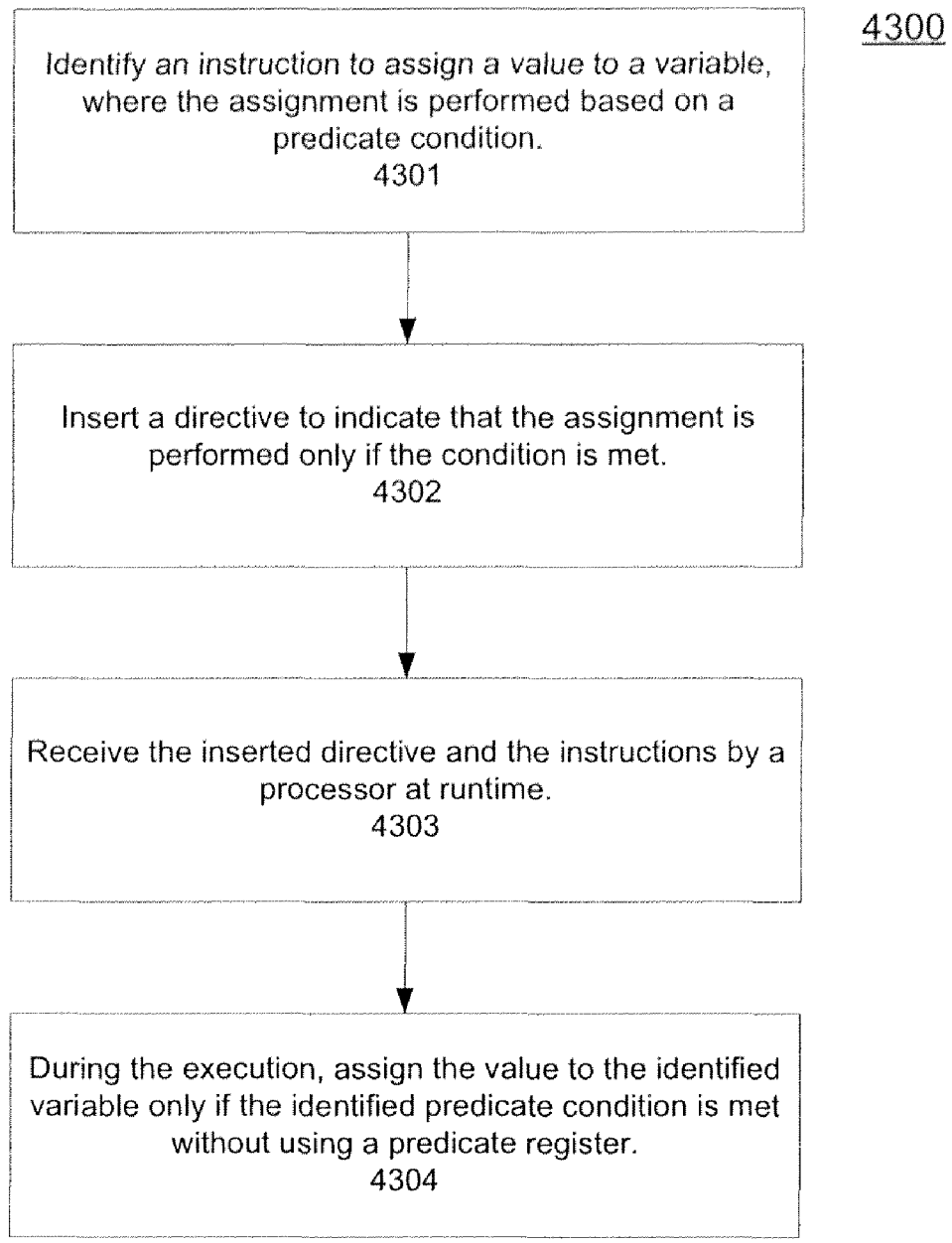
FIG. 43 is a flow diagram illustrating an exemplary process for enhancing sequence block execution according to another embodiment.

FIG. 43 is a flow diagram illustrating an exemplary process for enhancing sequence block execution according to another embodiment. Exemplary process 4300 may be performed by a processing logic that may comprise hardware (circuitry, dedicated logic, etc.), software (such as is run on a dedicated machine), or a combination of both. In one embodiment, exemplary process 4300 includes, but is not limited to, receiving a first instruction to determine a first predicate based on a conditional test and a second instruction to conditionally set a second predicate based on a condition of the first predicate. The first and second instructions are converted into a single instruction, which when executed by a processor, sets the second predicate based on the conditional test only if a result of the conditional test satisfies a predetermined criteria. The single instruction is executed by the processor without using a register to store the condition of the first predicate.

Referring to FIG. 43, at block 4301, the processing logic identifies an instruction of a program loop assigns a value to a variable, where the assignment is performed based on a predicate condition via a comparison. At block 4302, the processing logic inserts one or more directives in the code stream that the assignment is performed only if a result of the comparison meets a condition specified by the one or more inserted directives. In one embodiment, the above operations are performed by a compiler, a dispatch unit of a processor, or a combination of both. Subsequently, at block 4303, the modified instructions and the inserted directives are received by a processor and during the execution, at block 4304, a slice of the processor performing an iteration assigns the value to the identified variable only if the result of the comparison of the predicate condition meets the condition specified by the inserted directives without using a predicate register to hold the result of the comparison. Other operations may also be performed.

Exemplary Processes for Pointer Disambiguation

Certain classes performance optimizations that can be made by a compiler, such as loop unrolling, code motion, and autovectorization, are affected by pointer ambiguity, or the inability of the compiler to determine whether two different references actually refer to the same data (also known as pointer aliasing). For example, a read operation and a write operation to different data can be re-ordered to permit more optimal code execution. However, a read operation and a write operation to the same data may be required to occur in the order specified by the program.

Pointer ambiguity is one of the primary limiting factors to the application of code optimization techniques by compilers. When a compiler can determine whether two references are not to the same data, it can make the appropriate decisions during the code optimization process. However, it is frequently the case that the compiler is unable to determine this, usually because the condition is dependent on run-time conditions. In some cases, it is possible to check for pointer aliasing at execution time, choose to execution either optimal or sub-optimal code based on the outcome of this determination. This is basically a binary yes/no decision taken at execution time to execute either the optimal or conservative implementation of an algorithm. Since macroscalar architecture permits flexible control over the amount of instruction-level parallelism, according to one embodiment, it provides the opportunity to apply parallelism to the maximum extent permitted by the aliasing condition, rather than simply determining whether or not parallelism can be applied.

According to one embodiment, a mechanism is provided for limiting the amount of loop aggregation in a macroscalar processor, at execution time, based on dynamic conditions. If these dynamic conditions are generated as a result of alias-checking, then the maximum amount of parallelism that is permitted without violating program correctness can be achieved. Instructions delineate a block of code for which aggregation limits may be applied. If aggregation limits are imposed, the block executes repeatedly until the aggregation factor is met.

In one embodiment, an aggregation of a program loop is limited to a value determined at run-time. This limits a number of loop iterations that will be processed in parallel to the number specified in a register. If the number is greater than zero, but less than the aggregation factor for a loop, then the aggregation factor is limited accordingly within the block. This allows for the case of operations performed on possibly overlapping arrays. In one embodiment, the addresses of the arrays are compared to determine the amount and direction of overlap, and this result is used to limit aggregation.

Figures 44A, 44B:
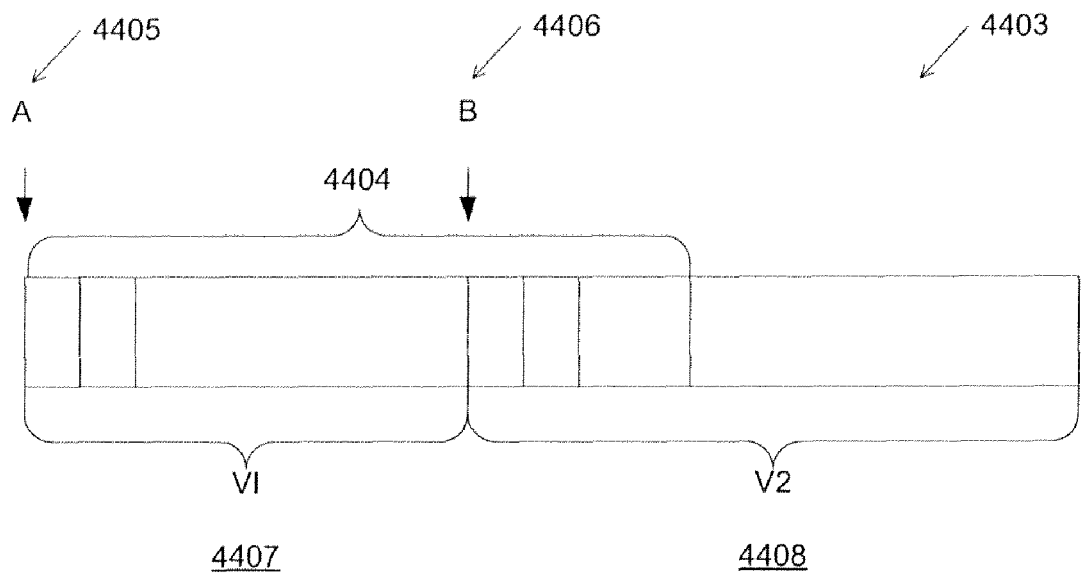
FIGS. 44A-44B are diagrams illustrating an exemplary mechanism for limiting aggregation of a program loop at runtime according to one embodiment.

FIGS. 44A-44B are diagram illustrating an exemplary mechanism for limiting aggregation of a program loop at runtime according to one embodiment. For example, referring to FIG. 44A, the pseudo source code includes a program loop 4401 having an instruction 4402 to assign a value of a first array A[x] to a second array B[x] as long as the value of A[x] is not zero. At compiling time, it is almost impossible to determine whether the pointers of arrays A and B would overlap because the value of A[x] is determined only at runtime. As a result, the instruction 4402 may not be executed as a vector block during an aggregation of the program loop 4401.

For the purposes of illustrations, referring to FIG. 44B, it is assumed that the first array A referenced by pointer 4405 includes a number of members 4404 that has non-zero values and the pointer 4406 of the second array B is pointing somewhere within the first array A that has non-zero values in the memory 4403. Typically, since there is an overlapped area 4408 between pointers 4405 and 4406, the whole program loop 4401 may be executed as a sequence block.

According to one embodiment, since the overlapping area is only a portion of the iterations indicated by area 4408, which has to be executed as a sequence block, the area 4407 that is not overlapped may be executed as a vector block in parallel. However, the non-overlapped area 4407 can only be determined at runtime because it is determined based on the value of A[x]. Accordingly, if the aggregation factor, which typically set to aggregate the program loop for the whole length 4404, can be limited to the non-overlapped area 4407, the portion of the instructions covering the non-overlapped area 4407 may be performed as a vector block, while the original overlapped portion and the remaining portion 4408 may be performed as another vector block.

In one embodiment, the aggregation factor may be limited to a size of the non-overlapped area 4407, which represents a difference between pointer 4405 and pointer 4406. In a particular embodiment, one or more directives may be inserted to indicate limiting the aggregation factor to define which of the iterations can be aggregated as a vector block, such as, for example, Limit (B-A) and
End Limit The above instruction or directive may be inserted by a compiler or a dispatch unit of a processor, or a combination of both. During the aggregation of the program loop, when the processor detects the inserted directive, the processor determines the values of pointers 4405 and 4406 at runtime and limits the aggregation factor to the difference between pointers 4405 and 4406. The instructions may be executed as a vector block 4407 using a limited aggregation factor and the remaining instructions may be executed as another vector block 4408. As a result, at least some aggregation of the program loop may be improved.

Figure 45:
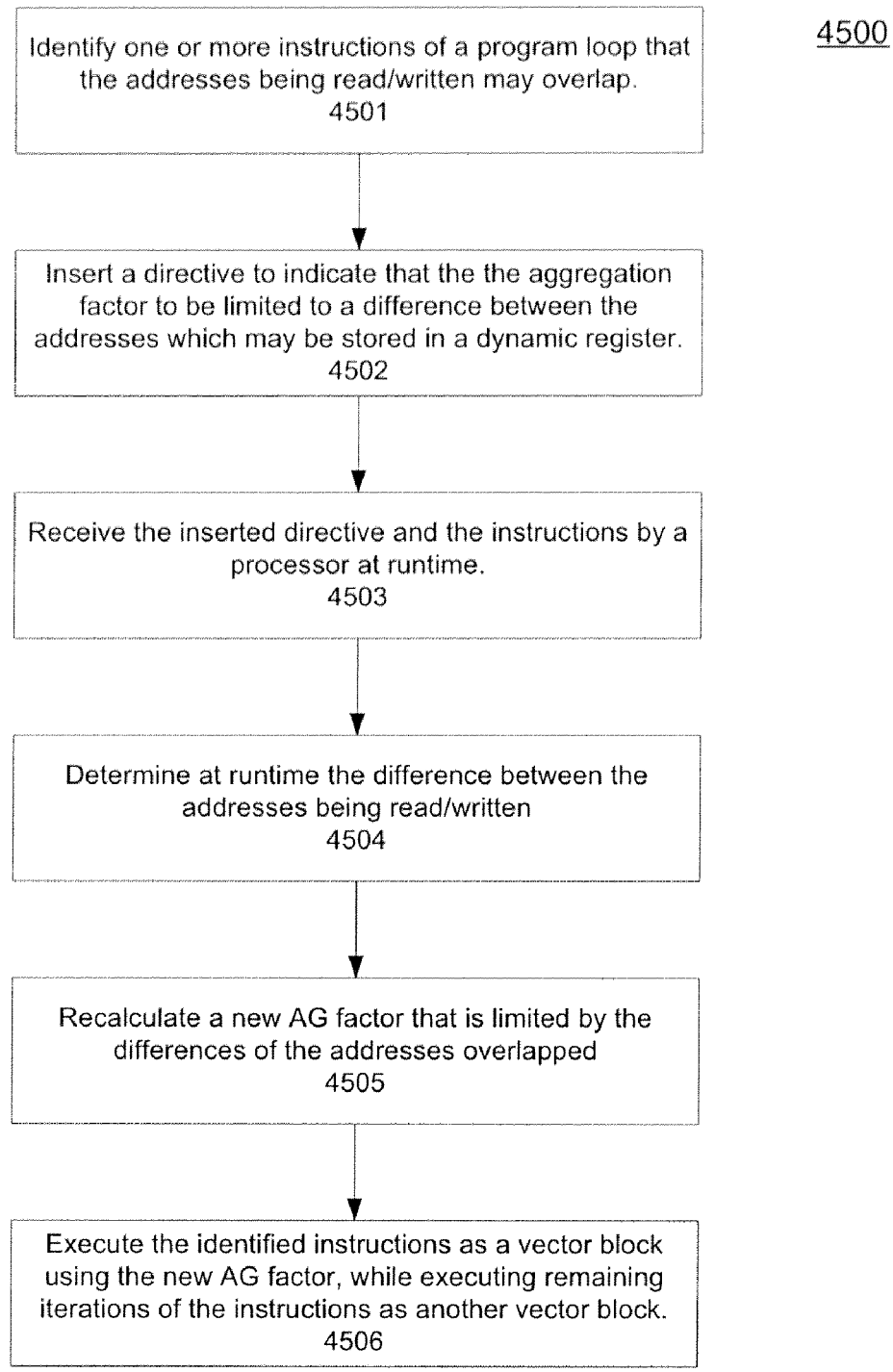
FIG. 45 is a flow diagram illustrating an exemplary process for pointer disambiguation according to one embodiment.

FIG. 45 is a flow diagram illustrating an exemplary process for pointer disambiguation according to one embodiment. Exemplary process 4500 may be performed by a processing logic that may comprise hardware (circuitry, dedicated logic, etc.), software (such as is run on a dedicated machine), or a combination of both. In one embodiment, exemplary process 4500 includes, but is not limited to, identifying an instruction of a program loop that reads a value from a memory location referenced by a first pointer and writes the value to a memory location referenced by a second pointer iteratively, and performing a vector block execution by a processor to perform multiple loop iterations of the instruction in parallel based on an aggregation factor, where the aggregation factor is determined based on values of the first and second pointers.

Referring to FIG. 45, at block 4501, the processing logic (e.g., a compiler or a dispatch unit of a processor) identifies one or more instructions of a program loop that the addresses being read/written may overlap. At block 4502, the processing logic inserts one or more directives to indicate that the aggregation factor for aggregating the program loop to be limited to a difference between the addresses of the read/write operations. Subsequently, at block 4503, the modified instructions and the inserted directives are received by the processor at runtime. In response, at block 4504, the processor determines at runtime a difference between the addresses specified by the inserted directives and at block 4505, a new aggregation factor is recalculated based on the difference between the addresses. At block 4506, the identified instructions are executed as a vector block using the recalculated aggregation factor, while the remaining iterations of the instructions are executed as another vector block. Other operations may also be performed.

According to another embodiment, an aggregation of a program loop may be limited when a predicate is set. If the predicate is set for a particular iteration, aggregation is limited by the iteration immediately before or after the iteration for which the predicate is set. This allows for the case of a pointer that overlaps an array. The address of each element is compared to the value of the point, generating a predicate value for that iteration, before the iteration for which the predicate is set. This mechanism also permits generalized alias checking (order N-squared) that sets the predicate for iterations where aliasing would occur.

Figures 46A, 46B, 46C:
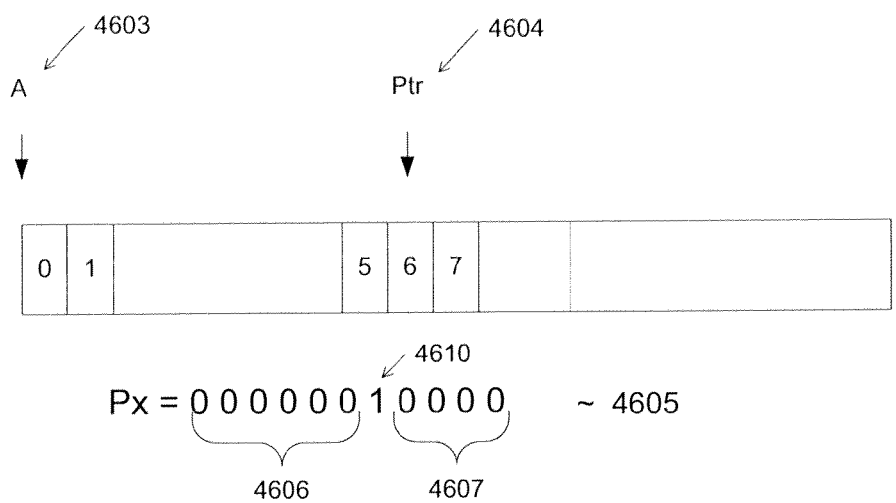
FIGS. 46A-46C are diagrams illustrating an exemplary mechanism for limiting aggregation of a program loop at runtime according to an alternative embodiment.

FIGS. 46A-46C are diagrams illustrating an exemplary mechanism for limiting aggregation of a program loop at runtime according to an alternative embodiment. Referring to FIG. 46A, in this example, the program loop 4600 includes instruction 4601 that reads a value from a memory location pointed by pointer A and writes the value to another memory location pointed by pointer Ptr. Subsequently, if the value of the Ptr meets certain criteria, some operations may be performed (instruction block 4602). Since the instruction block 4602 is performed only if a predicate condition is satisfied (e.g., *Ptr==4), the instructions 4601 and 4602 cannot be executed as a vector block in parallel. However, the iterations prior to and following the iteration during which the predicate condition is met, may be preformed as a vector block in parallel because there is no dependency in those iterations.

According to one embodiment, referring to FIG. 46B, a predicate register 4605 is maintained to store information indicating which of the iterations that the predicate condition is satisfied. In a particular embodiment, the predicate register 4605 includes multiple bits and each bit corresponds to an iteration of the program loop. A predetermined logical value of a bit indicates whether the predicate condition of the corresponding iteration has been satisfied. For example, in this example as shown in FIG. 46B, it is assumed that the pointer 4603 of the array A and the pointer 4604 of "Ptr" may be overlapped at $7^{th}$ position of the memory. Predicate register 4605 is maintained to indicate which of the iterations during which the predicate condition has been satisfied. In this example, a logical value of one of a bit may be used to indicate that the predicate condition of the corresponding iteration has been satisfied. In this example, during iteration 4610, the predicate condition is satisfied. As a result, the iterations prior to iteration 4610, such as, for example, iterations 4606 and those iterations after the iteration 4610 (e.g., iterations 4607) may be executed as vector blocks, except the iteration 4610. The iteration 4610 may be executed by itself as a sequence block.

According to one embodiment, referring to FIG. 46C, each of the elements of array A[x] may be compared to the value of "Ptr" as indicated by instruction 4608. Thereafter, the aggregation factor may be limited to those iterations immediately prior to or after the iteration during which the predicate condition is satisfied as shown as instructions 4609. As a result, each of the instruction blocks 4608-4609 and 4611 may be executed as a vector block by itself.

Figure 47:
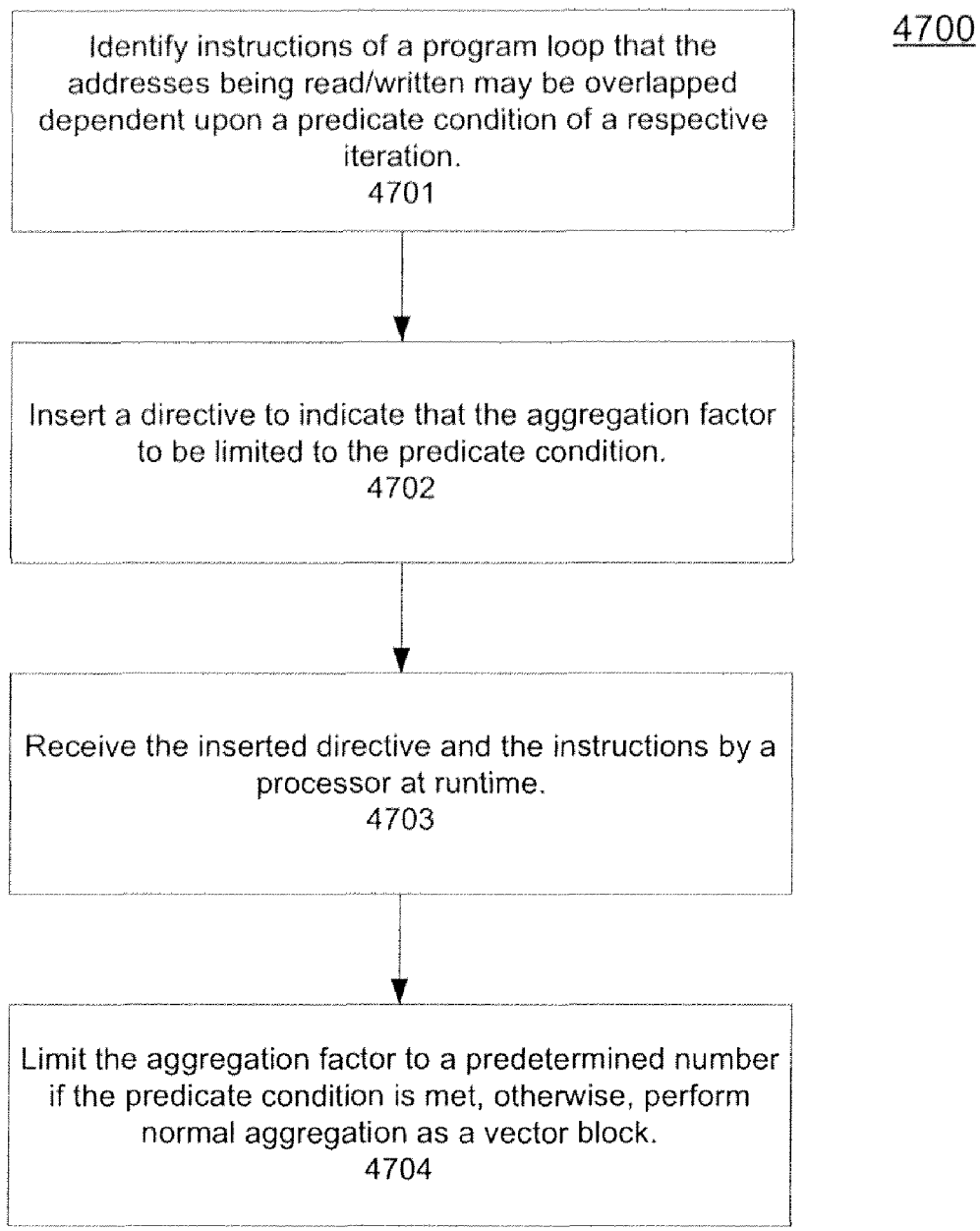
FIG. 47 is a flow diagram illustrating an exemplary process for pointer disambiguation according to one embodiment.

FIG. 47 is a flow diagram illustrating an exemplary process for pointer disambiguation according to one embodiment. Exemplary process 4700 may be performed by a processing logic that may comprise hardware (circuitry, dedicated logic, etc.), software (such as is run on a dedicated machine), or a combination of both. In one embodiment, exemplary process 4700 includes, but is not limited to, identifying instructions of a program loop that reads a value from a memory location referenced by a first pointer and writes the value to a memory location referenced by a second pointer dependent upon a predicate condition, and performing a vector block execution by a processor to perform multiple loop iterations of the instruction in parallel based on an aggregation factor, wherein the aggregation factor determines a number of iterations executed in the vector block until immediately prior to an iteration during which the predicate condition is satisfied.

Referring to FIG. 47, at block 4701, the processing logic identifies instructions of a program loop that the addresses being accessed may be overlapped dependent upon a predicate condition of a respective iteration. At block 4702, one or more directives are inserted into the code stream to indicate that the aggregation of the program loop to be limited to an aggregation factor up to the iteration during which the predication condition occurs. In one embodiment, the above operations may be performed by a compiler, a dispatch unit of a processor, or a combination of both. Subsequently, at block 4703, the modified instructions and the inserted directives are received by a processor. At block 4704, the processor limits the aggregation of the program loop for the iterations prior to and after the iteration during which the predicate condition occurs. Other operations may also be performed.

According to another embodiment, the aggregation of a program loop may be limited on a change in a predicate value (e.g., bimodal). Aggregation occurs in parallel for sequential iterations for which the value of the predicate is identical. This would cause a break in aggregation whenever certain dynamic conditions change. In one embodiment, instructions that limit the aggregation factor based on a change of a predicate value may be defined as follows:
  Limit (Rn, Ps, Pb)
  Vector Block Execution
  EndLimit <label>

According to one embodiment, the aggregation of a program loop is limited to the smallest amount indicated by the number stored in a register (Rn). A predicate that may be set for one or more loop iterations (Ps), and a bimodal predicate (Pb). In one embodiment, if the aggregation factor has not yet been satisfied, execution resumes at the location specified by indicated label, otherwise execution continues with subsequent instructions. Typically, the <label> will be the address of the corresponding "limit" instruction, however, in the case of generalized alias checking, the label will be before the limit instruction, allowing subsequent batches of iterations to be processed, thereby limiting the impact of the N-squared term in that process.

FIGS. 48A and 48B are diagrams illustrating an exemplary mechanism for limiting aggregation of a program loop at runtime according to another embodiment. Referring to FIG. 48A, in this example, the instructions of a program loop 4801 include a first block of instructions 4803 and a second block of instructions 4804, which will be executed dependent upon a comparison of a predicate condition 4802. Since the execution of instruction blocks 4803 and 4804 depends on a result of the comparison of predicate condition 4802, these instructions as a whole have to be executed sequentially.

However, each of the instruction blocks 4803 and 4804 may be executed as a vector block individually for multiple iterations if the result of the comparison remains identical. For example, for multiple consecutive iterations having the same result of comparison (e.g., either true or false), the instructions of these iterations may be executed as a vector block. Particularly, instruction block 4803 may be executed as a vector block for the consecutive iterations having a result of the comparison as true. Likewise, instruction block 4804 may be executed as a vector block for the consecutive iterations having a result of the comparison as false.

According to one embodiment, one or more directives may be used to indicate that the aggregation is limited to a number of consecutive iterations having the same result of the comparison that immediately prior to the iteration having a result of the comparison of the predicate condition different than the one of those consecutive iterations. The one or more directives may be inserted by a compiler, a dispatch unit of a processor, or a combination of both. Referring to FIG. 48B, a directive 4805 is inserted into the code stream to limit the aggregation factor to a number of consecutive iterations having the same result of the comparison of the predicate condition.

In one embodiment, a predicate register 4811 is used to indicate which of the iterations satisfies the predicate condition (e.g., a result of the predicate condition comparison is true). In this example, there are several blocks of iterations 4806-4810 that each iteration within each block has the same result of the comparison. As a result, for each of the iteration blocks 4806-4810, one of the instruction blocks 4803 and 4804 may be executed as a vector block in parallel. For example, the instruction block 4804 may be executed as a vector block for iteration blocks 4806, 4808, and 4810 respectively. Likewise, the instruction block 4803 may be executed as a vector block for iteration blocks 4807 and 4809 respectively. As a result, although between iteration blocks 4806-4810, the instructions are executed sequentially, however, the instructions within each iteration blocks 4806-4810 may be executed as a vector block in parallel.

Figure 49:
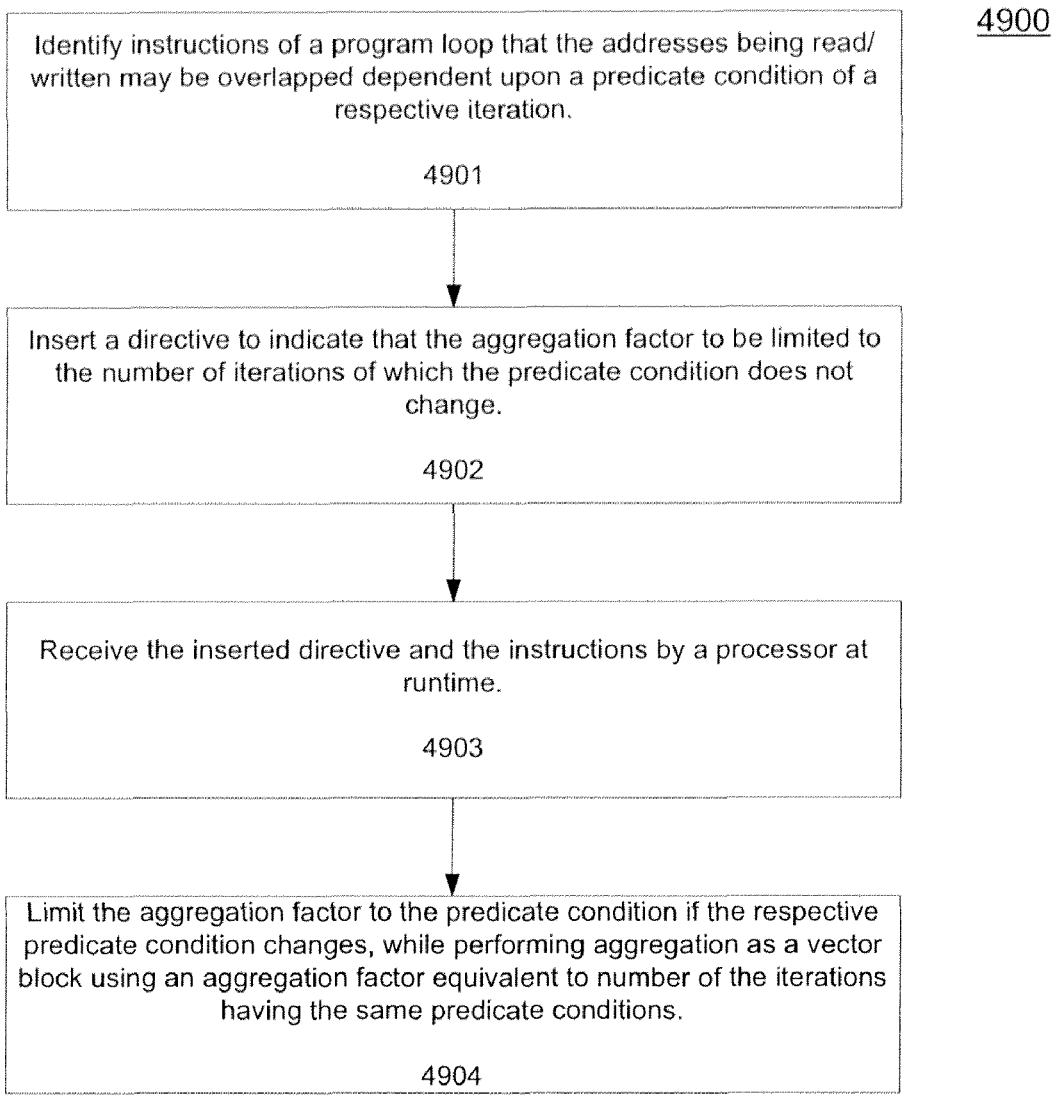
FIG. 49 is a flow diagram illustrating an exemplary process for limiting aggregation of a program loop at runtime according to another embodiment.

FIG. 49 is a flow diagram illustrating an exemplary process for limiting aggregation of a program loop at runtime according to another embodiment. Exemplary process 4900 may be performed by a processing logic that may comprise hardware (circuitry, dedicated logic, etc.), software (such as is run on a dedicated machine), or a combination of both. In one embodiment, exemplary process 4900 includes, but is not limited to, identifying instructions of a program loop including a first set of one or more instructions to be executed when a predicate condition is satisfied and a second set of one or more instructions to be executed when the predicate condition is not satisfied, executing the first set of the instructions as a first vector block for one or more consecutive iterations during which the predicate condition is satisfied, and executing the second set of the instructions as a second vector block for one or more consecutive iterations during which the predicate condition is not satisfied.

Referring to FIG. 49, at block 4901, the processing logic identifies instructions of a program loop that the addresses being accessed may be overlapped dependent upon a predicate condition of a respective iteration. At block 4902, the processing logic inserts one or more directives into the code stream to limit the aggregation factor to the number of iterations during which the predicate condition does not changes (e.g., having the same result of the comparison of the predicate condition). The above operations may be performed by a compiler or a dispatch unit of a processor, or a combination of both. Subsequently, at block 4903, the modified instructions and the inserted directives are received by a processor at runtime. At block 4904, the aggregation of the program loop is limited by a aggregation factor equivalent to a number of consecutive iterations having the same result of the comparison of the predicate condition. Other operations may also be performed.

Exemplary Enhancements to Reduce Sequence Blocks

Within vector blocks on a macroscalar processor, multiple loop iterations of program loops are allowed to execute in parallel, increasing performance. However, certain classes of algorithms require that one loop iteration be aware of information from other iterations in order to execute in parallel. Normally, conveyance of such information requires a sequence block to be inserted into the loop, placing a limit on the amount of parallelism achievable.

Certain classes of algorithms are based upon performing some action predicated upon the change of a calculated value or condition from the previous loop iteration. Since normally this would require artificially serialization of some portion of the loop, according to one embodiment, such loops are permitted to execute without serialization by shifting dynamic registers through a static register across iterations, thereby permitting the artificial serialization to be removed, increasing performance.

The value contained in the specified static register is moved into the extended register corresponding to the specified dynamic register for loop iteration N. Substantially simultaneously, the value contained in the extended register corresponding to the specified dynamic register for loop iteration N is moved into the extended register corresponding to the specified dynamic register for loop iteration N+1, and so forth until finally, the value contained in the extended register corresponding to the specified dynamic register for loop iteration N+M is moved back into the same specified static register that was copied into iteration N. This allows multiple iterations of a loop to obtain the value of a calculated variable from the previous iteration in a single cycle without serialization. Subsequent multi-iteration passes over the body of the loop use the value stored in the static register to propagate this process.

Figures 50A, 50B:
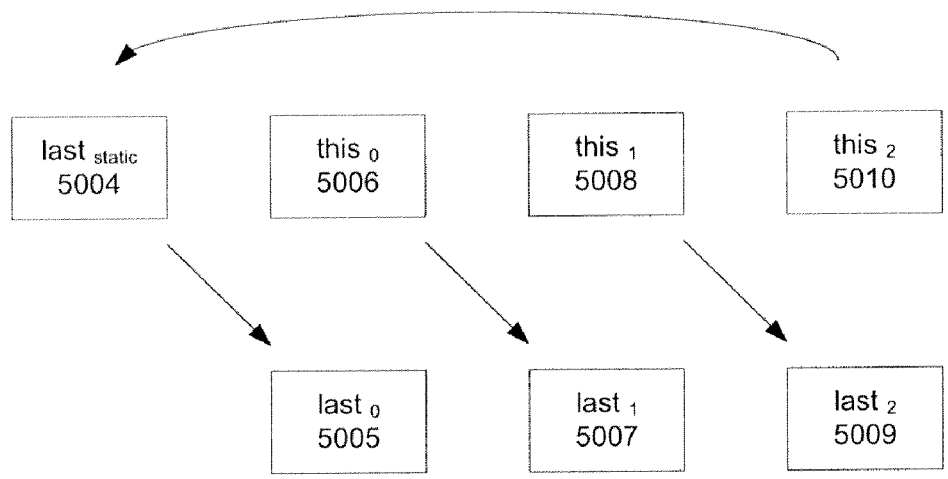

FIGS. 50A-50C are diagrams illustrating an exemplary mechanism for reducing sequence block executions according to one embodiment. In this example, referring to FIG. 50A, instructions of a program loop 5001 include an instruction 5002 that a variable of "this" of a current iteration depends on another variable of "last" of a previous iteration. At the end of the iteration, a value of "this" is assigned to variable of "last". Since an operation of a current iteration depends on a value of a previous iteration, the instructions of the program loop 5001 typically require to be executed as a sequence block.

Referring to FIG. 50B, it is assumed there are three iterations for the purposes of illustrations. According to one embodiment, as shown in FIG. 50B, the value contained in the specified static register 5004 is moved into an extended register 5005 corresponding to the specified dynamic register for a loop iteration. Substantially simultaneously, the value contained in the extended register 5006 corresponding to the specified dynamic register for the same loop iteration is moved into the extended register 5007 corresponding to the specified dynamic register for a next loop iteration. The above operations repeat for the subsequent iterations until finally, the value contained in the extended register 5010 corresponding to the specified dynamic register for the last loop iteration is moved back into the same specified static register 5004 that was copied into iteration N. This allows multiple iterations of a loop to obtain the value of a calculated variable from the previous iteration in a single cycle without serialization. Subsequent multi-iteration passes over the body of the loop use the value stored in the static register to propagate this process. As a result, the instructions may be executed as a vector block after the shifting operations above.

According to one embodiment, the above shifting operations may be specified via one or more directives inserted into the code stream, for example, by either a compiler, a dispatch unit of a processor, or a combination of both. The inserted directives may specify which of static and dynamic registers are involved, as shown as directive 5011 of FIG. 50C. As a result, the subsequent instructions 5012 may be executed as a vector block. Other configurations may exist.

Figure 51:
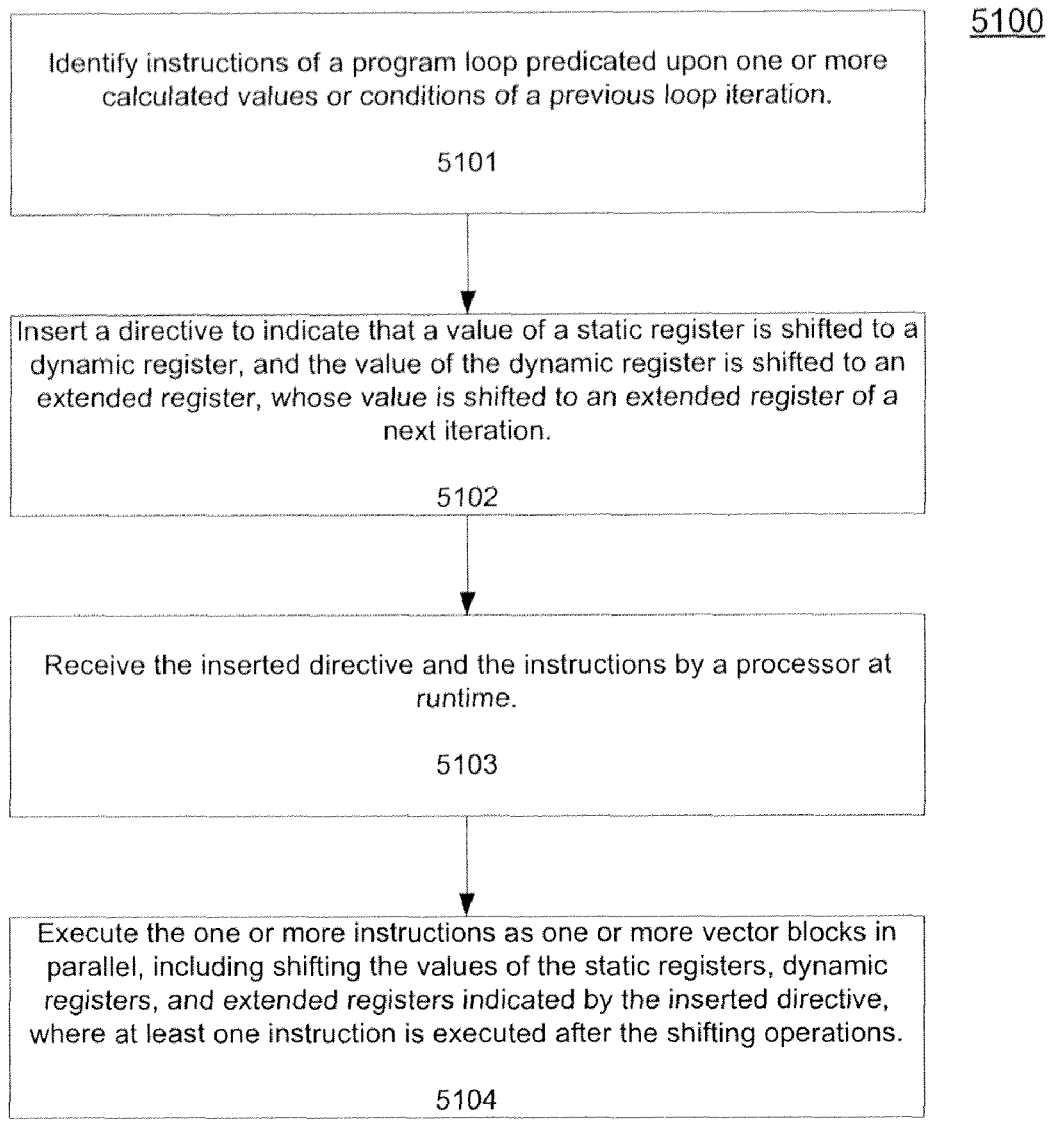
FIG. 51 is a flow diagram illustrating an exemplary process for enhancing sequence block execution according to one embodiment.

FIG. 51 is a flow diagram illustrating an exemplary process for enhancing sequence block execution according to one embodiment. Exemplary process 5100 may be performed by a processing logic that may comprise hardware (circuitry, dedicated logic, etc.), software (such as is run on a dedicated machine), or a combination of both. In one embodiment, exemplary process 5100 includes, but is not limited to, identifying one or more instructions of a program loop dependent upon a predicate condition based on a first variable of a previous iteration and a second variable of a current iteration, for all iterations of the program loop, recursively shifting a value of a static register associated with the first variable to an extended register associated with the static register of the first variable for a current iteration and substantially simultaneously shifting a value of a dynamic register associated with the second variable for the current iteration to an extended register associated with the dynamic register of the second variable for a next iteration, and executing the one or more instructions of the program loop as a vector block using the shifted extended registers for the first and second variables.

Referring to FIG. 51, at block 5101, the processing logic identifies instructions of a program loop predicated upon one or more calculated values or conditions of a previous iteration. At block 5102, one or more directives are inserted into a code stream to indicate that a value of a static register is shifted to a dynamic register, and substantially concurrently, the value of the dynamic register is shifted to an extended register, whose value is shifted to an extended register of a next iteration. The above shifting operations may repeat until the extended register of the last iteration is shifted back to the static register. The one or more directives may be inserted by a compiler, a dispatch unit, or a combination of both. Subsequently, at block 5103, the modified instructions are received by a processor and in response, at block 5104, the processor performs the shifting operations described above and executes the instructions as a vector block for loop iterations. Other operations may also be performed.

Certain classes of algorithms perform operations that break out of the loop body on an exceptional condition, and may also perform writes to a memory. If the decision to break out of the loop occurs after the memory write operation, both the memory write and the decision to break from the loop have to be enclosed within a sequence block in order to preserve program correctness.

Typically, the memory write cannot be moved after the break from loop, since the write operation on the breaking iteration would fail to execute. It is also typically the case that such a final write cannot be moved after the body of the loop, since it should not execute upon normal termination of the loop.

For example, as shown in FIG. 52A, instructions of a program loop 5201 include a memory write instruction 5202. After the instruction 5202, a branch instruction "break" 5203 is executed. As described above, since the decision to break out of the loop (e.g., instruction 5203) occurs after the memory write operation 5202, both the memory write and the decision to break from the loop have to be enclosed within a sequence block in order to preserve program correctness.

According to one embodiment, a pre-break instruction is implemented whose purpose is to convey a break-from loop to the processor while allowing loop iterations before the break instruction to complete execution. A normal break instruction allows all iterations numbered lower than the iteration in which the break instruction executes to continue executing, while preventing execution of all iterations greater-than or equal-to the iteration in which the break instruction executes.

In one embodiment, the break instruction remains in the correct place where the termination of the current iterations should properly occur. The pre-break instruction performs similar to a normal break instruction, except that it does not inhibit further execution of instructions belonging to the current iteration. That is, the pre-break instruction allows executions of the instructions of a current iteration prior to the normal break instruction before branching out. This feature allows the pre-break instruction to be placed early in the loop, before other operations, such as memory writes, that require serialization if they can potentially occur before a break from loop.

For example, as shown in FIG. 52B, a pre-break instruction 5204 is used to replace the normal break instruction 5203 of FIG. 52A to allow instruction 5202 of the same iteration to be executed before branching. In addition, the pre-break instruction 5204 may be placed at an earlier position of the loop, such as, for example, prior to instruction 5202. As a result, the execution of instruction 5202 may be performed as a vector block for iterations of the program loop 5201. According to one embodiment, the pre-break directive/instruction may be inserted into the code stream by a compiler, a dispatch unit, or a combination of both. As a result, according to one embodiment, after the vector block execution, the result of the instruction, such as instruction 5202 may be ignored if the "real" break is hit (e.g., the break instruction after instruction 5202).

Figure 53:
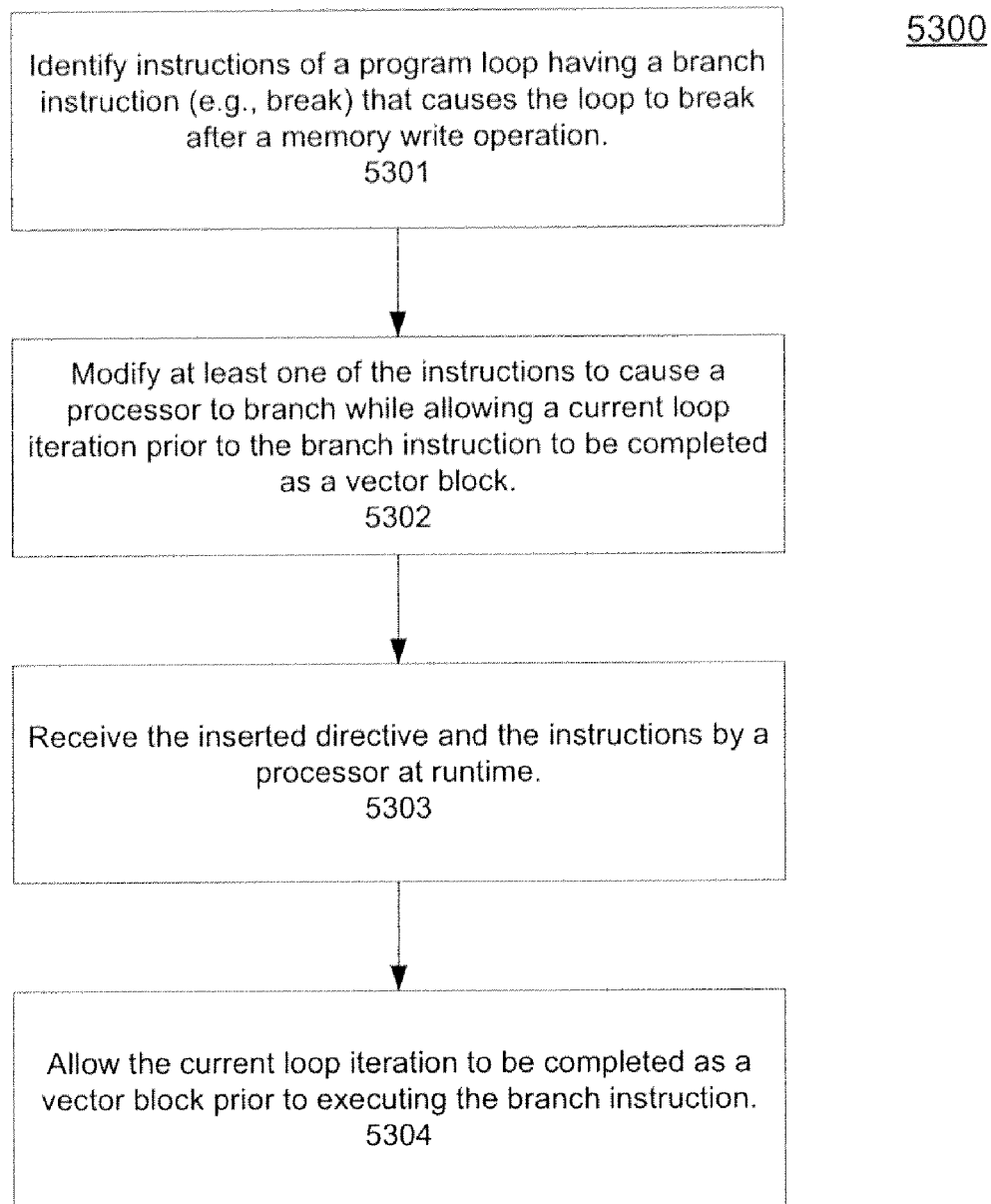
FIG. 53 is a flow diagram illustrating an exemplary process for enhancing sequence block execution according to another embodiment.

FIG. 53 is a flow diagram illustrating an exemplary process for enhancing sequence block execution according to another embodiment. Exemplary process 5300 may be performed by a processing logic that may comprise hardware (circuitry, dedicated logic, etc.), software (such as is run on a dedicated machine), or a combination of both. In one embodiment, exemplary process 5300 includes, but is not limited to, identifying one or more instructions of a program loop having a branch instruction that causes the program loop to branch dependent upon a predicate condition after a memory write operation, and modifying at least one of the one or more instructions to cause a processor for executing the one or more instructions to branch after the memory write operation executed as a vector block for iterations prior to and including an iteration during which the predicate condition is satisfied.

Referring to FIG. 53, at block 5301, the processing logic identifies instructions of a program loop having a branch instruction (e.g., a break or continue instruction) that causes the loop to break after a memory write operation. At block 5302, at least one instruction is modified, such as, for example, inserting a pre-break instruction, that causes a processor to branch while allowing a current iteration prior to the branching instruction to complete as a vector block before branching. The above operations may be performed by a compiler, a dispatching unit of a processor, or a combination of both. Subsequently, at block 5303, the modified instructions are received by a processor. At block 5304, the instructions of the program loop are executed as a vector block including the iteration during which the branching occurs. Other operations may also be performed.

The performance of macroscalar loop aggregation can be limited by serialized activities. For example, consider the case where a loop (A) contains a nested loop (B) that is either mostly or completely serialized, can be detrimental to performance. Under these conditions, the performance of the enclosing loop (A) is largely determined by the serialized inner loop (B). A simple example would be a CORDIC function computing sine/cosine nested within loop A.

While loop B cannot be aggregated, it is often possible to implement loop B within the aggregated loop A without actually aggregating loop B. This allows the parallelism inherent to the aggregated loop A to be leveraged to execute multiple loops of B in parallel. While it is not possible to execute the iterations of a CORDIC algorithm in parallel, it is possible to execute multiple CORDIC algorithms in parallel, corresponding to multiple iterations of loop A. This is possible when the output of loop B is not a loop-carried dependence of loop A feeding loop B.

In one embodiment, this may be accomplished by implementing the instructions having one iteration of loop B as one or more predicated vector blocks of loop A, predicated on predicate P. A specific instance of loop B terminates by clearing the predicate that controls the vector block enclosing it. The bottom of loop B branches back to the top of loop B if predicate P is set for any iteration of loop A. Once all instances of loop B (corresponding to the multiple parallel iterations of loop A) have terminated, loop A proceeds. As a result, while the sequential nature of loop B remains unchanged, this allows multiple loops of B to execute in parallel, thereby maintaining parallel executions.

Figures 54A, 54B:
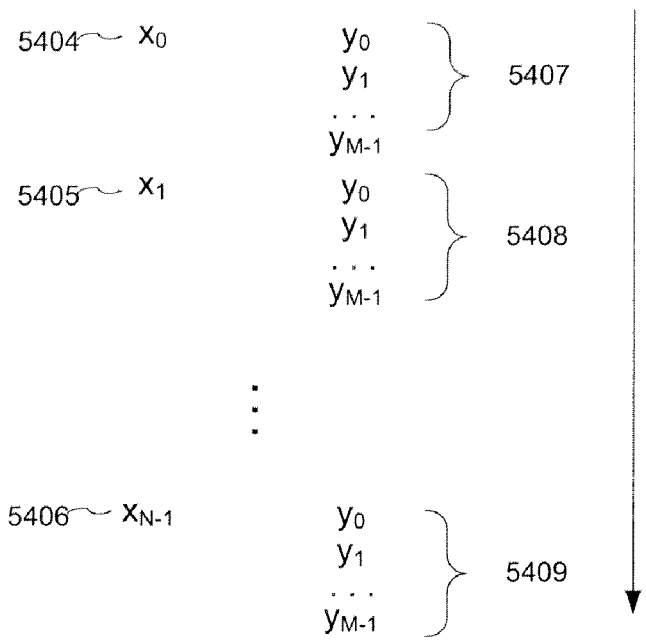
FIGS. 54A and 54B are diagrams illustrating a typical execution of nested loop iterations of a program loop.

FIGS. 54A and 54B are diagrams illustrating a typical execution of nested loop iterations of a program loop. Referring to FIG. 54A, in this example, the instructions of the pseudo source code include a first loop 5401 and a second loop nested 5402 within the first loop 5401. Typically, instructions within the second loop 5402 require to be executed sequentially. As a result, instructions of both loops 5401 and 5402 have to be executed sequentially.

For example, as shown in FIG. 54B, for each of the iterations 5404-5406 of the first loop 5401, iterations 5407-5409 of the second loop 5402 have to be executed sequentially. In addition, iterations 5404-5406 also required to be executed sequentially. As a result, all of the instructions of the program loop including the first and second loops 5401 and 5402 require to be executed sequentially.

Figures 55A, 55B:
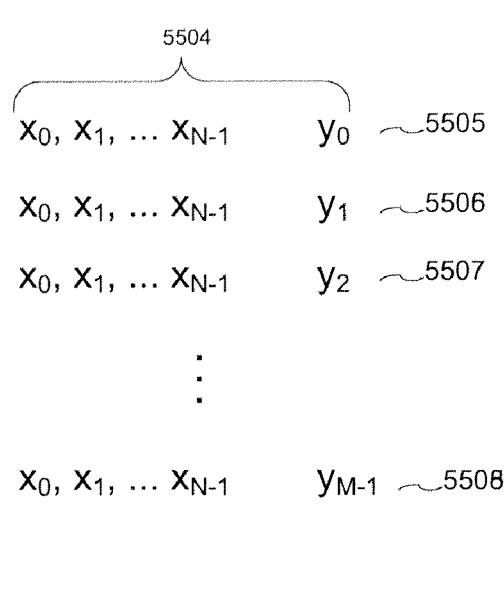
FIGS. 55A and 55B are diagrams illustrating an exemplary enhancement for sequence block execution according to one embodiment.

According to one embodiment, although instructions 5403 of the second loop 5402 require to be executed, the instructions of the first loop 5401 may be executed as a vector block. FIGS. 55A and 55B are diagrams illustrating an exemplary enhancement for sequence block execution according to one embodiment. Referring to FIG. 55A, instruction 5501 (of original loop 5401 of FIG. 54A) may be executed as a vector block in parallel with instructions 5502 (of original loop 5402 of FIG. 54A). In addition, a predicate P for each iteration of loop 5402 may be maintained to indicate whether the respective iteration has terminated. When an iteration of loop 5402 terminates, it clears the corresponding predicate Px. Instruction 5503 may be used to check whether any of the predicates Px for the loop 5402 is still set. If any of the predicates Px is still set (e.g., at least one iteration has not terminated), the execution will loop back to the top of the loop, until all of the iterations of the loop 5402 have terminated (e.g., all predicates are cleared). As a result, as shown in FIG. 55B, although the sequential nature of iterations 5505-5508 of loop 5402 remains the same, for each of the iterations 5505-5508, it can be executed in parallel with iterations 5504 of loop 5401 that may be executed as a vector block.

FIG. 56 is a flow diagram illustrating an exemplary process for enhancing sequence block execution according to another embodiment. Exemplary process 5600 may be performed by a processing logic that may comprise hardware (circuitry, dedicated logic, etc.), software (such as is run on a dedicated machine), or a combination of both. In one embodiment, exemplary process 5600 includes, but is not limited to, identifying one or more instructions of a program loop having a first loop having a first set of instructions including a second loop, the second loop having a second set of instructions to be executed as a sequence block, and modifying at least one of the instructions such that for each iteration of executing the second set of instructions of the second loop, executing the first set of instructions of the first loop as a vector block for all iterations of the program loop.

Referring to FIG. 56, at block 5601, the processing logic identifies instructions of a program loop having a first loop enclosing a second loop, where the second loop includes a sequence block of instructions. At block 5602, for each iteration of the second block, the processing logic executes the instructions of the first loop as a vector block in parallel predicate upon one or more predicate conditions corresponding to each iteration of the second loop. After each iteration of the second loop terminates, at block 5603, the processing logic clears a predicate corresponding to the respective iteration of the second loop. Otherwise, at block 5604, the above operations may repeat if any of the predicates is still set. Other operations may also be performed.

It is frequently necessary to insert sequence blocks into aggregated loops when predictable behavior occurs, but is predicated on unpredictable conditions. For example, as shown in FIG. 57A, the program loop 5701 includes instructions 5702 that builds a sub-list (B) of items in a primary list (A) that are less than 256. While the progression of "y" is predictable, it is unpredictable at compile-time when the progression of "y" will advance. This normally requires the insertion of a sequence block.

During a multi-iterative pass over the body of a loop, there are often circumstances where an instruction will execute for some iterations but not others, such as in the example above. Since the predicates which control the conditionally executed instruction(s) are usually known at execution-time for multiple iterations at once, it becomes possible to sub-aggregate the potentially sparse execution of subsequently predicated instructions.

According to one embodiment, this capability is enabled via sparse index calculation. Sparse index calculation places increasing values into the specified destination register for active iterations only. It is analogous to index initialization, except that it occurs only for active iterations as specified by a predicate register, and the break and continue flags for the aggregated loop. Additional parameters include a base value and increment delta. This extends the capability of this instruction to manipulate pointers to standard C built-in types by providing an initial value, and the amount to increment the initial value by for each active iteration.

Active iteration counting returns the number of active iterations. It is necessary to know the number of iterations that are active, so that static registers holding the value of sparse indexes between passes can be correctly updated to reflect their new value. The input/output semantics of these new instructions are shown below.

y'=SparseIndex(predicate,base,delta);
y=y+CountIter(p);

These two features combine to allow the elimination of sequence blocks from many classes of loops where otherwise predictable behavior is predicated upon unpredictable conditions, as shown in FIG. 57B. Referring to FIG. 57B, additional instructions 5703 and 5704 are inserted. Instruction 5703 is used to calculate the sparse index based on the predicate P, base value stored in the static register of "y", and an incremental value of "1". The sparse index value is stored in a dynamic register of "y" corresponding to that iteration. Thereafter, the instruction 5705 may be executed as a vector block using the dynamic registers for storing the indexes for each iteration, for example, as shown in FIG. 57C.

Referring to FIG. 57C, in this example, it is assumed that there are total six iterations. However, there are only four active iterations during which the predicate condition is satisfied. The dynamic register of "y" for an iteration only increments if the predicate condition is satisfied. Alternatively, the dynamic register "y" may maintain the same value as the previous iteration if the predicate condition is not satisfied. As a result, the assignment operations for all iterations may be executed as a vector block in parallel based on the sparse index of "y".

Figure 58:
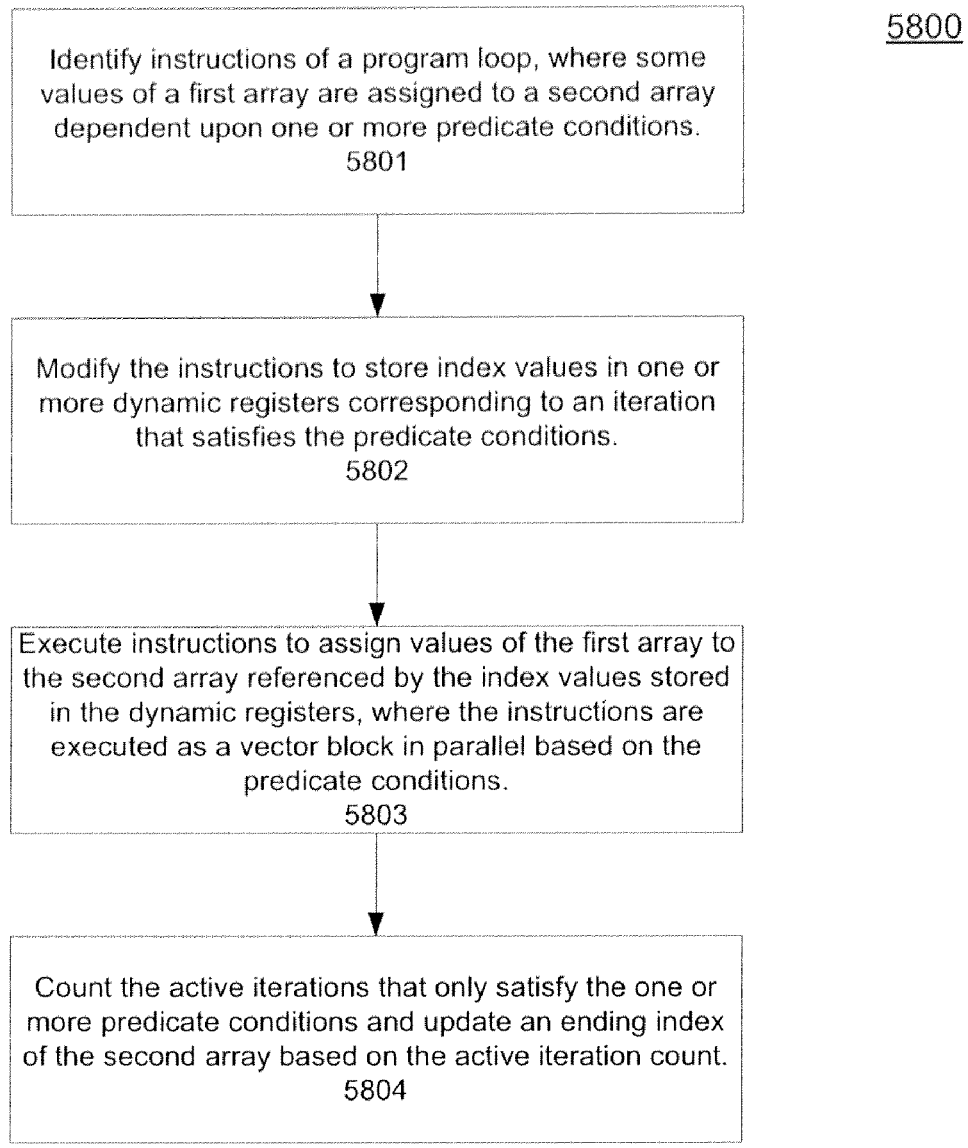
FIG. 58 is a flow diagram illustrating an exemplary process for enhancing sequence block execution according to another embodiment.

FIG. 58 is a flow diagram illustrating an exemplary process for enhancing sequence block execution according to another embodiment. Exemplary process 5800 may be performed by a processing logic that may comprise hardware (circuitry, dedicated logic, etc.), software (such as is run on a dedicated machine), or a combination of both. In one embodiment, exemplary process 5800 includes, but is not limited to, identifying one or more instructions of a program loop, wherein during each iteration of the program loop, a member of a first array referenced by a first index is assigned to a member of a second array referenced by a second index dependent upon a predicate condition, for each iteration of the program loop, at runtime by a processor, incrementally assigning a value to a dynamic register associated with the respective iteration only if the predicate condition is satisfied during the respective iteration, and executing the one or more instructions as a vector block that assign a member of the first array to a member of the second array referenced by the dynamic register associated with each iteration.

Referring to FIG. 58, at block 5801, the processing logic identifies instructions of a program loop, where some values of a first array are assigned to a second array dependent upon one or more predicate conditions. At block 5802, the processing logic modifies the instructions to store index values in one or more dynamic registers corresponding to an iteration that satisfies the predicate conditions. At block 5803, the processing logic executes the instructions to assign values of the first array to the second array referenced by the index values stored in the dynamic registers, where the instructions are executed as a vector block in parallel based on the predicate conditions. At block 5804, the processing logic counts a number of active iterations that only satisfy the one or more predicate conditions, and update a static register holding an ending index of the second array based on the count of active iterations. Other operations may also be performed.

Examples of Memory Prefetch Processes

As the speed of computer processors increase relative to the speed of system memory, an amount of time required to access memory becomes increasingly detrimental to the performance of software. Processors regularly incorporate data caches in order to minimize this penalty. Modern processors will frequently attempt to autonomously detect sequential data access patterns, ad proactively prefetch data that is anticipated in the future, from memory into the caches.

It is common for processors to implement data caches referenced by a physical memory address, rather than by a virtual address specified by a programmer. This enables a controller (e.g., a cache controller) to write-back dirty data without the need for address translation, thereby decoupling the cache write-back mechanism from the state of the virtual memory page table. If this were not done, modifications to the page table would need to be synchronized with flushing data in those pages, which slows down the system operations.

Because of this choice, autonomous detection of sequential data access (e.g., data stream) is often practically limited to monitor physical address accesses. If a sequence data stream is detected, prefetch is constrained to the physical memory page containing the addresses, since there is no guarantee that a program accesses to memory in a subsequent virtual page will reside in a subsequent physical memory address (e.g., a subsequent physical page) due to virtual memory mapping. For this reason, prefetch activity is therefore constrained to stop at the end of a virtual memory page. This reduces the efficiency of prefetch and causes the data stream detection mechanism to re-learn the data stream at a new physical address.

Figure 59:
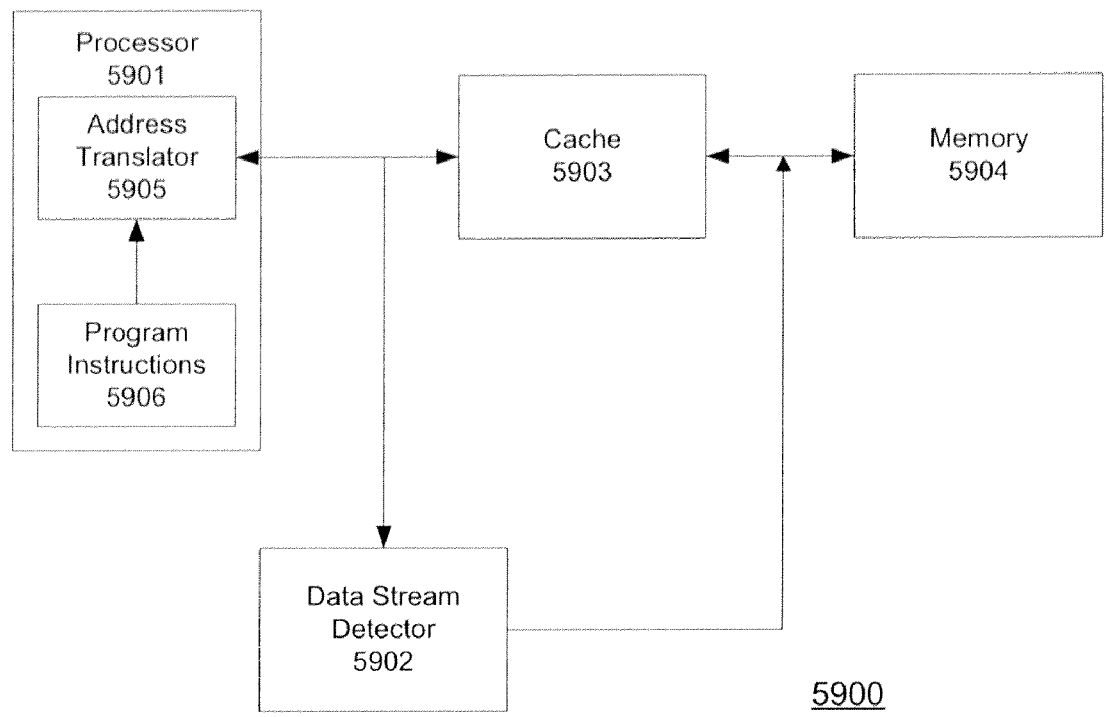
FIGS. 59 and 60A-60B is a block diagram of a convention prefetch system.
Figure 60A:
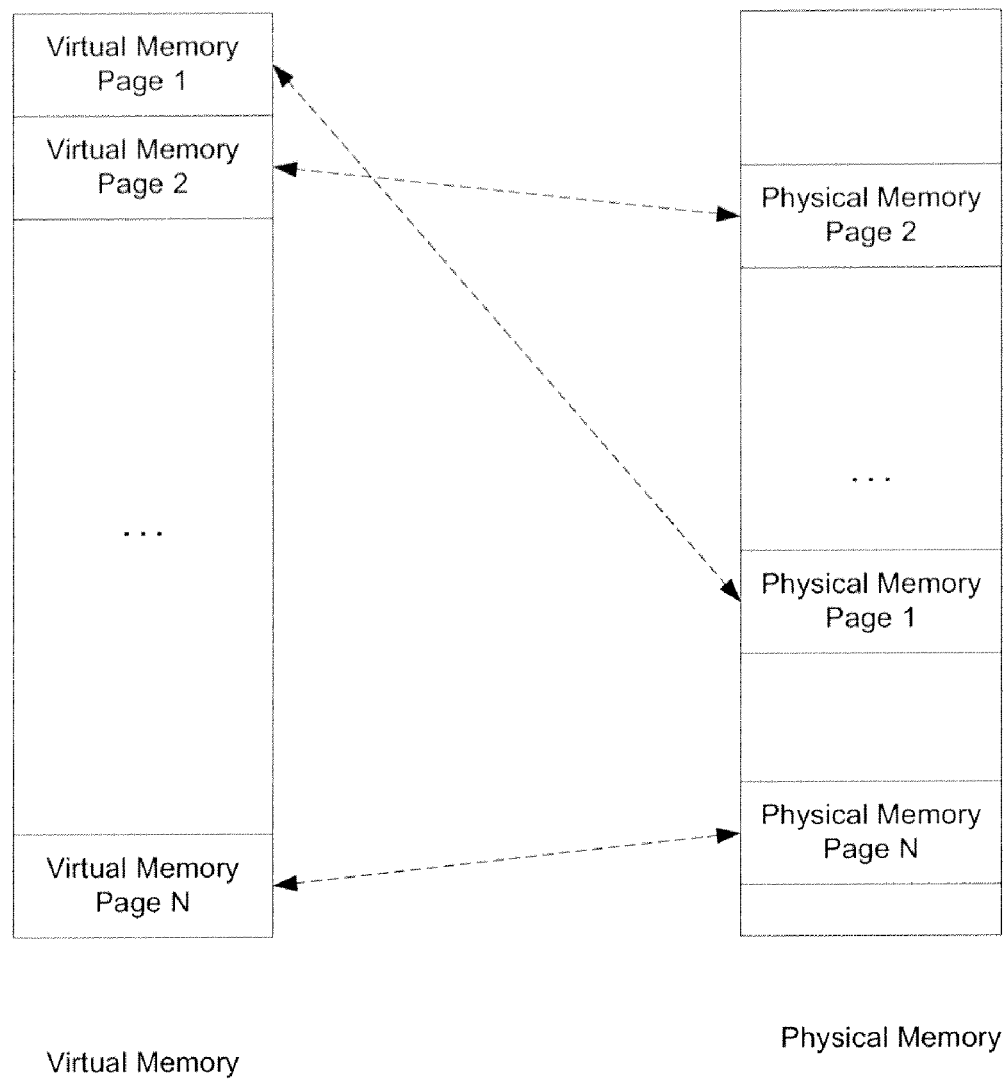

FIG. 59 is a block diagram illustrating a conventional system. Referring to FIG. 59, system 5900 includes a processor 5901 having an address translator 5905 to execute program instructions 5906. System 5900 further includes a data stream detector 5902 to detect certain pattern of physical addresses translated by the address translator 5905 based on the virtual memory addresses associated with the program instructions 5906. Although the virtual memory addresses may be part of continuous virtual memory pages, the corresponding physical memory pages may not be contiguous as shown in FIG. 60A.

Since the physical pages are not contiguous, at the end of each physical page, the data stream detector 5902 has to determine a pattern of some of the address accesses of the physical page in order to determine whether these address are associated with a next virtual page of the data stream. If so, the data stream detector may or invoke a prefetch engine to prefetch at least some of the remaining physical addresses from memory 5904 to cache 5903 as shown in FIGS. 59 and 60B.

Figure 60B:
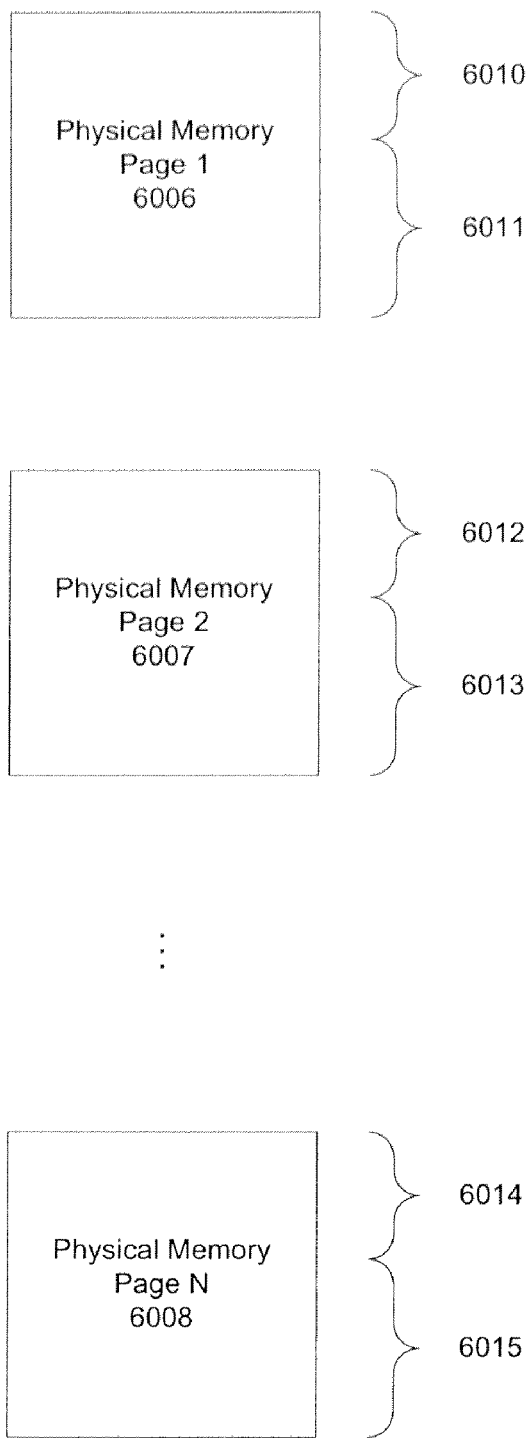

For example, referring to FIG. 60B, with respect to physical memory page 6006, the stream detector has to perform pattern detection on a portion 6010 of the page 6006, which may include multiple addresses before being able to detect a pattern. Once the pattern has been identified, the remaining portion 6011 of the page 6006 may be prefetched. However, the pattern determination of multiple address accesses (e.g., portion 6010) may take longer time and thus reduce the efficiency of the processor.

According to one embodiment, the efficiency of a processor (e.g., a CPU) streaming prefetch is increased by enabling the processor to recognize accesses to non-contiguous physical memory pages that are part of the substantially identical data stream in the program address space.

Figure 61:
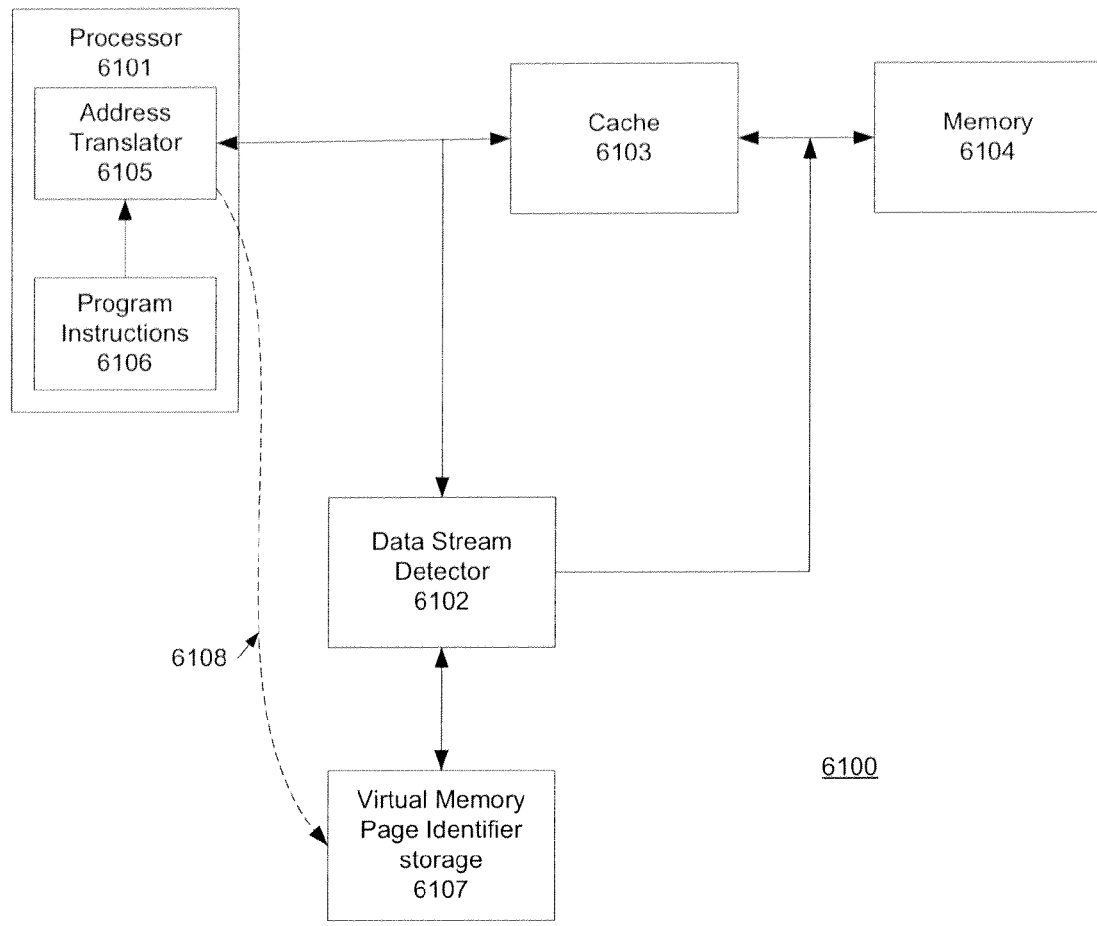
FIGS. 61 and 62 are block diagrams illustrating a prefetch system according to one embodiment.

FIG. 61 is a block diagram illustrating an example of a system according to one embodiment. Referring to FIG. 61, similar to system 5900, system 6100 includes a processor 6101 having an address translator 6105 to execute program instructions 6106. System 6100 further includes a data stream detector 6102 to detect certain pattern of physical addresses translated by the address translator 6105 based on the virtual memory addresses associated with the program instructions 6106. In addition, virtual memory page identifier storage 6107 is used to store the virtual memory page identifiers from the address translator 6105 via path 6108. That is, when the address translator 6105 transmits the translated physical addresses to access cache 6103 and/or memory 6104, a virtual memory page identifier (e.g., a virtual memory page number) is also transmitted and stored in the storage 6107. The storage 6107 may be a part of data stream detector or a separate storage, which may be implement as a volatile and/or non-volatile memory and may be implemented within a chip set or a processor.

In one embodiment, certain address bits corresponding to a virtual memory page identified by a virtual memory identifier (e.g., a virtual memory page number) may be sent to a data stream detector, along with the physical addresses that will be used to access memory and data caches. The data stream detector may be a part of memory prefetch engine or a memory controller. If a pattern of sequential accesses is detected, a mechanism records the virtual address bits that corresponding to the virtual memory identifier of the physical memory page being accessed.

After prefetch stops at the end of a page boundary, according to one embodiment, the virtual page number information may be compared to subsequent accesses, allowing the processor to recognize that a particular access belongs to the data stream that was stopped due to the page boundary crossing. This allows the data stream to be re-started from the new physical address, without having to wait for a sequence of addresses to be recognized by the convention autonomous detection mechanism. The above techniques can also be applied to streams that are started explicitly under program control to allow the stream to be re-started after page-boundary crossings without the need for software to explicitly perform the restart operations.

Figure 62:
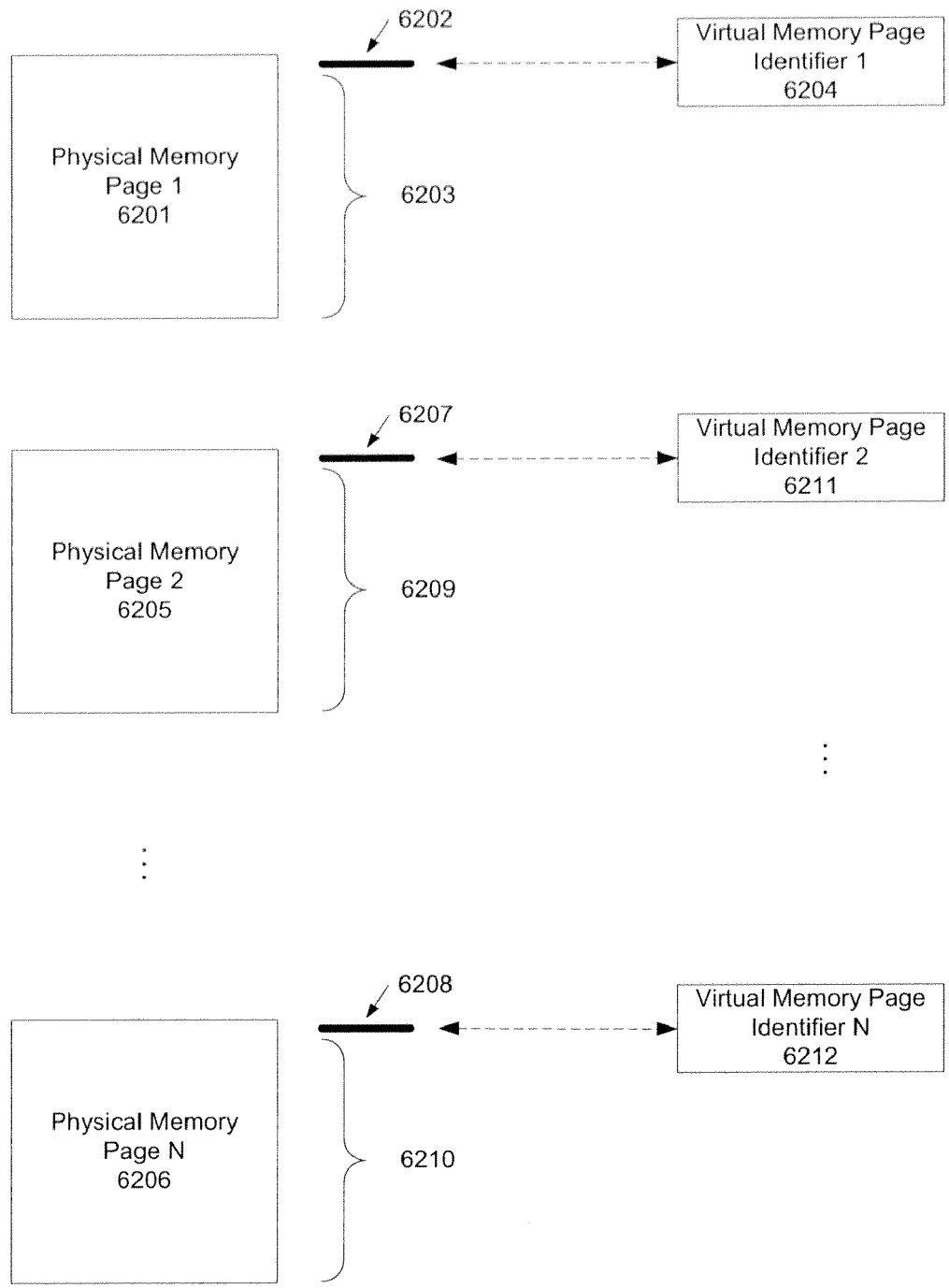

Referring to FIGS. 61 and 62 according to one embodiment, when the data stream detector 6102 stops at the end of a previous physical page, the stream detector 6102 may examine a predetermined address 6202 (e.g., starting address) of a next physical page 6201 to determine whether the predetermined address 6202 is associated with a next virtual memory page identifier 6204 (e.g., virtual memory page number) retrieved from the storage 6107. If so, the stream detector may or invoke a prefetch engine to prefetch at least a portion of the remaining addresses 6203 from the memory 6104 to cache 6103. Therefore, the stream detector does not have to examine multiple addresses in order to detect a pattern.

Figure 63:
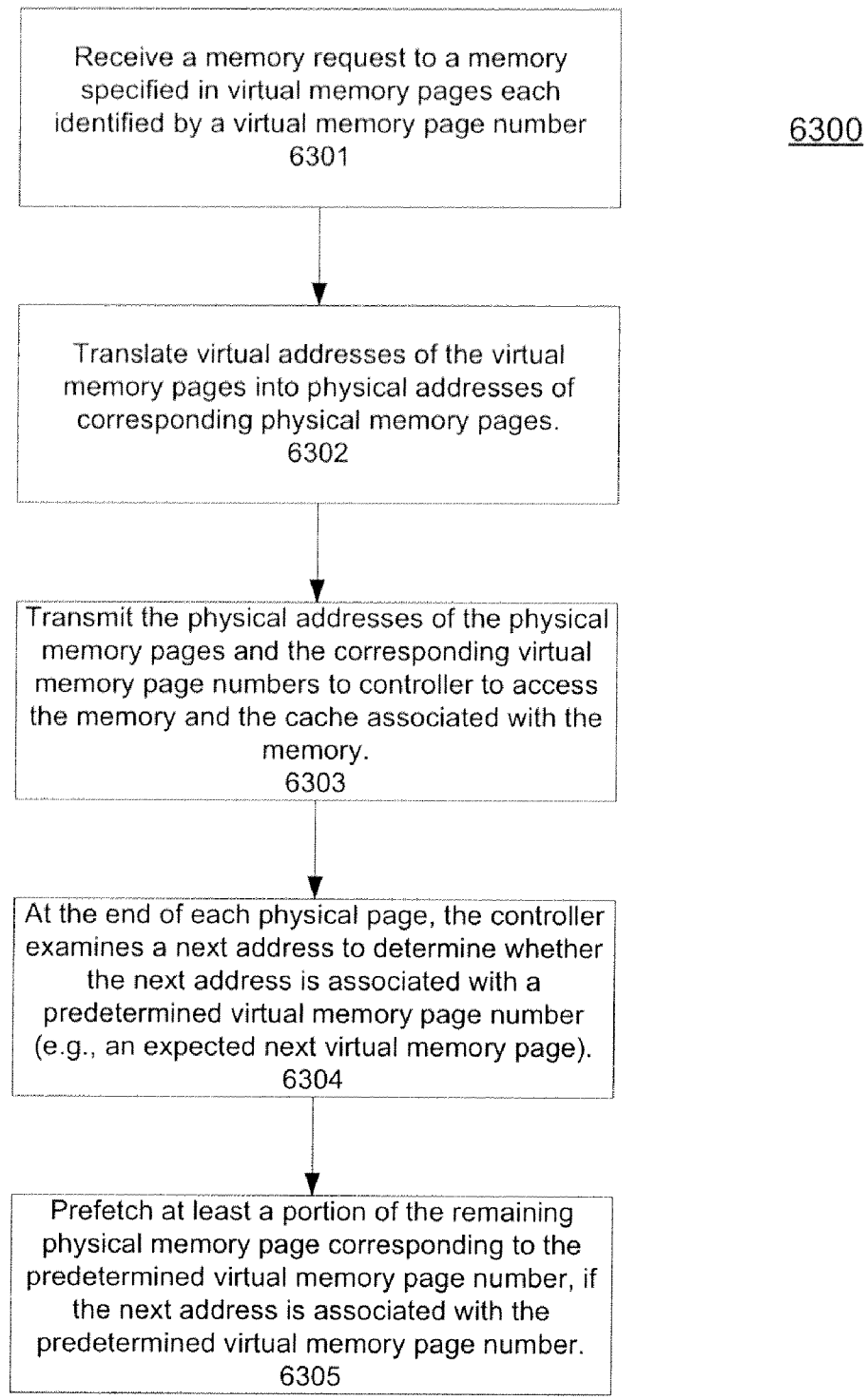
FIG. 63 is a flow diagram illustrating an example of a prefetch process according to one embodiment.

FIG. 63 is a flow diagram illustrating an example of a process for prefetching data according to one embodiment. Process 6300 may be performed by a processing logic that may comprise hardware (circuitry, dedicated logic, etc.), software (such as is run on a dedicated machine), or a combination of both.

Referring to FIG. 63, at block 6301, a memory request to access a memory is received specified in virtual memory pages and each of the virtual memory pages is identified by a virtual memory page identifier, such as, for example, a virtual memory page number. At block 6302, the virtual addresses of the virtual memory pages are translated into physical addresses of corresponding physical memory pages. At block 6303, the translated physical addresses of the physical memory pages are transmitted to a controller, as well as the corresponding virtual memory page identifiers, to access the memory and/or the cache associated with the memory. At block 6304, at the end of each physical memory page, the controller examines a next address to determine whether the next address is associated with a predetermined virtual memory page identifier (e.g., an expected next virtual memory page with respect to a previous page). If so, at block 6305, at least a portion of the remaining physical memory page corresponding to the predetermined virtual memory page identifier is prefetched. Other operations may also be performed.

Thus, macroscalar processor architecture has been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for aggregating a program loop, the method comprising:
    performing by a processor:
    identifying one or more instructions of a program loop having a branch instruction that causes the program loop to branch after a memory write operation dependent upon a predicate condition, wherein the predicate condition controls whether the branch instruction is dispatched for execution; and
    modifying the one or more instructions to cause a processor to execute the one or more instructions as a vector block, and to branch after the memory write operation is executed, for iterations of the program loop prior to and including an iteration during which the predicate condition is satisfied.

2. The method of claim 1, wherein the modifying the one or more instructions includes inserting one or more directives in source code containing the one or more instructions to cause the processor to branch after the memory write operation is executed as a vector block for a current iteration.

3. The method of claim 2, wherein the identifying one or more instructions, the modifying the one or more instructions, and the inserting one or more directives operations are performed by a compiler based on the source code.

4. The method as recited in claim 1, wherein the modifying the one or more instructions includes inserting a pre-break instruction in the program loop prior to the branch instruction in program sequence, wherein the pre-break instruction allows execution of the instructions of a current iteration prior to the branch instruction before branching out of the program loop.

5. The method as recited in claim 1, wherein the branch instruction comprises a break instruction that causes the processor to break out of the program loop in response to an exceptional condition.

6. An apparatus for aggregating a program loop, comprising:
    means for identifying one or more instructions of a program loop having a branch instruction that causes the program loop to branch after a memory write operation dependent upon a predicate condition, wherein the predicate condition controls whether the branch instruction is dispatched for execution; and
    means for modifying the one or more instructions to cause a processor to execute the one or more instructions as a vector block, and to branch after the memory write operation is executed, for iterations of the program loop prior to and including an iteration during which the predicate condition is satisfied.

7. The apparatus of claim 6, further comprising means for inserting one or more directives in source code containing the one or more instructions to cause the processor to branch after the memory write operation is executed as a vector block for a current iteration.

8. The apparatus of claim 7, wherein identifying one or more instructions, modifying at least one of the one or more instructions, and inserting one or more directives operations are performed by a compiler based on the source code.

9. A non-transitory computer readable storage medium including instructions executable by a processor to:
    identify a program loop having a branch instruction that causes another processor executing the program loop to branch after executing a memory write operation dependent upon a predicate condition, wherein the predicate condition controls whether the branch instruction is dispatched for execution; and
    modify the program loop to cause the another processor to execute the program loop as a vector block, and to cause the processor to branch after the memory write operation is executed, for iterations of the program loop prior to and including an iteration during which the predicate condition is satisfied.

10. The non-transitory computer readable storage medium of claim 9, wherein the instructions are further executable by the processor to insert a pre-break instruction in the program loop prior to the branch instruction in program sequence, wherein the pre-break instruction allows execution of the instructions of a current iteration prior to the branch instruction before branching out of the program loop.

11. The non-transitory computer readable storage medium of claim 9, wherein the branch instruction comprises a break instruction that causes the another processor to break out of the program loop in response to an exceptional condition.

* * * * *